US012030575B2

United States Patent
Sakagawa et al.

(10) Patent No.: US 12,030,575 B2
(45) Date of Patent: Jul. 9, 2024

(54) RIDER-POSTURE CHANGING DEVICE AND CONTROL SYSTEM OF HUMAN-POWERED VEHICLE

(71) Applicant: SHIMANO INC., Sakai (JP)

(72) Inventors: Yuki Sakagawa, Sakai (JP); Toyoto Shirai, Sakai (JP); Akihiro Nozaki, Sakai (JP); Satoshi Shahana, Sakai (JP); Hitoshi Takayama, Sakai (JP); Noor Ashyikkin Binti Mohd Noor, Sakai (JP)

(73) Assignee: SHIMANO INC., Sakai (JP)

( * ) Notice: Subject to any disclaimer, the term of this patent is extended or adjusted under 35 U.S.C. 154(b) by 843 days.

(21) Appl. No.: 17/081,936

(22) Filed: Oct. 27, 2020

(65) Prior Publication Data

US 2022/0126938 A1   Apr. 28, 2022

(51) Int. Cl.
*B62J 1/08* (2006.01)
*B60G 17/018* (2006.01)

(52) U.S. Cl.
CPC .............. *B62J 1/08* (2013.01); *B60G 17/018* (2013.01); *B60G 2400/252* (2013.01); *B62J 2001/085* (2013.01)

(58) Field of Classification Search
CPC .... B62G 17/018; B62G 2400/252; B62J 1/08; B62J 2001/085
See application file for complete search history.

(56) References Cited

U.S. PATENT DOCUMENTS

| 11,136,082 B2* | 10/2021 | Pruitt | B62J 1/002 |
| 2013/0138302 A1* | 5/2013 | Hara | B62J 50/22 |
| | | | 701/49 |
| 2013/0221713 A1 | 8/2013 | Pelot et al. | |
| 2017/0096185 A1* | 4/2017 | Hara | B62J 1/08 |
| 2018/0194418 A1* | 7/2018 | Bowers | B62J 1/08 |
| 2019/0009849 A1* | 1/2019 | Komatsu | B62J 50/22 |
| 2019/0061851 A1* | 2/2019 | Kurokawa | B62J 45/42 |
| 2019/0079462 A1* | 3/2019 | Meissner | G10H 1/46 |
| 2019/0193800 A1* | 6/2019 | Hara | B62J 45/41 |
| 2019/0193801 A1* | 6/2019 | Hara | G08C 17/00 |

FOREIGN PATENT DOCUMENTS

EP          2657113 B1      5/2016

* cited by examiner

*Primary Examiner* — Tony H Winner
(74) *Attorney, Agent, or Firm* — MORI & WARD, LLP

(57) ABSTRACT

A rider-posture changing device for a human-powered vehicle comprises a first member, a second member, a detector, and a controller. The second member is configured to be movable relative to the first member. The detector is configured to detect position information of the second member relative to the first member. The controller is configured to obtain movement information of the second member relative to the first member based on the position information.

19 Claims, 37 Drawing Sheets

RIDER-POSTURE CHANGING DEVICE AND CONTROL SYSTEM OF HUMAN-POWERED VEHICLE

BACKGROUND OF THE INVENTION

Field of the Invention

The present invention relates to a rider-posture changing device and a control system of a human-powered vehicle.

Discussion of the Background

A human-powered vehicle includes a rider-posture changing device configured to change a rider's posture. For example, such rider-posture changing devices includes a height adjustable seatpost, a suspension, or a height adjustable stem. Such devices include a first element, a second element, and a detection unit. The second element is movable relative to the first element in a specific direction in an adjustable mode and is positioned in a specific position relative to the first element in a lock mode. The detection unit is configured to detect a position of the second element relative to the first element. The rider's posture is changed depending on the relative position between the first element and the second element.

However, the rider-posture changing device may have unusual states such as excessive resistance between the first and second elements, hydraulic-structure malfunction, and detection-unit malfunction. Similarly, it is preferable that the second element is stopped in a target position or a position closer to the target position. Thus, it is preferable that the rider-posture changing device properly operates.

SUMMARY OF THE INVENTION

In accordance with a first aspect of the present invention, a rider-posture changing device for a human-powered vehicle comprises a first member, a second member, a detector, and a controller. The second member is configured to be movable relative to the first member. The detector is configured to detect position information of the second member relative to the first member. The controller is configured to obtain movement information of the second member relative to the first member based on the position information.

With the rider-posture changing device according to the first aspect, it is possible to utilize the movement information for determining an unusual state of the rider-posture changing device and/or for operating properly the rider-posture changing device.

In accordance with a second aspect of the present invention, the rider-posture changing device according to the first aspect is configured so that the movement information includes at least one of velocity information of the second member relative to the first member and acceleration information of the second member relative to the first member.

With the rider-posture changing device according to the second aspect, it is possible to utilize the velocity information and/or the acceleration information for determining an unusual state of the rider-posture changing device and/or for operating properly the rider-posture changing device.

In accordance with a third aspect of the present invention, the rider-posture changing device according to the first or second aspect is configured so that the position information includes at least one of first information and second information. The first information indicates whether the second member reaches a reference absolute position or not. The second information indicates a movement distance of the second member from a reference position in the longitudinal direction.

With the rider-posture changing device according to the third aspect, it is possible to utilize the first information and/or the second information for determining an unusual state of the rider-posture changing device and/or for operating properly the rider-posture changing device.

In accordance with a fourth aspect of the present invention, the rider-posture changing device according to the third aspect is configured so that the controller is configured to calculate the movement information in accordance with the second information.

With the rider-posture changing device according to the fourth aspect, it is possible to calculate the movement information using the movement distance of the second member.

In accordance with a fifth aspect of the present invention, the rider-posture changing device according to any one of the first to fourth aspects is configured so that the detector is configured to detect the position information indicating an absolute position of the second member relative to the first member. The controller is configured to calculate the movement information in accordance with the absolute position.

With the rider-posture changing device according to the fifth aspect, it is possible to calculate the movement position using the absolute position of the second member.

In accordance with a sixth aspect of the present invention, the rider-posture changing device according to any one of the first to fifth aspects is configured so that the controller is configured to determine at least one of malfunction of the detector and unusual relative movement between the first member and the second member.

With the rider-posture changing device according to the sixth aspect, it is possible to recognize at least one of malfunction of the detector and unusual relative movement between the first member and the second member.

In accordance with a seventh aspect of the present invention, the rider-posture changing device according to the sixth aspect is configured so that the controller is configured to compare the movement information with a predetermined value to determine at least one of the malfunction of the detector and the unusual relative movement between the first member and the second member.

With the rider-posture changing device according to the seventh aspect, it is possible to determine the at least one of the malfunction of the detector and the unusual relative movement between the first member and the second member using the movement information.

In accordance with an eighth aspect of the present invention, the rider-posture changing device according to the seventh aspect is configured so that the controller is configured to inform a user of the at least one of the malfunction of the detector and the unusual relative movement between the first member and the second member if the movement information is lower than the predetermined value.

With the rider-posture changing device according to the eighth aspect, it is possible to let the user know the at least one of the malfunction of the detector and the unusual relative movement.

In accordance with a ninth aspect of the present invention, the rider-posture changing device according to any one of the first to eighth aspects further comprises a hydraulic structure. The hydraulic structure has a lock state in which the second member is locked relative to the first member in the longitudinal direction, and an adjustable state in which the second member is movable relative to the first member in the longitudinal direction. The controller is configured to determine malfunction of the hydraulic structure.

With the rider-posture changing device according to the ninth aspect, it is possible to recognize the malfunction of the hydraulic structure.

In accordance with a tenth aspect of the present invention, the rider-posture changing device according to the ninth aspect is configured so that the controller is configured to conclude that the hydraulic structure malfunctions if the movement information is in a predetermined range in the lock state.

With the rider-posture changing device according to the tenth aspect, it is possible to determine the malfunction of the hydraulic structure using the movement information.

In accordance with an eleventh aspect of the present invention, the rider-posture changing device according to the tenth aspect is configured so that the controller is configured to inform a user of the malfunction of the hydraulic structure if the movement information is in the predetermined range in the lock state.

With the rider-posture changing device according to the eleventh aspect, it is possible to let the user know the malfunction of the hydraulic structure.

In accordance with a twelfth aspect of the present invention, the rider-posture changing device according to any one of the first to eleventh aspects further comprises an actuator. The controller is configured to control the actuator based on the movement information.

With the rider-posture changing device according to the twelfth aspect, it is possible to operate the rider-posture changing device based on the movement information.

In accordance with a thirteenth aspect of the present invention, the rider-posture changing device according to the twelfth aspect further comprises a hydraulic structure. The hydraulic structure has a lock state in which the second member is locked relative to the first member in the longitudinal direction, and an adjustable state in which the second member is movable relative to the first member in the longitudinal direction. The actuator is configured to change a state of the hydraulic structure between the lock state and the adjustable state. The controller is configured to determine, based on the movement information, a timing at which the actuator changes the state of the hydraulic structure from the adjustable state to the lock state.

With the rider-posture changing device according to the thirteenth aspect, it is possible to properly operate the hydraulic structure using the movement information.

In accordance with a fourteenth aspect of the present invention, the rider-posture changing device according to the thirteenth aspect is configured so that the controller is configured to calculate, based on the movement information, a position in which the actuator changes the state of the hydraulic structure from the adjustable state to the lock state.

With the rider-posture changing device according to the fourteenth aspect, it is possible to obtain the position in which the actuator changes the state of the hydraulic structure from the adjustable state to the lock state using the movement information. This enables the second member to stop in a target position depending on the movement state of the rider-posture changing device.

In accordance with a fifteenth aspect of the present invention, the rider-posture changing device according to the fourteenth aspect is configured so that the movement information includes velocity information of the second member relative to the first member. The controller is configured to calculate, based on the velocity information, the position in which the actuator changes the state of the hydraulic structure from the adjustable state to the lock state.

With the rider-posture changing device according to the fifteenth aspect, it is possible to obtain the position in which the actuator changes the state of the hydraulic structure from the adjustable state to the lock state using the velocity information. This enables the second member to stop in a target position depending on the velocity of the second member.

In accordance with a sixteenth aspect of the present invention, the rider-posture changing device according to any one of the first to fifth aspects is configured so that one of the first member and the second member is configured to be provided to a frame of the human-powered vehicle.

With the rider-posture changing device according to the sixteenth aspect, it is possible to mount the rider-posture changing device to the frame of the human-powered vehicle.

In accordance with a seventeenth aspect of the present invention, the rider-posture changing device according to the sixteenth aspect is configured so that the first member includes a first tube, and the second member includes a second tube, the first tube and the second tube are telescopically arranged.

With the rider-posture changing device according to the seventeenth aspect, it is possible to apply the structure of the rider-posture changing device to the first tube and the second tube telescopically arranged.

In accordance with an eighteenth aspect of the present invention, the rider-posture changing device according to any one of the first to seventeenth aspects comprises a height adjustable seatpost including the first member, the second member, the detector, and the controller.

With the rider-posture changing device according to the eighteenth aspect, it is possible to apply the structure of the rider-posture changing device to the height adjustable seatpost.

In accordance with a nineteenth aspect of the present invention, the rider-posture changing device according to any one of the first to seventeenth aspects comprises a suspension including the first member, the second member, the detector, and the controller.

With the rider-posture changing device according to the nineteenth aspect, it is possible to the structure of the rider-posture changing device to the suspension.

In accordance with a twentieth aspect of the present invention, a control system for a human-powered vehicle comprises the rider-posture changing device according to the first to nineteenth aspects and an operating device configured to operate the rider-posture changing device.

With the control system according to the twentieth aspect, it is possible to control the rider-posture changing device through the operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
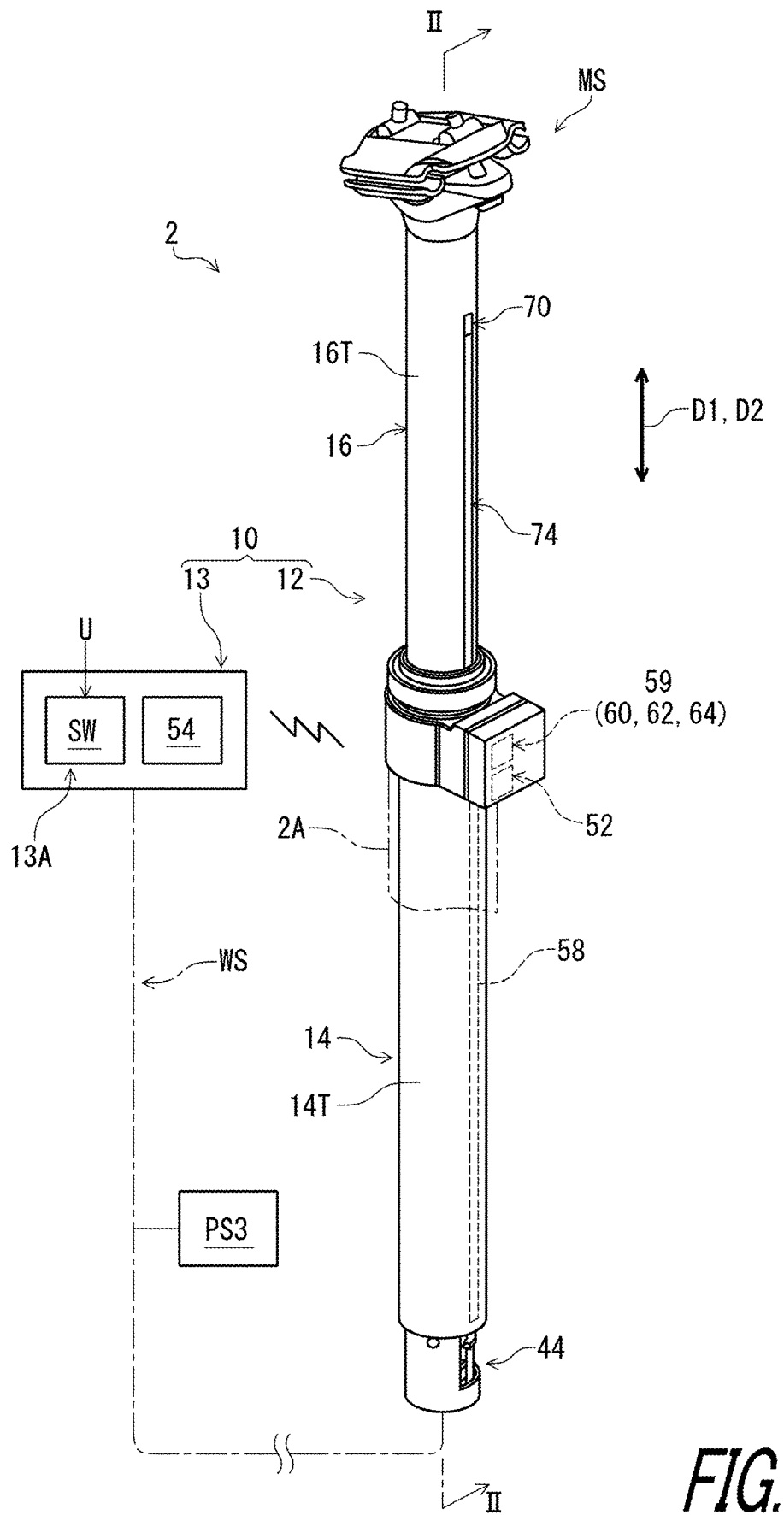
FIG. 1 is a perspective view of a rider-posture changing device of a control system of a human-powered vehicle in accordance with a first embodiment, with a schematic block diagram of an operating device of the control system.

The embodiment(s) will now be described with reference to the accompanying drawings, wherein like reference numerals designate corresponding or identical elements throughout the various drawings.

As seen in FIG. 1, a control system 10 for a human-powered vehicle 2 comprises a rider-posture changing device 12 and an operating device 13. The operating device 13 is configured to operate the rider-posture changing device 12. The operating device 13 is configured to receive a user input U. The rider-posture changing device 12 is configured to move in response to the user input U received by the operating device 13.

The rider-posture changing device 12 for the human-powered vehicle 2 comprises a first member 14 and a second member 16. The first member 14 extends in a longitudinal direction D1. The second member 16 extends in the longitudinal direction D1. The first member 14 and the second member 16 are movable relative to each other in the longitudinal direction D1. The second member 16 is configured to be movable relative to the first member 14. The second member 16 is configured to be movable relative to the first member 14 in the longitudinal direction D1.

In the present embodiment, the first member 14 includes a first tube 14T, and the second member 16 includes a second tube 16T. The first tube 14T and the second tube 16T are telescopically arranged. The second tube 16T is movably coupled to the first tube 14T. The second tube 16T is movably provided in the first tube 14T. However, each of the first member 14 and the second member 16 can have shapes other than a tubular shape.

The rider-posture changing device 12 further comprises a saddle mounting structure MS to fixedly mount a saddle to one of the first member 14 and the second member 16. One of the first member 14 and the second member 16 is configured to be provided to a frame 2A of the human-powered vehicle 2. In the present embodiment, the saddle mounting structure MS is attached to the second member 16 to fixedly mount the saddle to the second member 16. The first member 14 is configured to be provided to the frame 2A of the human-powered vehicle 2. However, the saddle mounting structure MS can be attached to the first member 14 to fixedly mount the saddle to the first member 14. In such an embodiment, the second member 16 is configured to be provided to the frame 2A of the human-powered vehicle 2.

Figure 2:
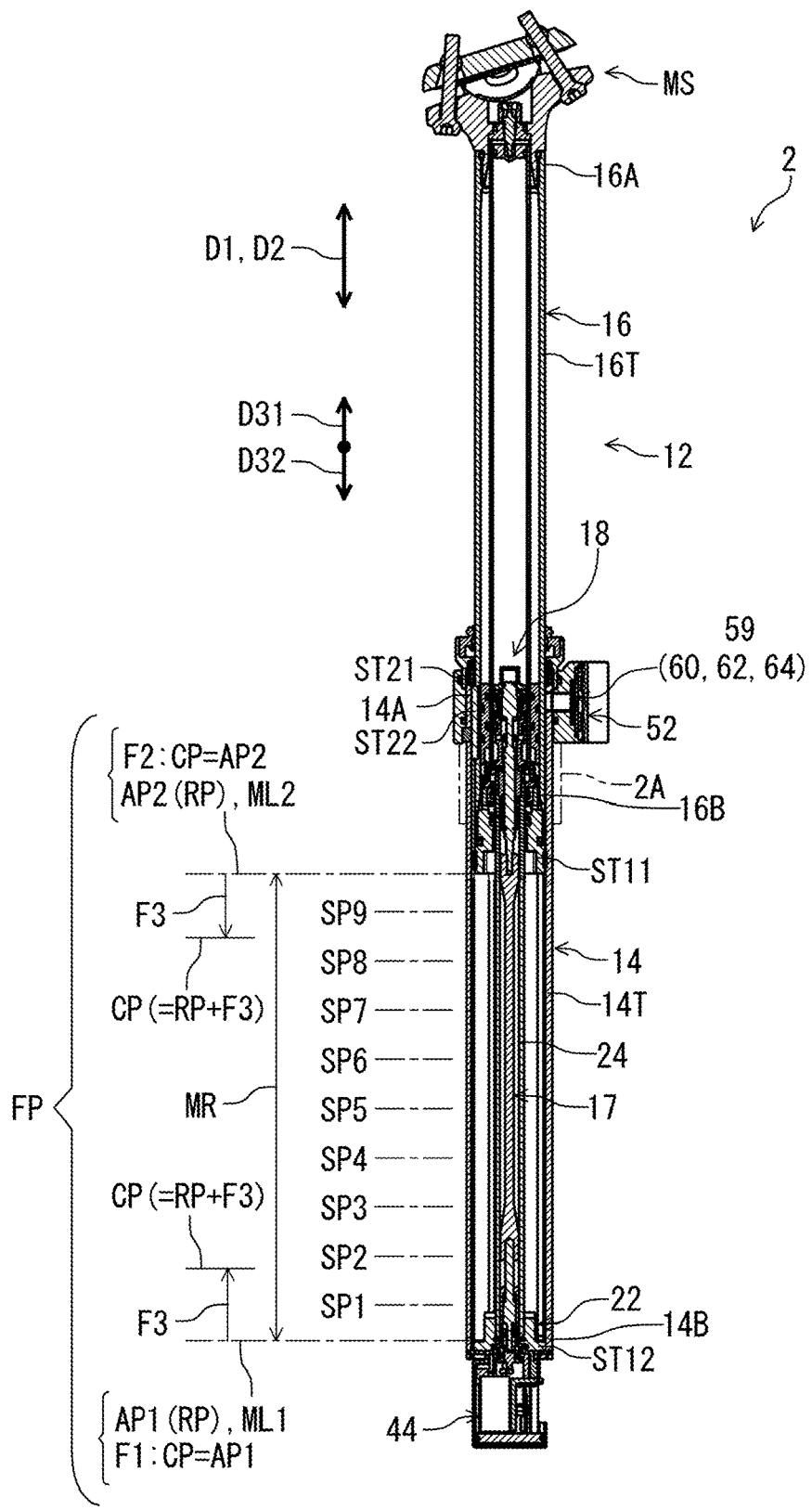
FIG. 2 is a cross-sectional view of the rider-posture changing device taken along line II-II of FIG. 1.

As seen in FIG. 2, the first member 14 includes a first end 14A and a first additional end 14B. The first member 14 extends from the first end 14A to the first additional end 14B in the longitudinal direction D1. The second member 16 includes a second end 16A and a second additional end 16B. The second member 16 extends from the second end 16A to the second additional end 16B in the longitudinal direction D1. The first end 14A of the first member 14 is provided above the first additional end 14B in a state where the rider-posture changing device 12 is mounted to the frame 2A. The second end 16A of the second member 16 is provided above the second additional end 16B in a state where the rider-posture changing device 12 is mounted to the frame 2A. Thus, the first end 14A can also be referred to as an upper end of the first member 14. The second end 16A can also be referred to as an upper end of the second member 16. The saddle mounting structure MS is attached to the second end 16A of the second member 16. However, the saddle mounting structure MS can be attached to other parts in the rider-posture changing device 12.

The rider-posture changing device 12 has a movable range MR. For example, the movable range MR is defined based on the second end 16A of the second member 16. The movable range MR is a range in which the second member 16 is movable relative to the first member 14 in the longitudinal direction D1. The movable range MR includes a first mechanical limit ML1 and a second mechanical limit ML2. The movable range MR is defined between the first mechanical limit ML1 and the second mechanical limit ML2 in the longitudinal direction D1.

The rider-posture changing device 12 includes a first stopper ST11, a first receiving member ST12, a second stopper ST21, and a second receiving member ST22. The first stopper ST11 is secured to the first end 14A of the first member 14. The first receiving member ST12 is attached to the second member 16. The second stopper ST21 is secured to the first additional end 14B of the first member 14. The second receiving member ST22 is attached to the second additional end 16B of the second member 16.

The second member 16 is at the first mechanical limit ML1 in a state where the first stopper ST11 is in contact with the first receiving member ST12. The second member 16 is at the second mechanical limit ML2 in a state where the second stopper ST21 is in contact with the second receiving member ST22. The first stopper ST11 and the first receiving member ST12 define the first mechanical limit ML1. The second stopper ST21 and the second receiving member ST22 define the second mechanical limit ML2.

Figure 3:
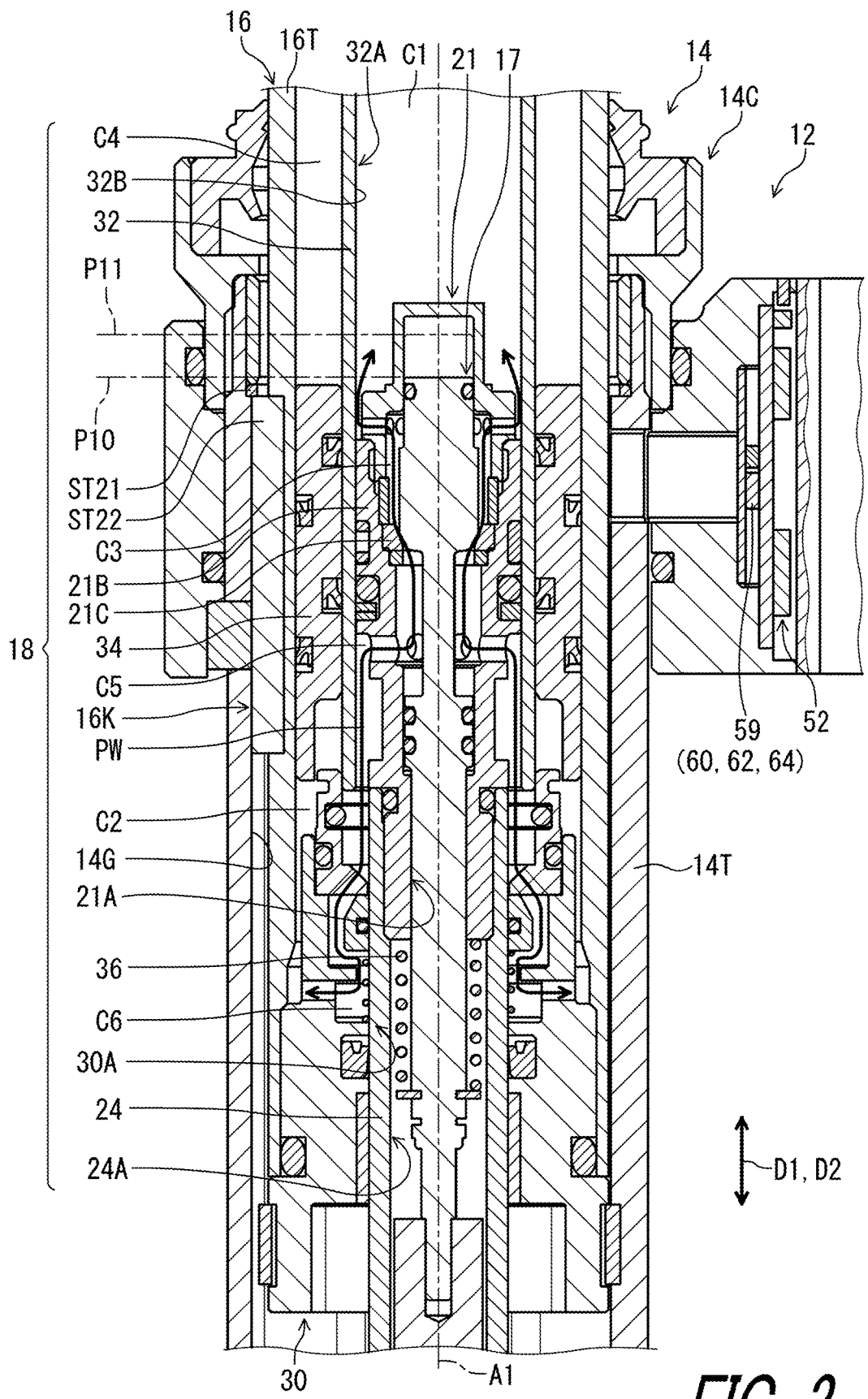
FIG. 3 is a partial cross-sectional view of the rider-posture changing device illustrated in FIG. 1.

As seen in FIG. 3, the rider-posture changing device 12 for the human-powered vehicle 2 comprises a first hydraulic chamber C1, a second hydraulic chamber C2, and a valve member 17. The second hydraulic chamber C2 is configured to be in fluid communication with the first hydraulic chamber C1. The valve member 17 is configured to control a fluid communication between the first hydraulic chamber C1 and the second hydraulic chamber C2. In the present embodiment, the rider-posture changing device 12 further comprises a hydraulic structure 18. The hydraulic structure 18 includes the first hydraulic chamber C1, the second hydraulic chamber C2, and the valve member 17.

The hydraulic structure 18 includes a passageway PW. The passageway PW is provided between the first hydraulic chamber C1 and the second hydraulic chamber C2. The valve member 17 is configured to change the fluid communication state of the hydraulic structure 18 between a closed state where the valve member 17 closes the passageway PW and an open state where the valve member 17 opens the passageway PW. The first hydraulic chamber C1 and the second hydraulic chamber C2 are filled with a substantially incompressible fluid (e.g., oil).

The hydraulic structure 18 includes a valve structure 21. The valve member 17 is movable relative to the valve structure 21 between a closed position P10 and an open position P11 in the longitudinal direction D1. The hydraulic structure 18 is in the closed state when the valve member 17 is in the closed position P10. The hydraulic structure 18 is in an open state when the valve member 17 is in the open position P11.

The hydraulic structure 18 has a lock state in which the second member 16 is locked relative to the first member 14 in the longitudinal direction D1. The hydraulic structure 18 has an adjustable state in which the second member 16 is movable relative to the first member 14 in the longitudinal direction D1. The hydraulic structure 18 is in the lock state when the hydraulic structure 18 is in the closed state. The hydraulic structure 18 is in the adjustable state when the hydraulic structure 18 is in the open state.

The first member 14 includes a cap structure 14C attached to the first tube 14T. The cap structure 14C includes the second stopper ST21. The second member 16 includes a plurality of keys 16K attached to the second tube 16T. The keys 16K are circumferentially arranged at regular intervals. The plurality of keys 16K includes the second receiving member ST22. The first member 14 includes a plurality of guide grooves 14G extending in the longitudinal direction D1. The key 16K is provided in the guide groove 14G to restrict the second member 16 from rotating relative to the first member 14.

Figure 4:
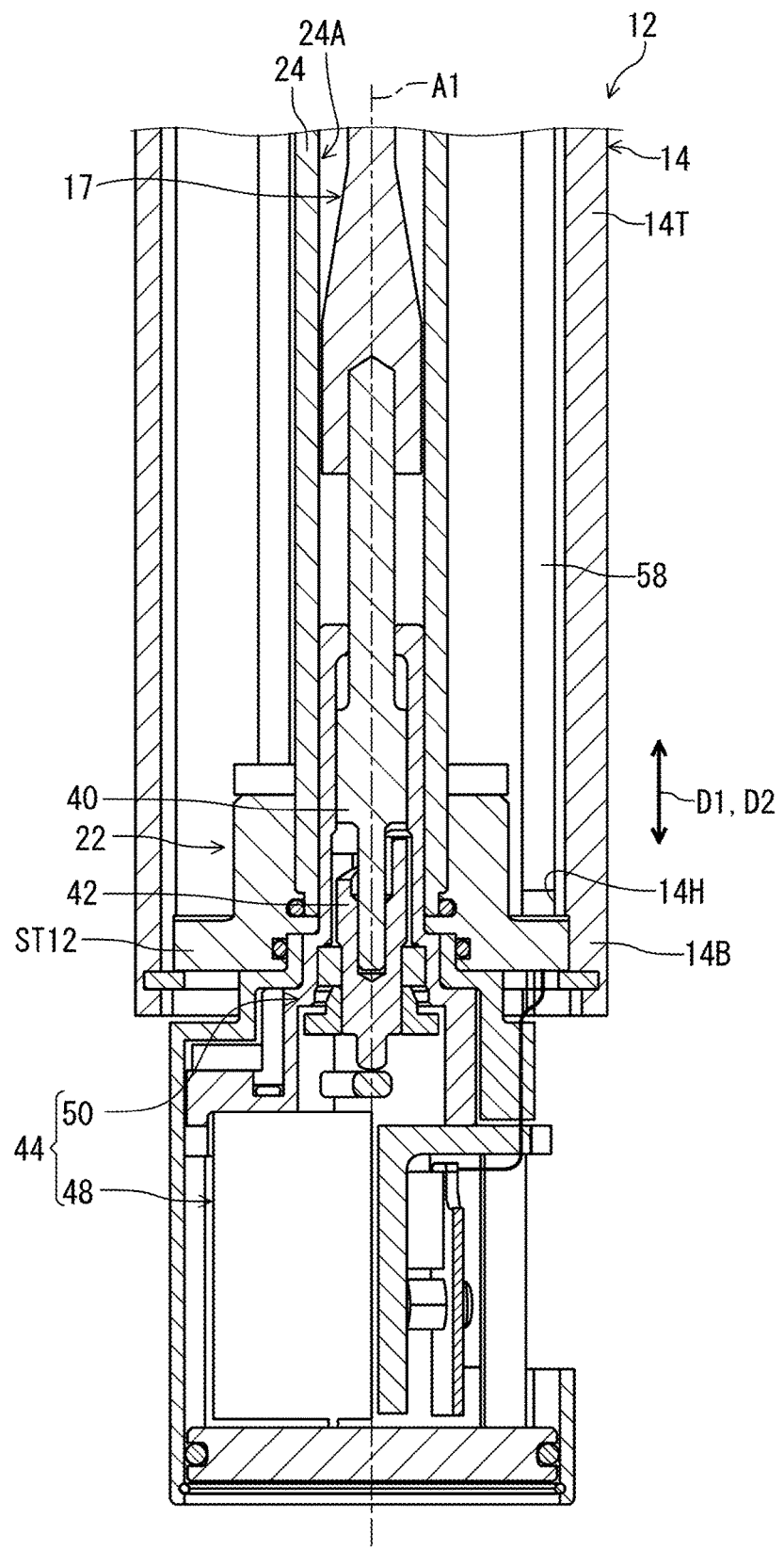
FIG. 4 is a partial cross-sectional view of the rider-posture changing device illustrated in FIG. 1.

As seen in FIG. 4, the hydraulic structure 18 includes a first support 22 and a first inner tube 24. The first support 22 is secured to the first additional end 14B of the first member 14. The first inner tube 24 is secured to the first support 22 and provided in the first member 14. The first inner tube 24 extends from the first support 22 in the longitudinal direction D1. The first support 22 includes the first receiving member ST12.

As seen in FIG. 3, the valve structure 21 is secured to an end of the first inner tube 24. The valve structure 21 includes an internal cavity 21A. The first inner tube 24 includes a cavity 24A. The valve member 17 is movably provided in the internal cavity 21A and the cavity 24A. The valve member 17 and the valve structure 21 define a valve chamber C3 in the internal cavity 21A.

Figure 5:
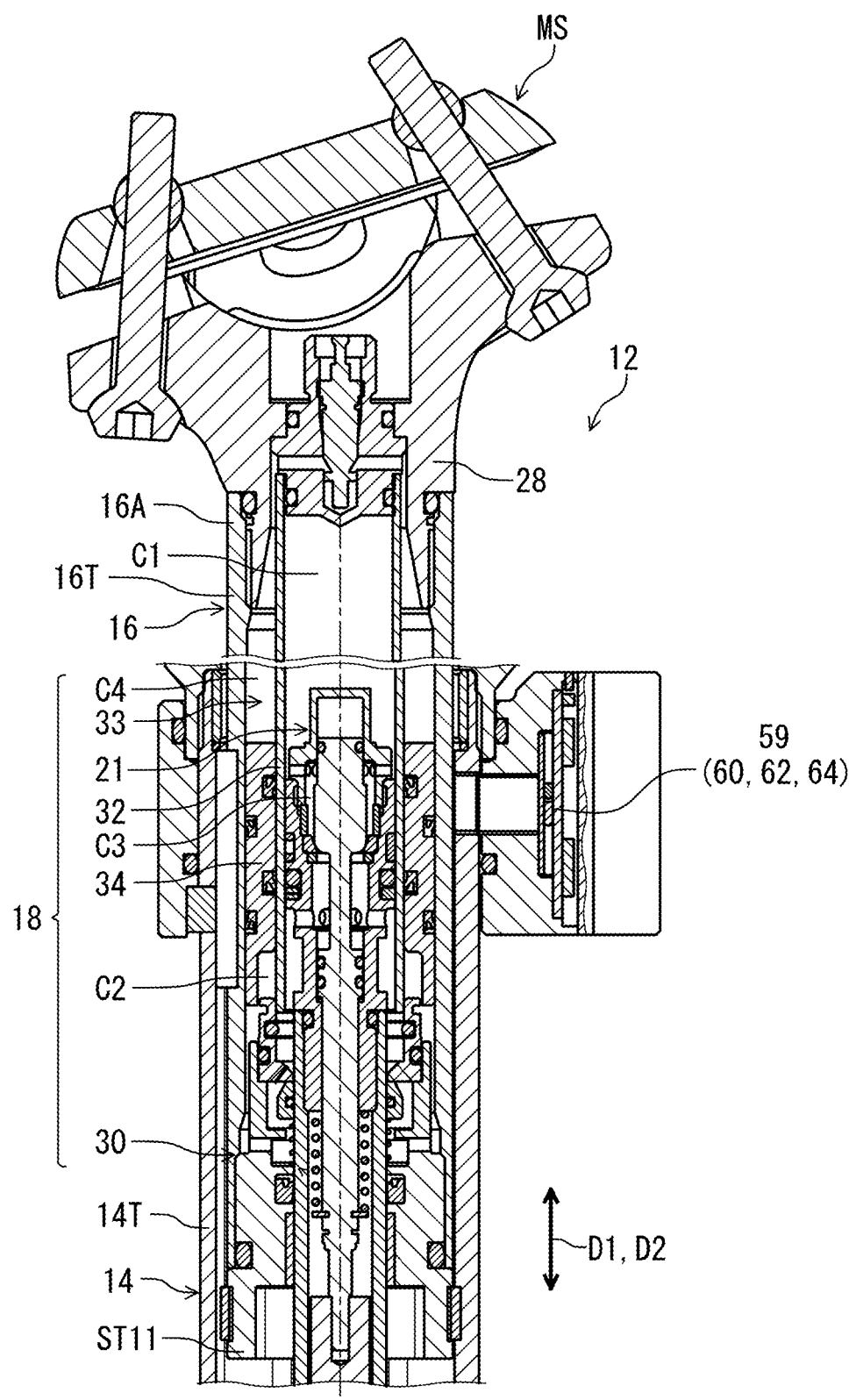
FIG. 5 is a partial cross-sectional view of the rider-posture changing device illustrated in FIG. 1.

As seen in FIG. 5, the hydraulic structure 18 includes a second support 28, an intermediate support 30, and a second inner tube 32. The second support 28 is secured to the second end 16A of the second member 16. The second support 28 is integrally provided with the saddle mounting structure MS and couples the saddle mounting structure MS to the second member 16. The intermediate support 30 is secured to the second additional end 16B of the second member 16. The second inner tube 32 is provided in the second member 16 and disposed between the second support 28 and the intermediate support 30. The second support 28 and the intermediate support 30 are secured to the second member 16 to hold the second inner tube 32 in the second member 16. The second member 16, the second inner tube 32, the second support 28, and the intermediate support 30 define an internal space 33. The intermediate support 30 includes the first stopper ST11.

The hydraulic structure 18 includes a floating piston 34. The floating piston 34 is movably provided in the internal space 33 to divide the internal space 33 into the second hydraulic chamber C2 and a biasing chamber C4. The biasing chamber C4 is filled with a compressible fluid (e.g., gas such as air) to produce biasing force to lengthen the rider-posture changing device 12. The compressible fluid is compressed in the biasing chamber C4 to produce the biasing force in a state where the second member 16 is at each of the first mechanical limit ML1 and the second mechanical limit ML2 (see, e.g., FIG. 2). The biasing force produced by the biasing chamber C4 biases the second member 16 toward the second mechanical limit ML2.

As seen in FIG. 3, the intermediate support 30 includes a support opening 30A. The first inner tube 24 extends through the support opening 30A. The valve structure 21 is movably provided in a cavity 32A of the second inner tube 32. The valve structure 21 is in slidable contact with an inner peripheral surface 32B of the second inner tube 32. As seen in FIG. 5, the valve structure 21, the second inner tube 32, and the second support 28 define the first hydraulic chamber C1 in the second inner tube 32.

As seen in FIG. 3, the first inner tube 24, the valve structure 21, the second inner tube 32, and the intermediate support 30 define a first intermediate chamber C5 and a second intermediate chamber C6. The first hydraulic chamber C1 is in communication with the valve chamber C3 via at least one hole. The valve chamber C3 is configured to be in communication with the first intermediate chamber C5 via at least one hole. The first intermediate chamber C5 is in communication with the second intermediate chamber C6 via at least one hole. The second intermediate chamber C6 is in communication with the second hydraulic chamber C2 via at least one hole. The passageway PW includes the valve chamber C3, the first intermediate chamber C5, the second intermediate chamber C6, and the plurality of holes.

The valve structure 21 includes a valve base 21B and a valve seat 21C. The valve seat 21C is attached to the valve base 21B to be contactable with the valve member 17. The valve member 17 is in contact with the valve seat 21C to close the passageway PW in the closed state where the valve member 17 is in the closed position P10. The valve member 17 is spaced apart from the valve seat 21C to open the passageway PW in the open state where the valve member 17 is in the open position P11.

The rider-posture changing device 12 comprises a biasing member 36 to bias the valve member 17 toward the closed position P10. The biasing member 36 is provided in the first inner tube 24. For example, the biasing member 36 includes a spring.

The substantially incompressible fluid does not flow between the first hydraulic chamber C1 and the second hydraulic chamber C2 in the closed state where the valve member 17 closes the passageway PW. Thus, in the closed state, the first member 14 and the second member 16 are fixedly positioned relative to each other in the longitudinal direction D1.

The substantially incompressible fluid can flow between the first hydraulic chamber C1 and the second hydraulic chamber C2 through the passageway PW in the open state where the valve member 17 opens the passageway PW. For example, when the rider's weight is applied to the second member 16 in the open state, the substantially incompressible fluid flows from the first hydraulic chamber C1 to the second hydraulic chamber C2 through the passageway PW. Thus, the floating piston 34 is pressed toward the biasing chamber C4 relative to the first member 14, increasing a volume of the second hydraulic chamber C2 while the compressible fluid is compressed in the biasing chamber C4. This downwardly moves the second member 16 relative to the first member 14 against the basing force of the biasing chamber C4 while the rider's weight is applied to the second member 16, allowing the rider to lower the saddle using the rider's weight in the open state.

The compressible fluid compressed in the biasing chamber C4 biases the second member 16 to upwardly move relative to the first member 14 in the longitudinal direction D1 and to downwardly move the floating piston 34 in the longitudinal direction D1. When the rider's weight is released from the second member 16 in the open state, the substantially incompressible fluid flows from the second hydraulic chamber C2 to the first hydraulic chamber C1 through the passageway PW because of the biasing force of the biasing chamber C4. This upwardly moves the second member 16 relative to the first member 14 while the rider's weight is released from the second member 16, allowing the rider to lift the saddle by releasing the rider's weight in the open state.

Figure 6:
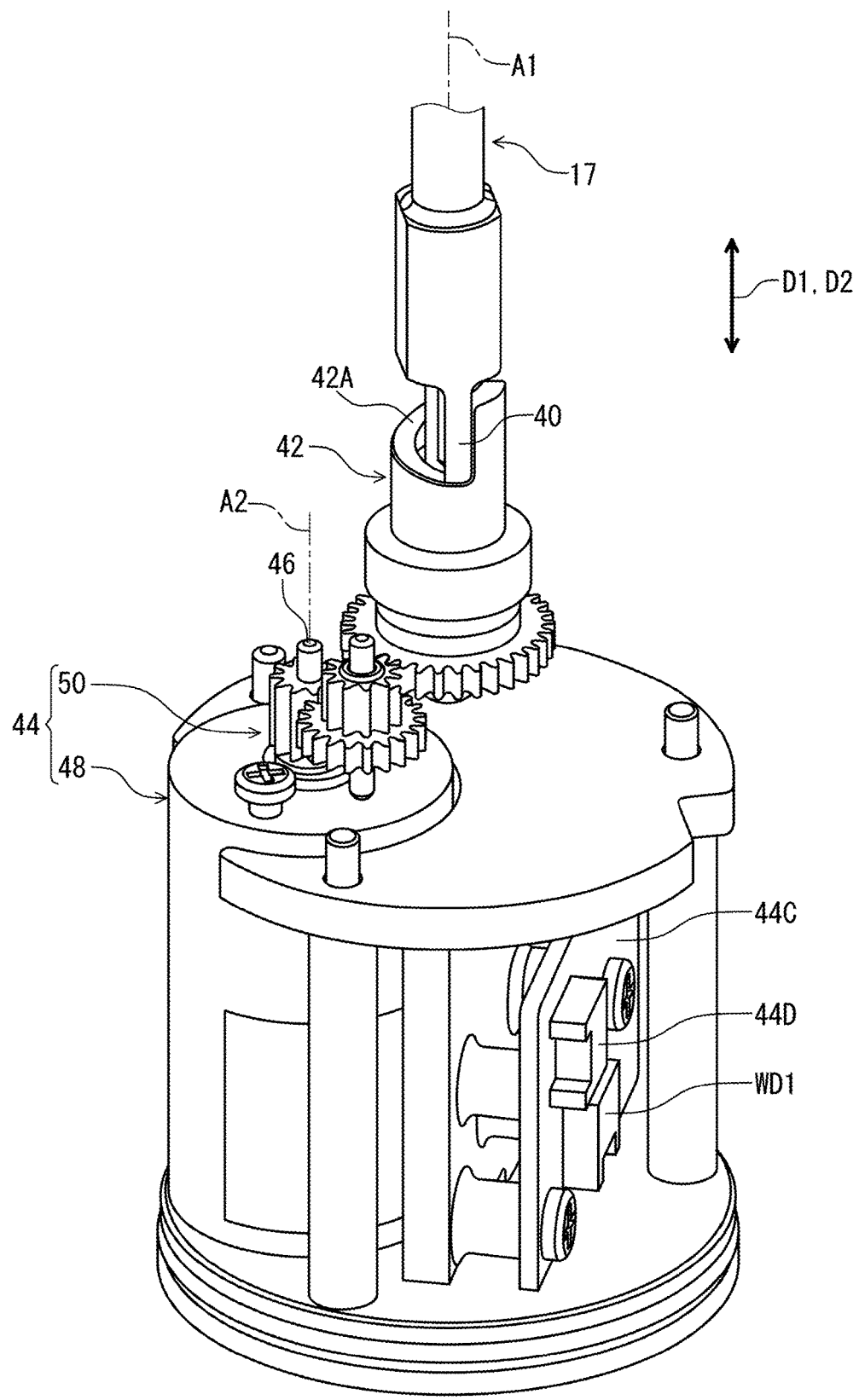
FIG. 6 is a partial perspective view of an internal structure of the rider-posture changing device illustrated in FIG. 1.

As seen in FIG. 6, the rider-posture changing device 12 for the human-powered vehicle 2 comprises a cam follower 40. The cam follower 40 is coupled to the valve member 17 so as to move the valve member 17. In the present embodiment, the cam follower 40 is integrally provided with at least part of the valve member 17 as a one-piece unitary member. However, the cam follower 40 can be a separate member from the valve member 17.

The rider-posture changing device 12 for the human-powered vehicle 2 comprises a cam member 42. The cam member 42 is rotatable about a rotational axis A1 to guide the cam follower 40 in a movement direction D2. Thus, the cam member 42 is rotatable about the rotational axis A1 to move the valve member 17 in the movement direction D2. The cam member 42 is rotatable about the rotational axis A1 to move the valve member 17 between the closed position P10 (see, e.g., FIG. 3) and the open position P11 (see, e.g., FIG. 3) in the movement direction D2. The cam member 42 includes a guide surface 42A configured to guide the cam follower 40 in the movement direction D2 in response to the rotation of the cam member 42.

In the present embodiment, the movement direction D2 is defined along the longitudinal direction D1. The movement direction D2 is defined parallel to the longitudinal direction D1. However, the movement direction D2 can be non-parallel to the longitudinal direction D1.

The rider-posture changing device 12 further comprises an actuator 44. The actuator 44 is configured to move one of the first member 14 and the second member 16 relative to another of the first member 14 and the second member 16. The actuator 44 is configured to make one of the first tube 14T and the second tube 16T movable relative to another of the first tube 14T and the second tube 16T. The actuator 44 is configured to change a state of the hydraulic structure 18 between the lock state and the adjustable state (see, e.g., FIG. 3). The actuator 44 is configured to move the valve member 17 between the closed position P10 (see, e.g., FIG. 3) and the open position P11 (see, e.g., FIG. 3) in the movement direction D2. The actuator 44 is configured to rotate the cam member 42 to move the valve member 17 between the closed position P10 (see, e.g., FIG. 3) and the open position P11 (see, e.g., FIG. 3) in the movement direction D2. The actuator 44 is configured to maintain the valve member 17 in each of the closed position P10 (see, e.g., FIG. 3) and the open position P11 (see, e.g., FIG. 3). Thus, the actuator 44 is configured to change a state of the hydraulic structure 18 between the lock state and the adjustable state. The actuator 44 is configured to maintain each of the lock state and the adjustable state.

The actuator 44 includes at least one of a hydraulic device, a pneumatic device, an electric motor, a solenoid, a shape memory alloy, and a piezoelectric element. In the present embodiment, the actuator 44 includes a motor configured to move the second member 16 relative to the first member 14. However, the actuator 44 can include at least one of the hydraulic device, the pneumatic device, the solenoid, the shape memory alloy, and the piezoelectric element instead of or in addition to the motor.

The actuator 44 includes an output shaft 46 rotatable about an actuation rotational axis A2. The actuator 44 includes a motor 48 and a gear reducer 50. The motor 48 is configured to rotate the output shaft 46 about the actuation rotational axis A2. The output shaft 46 is coupled to a rotor of the motor 48. The gear reducer 50 is configured to reduce a rotational speed of the cam member 42 compared with a rotational speed of the output shaft 46. Examples of the motor 48 include a direct-current motor and a stepper motor.

Figure 7:
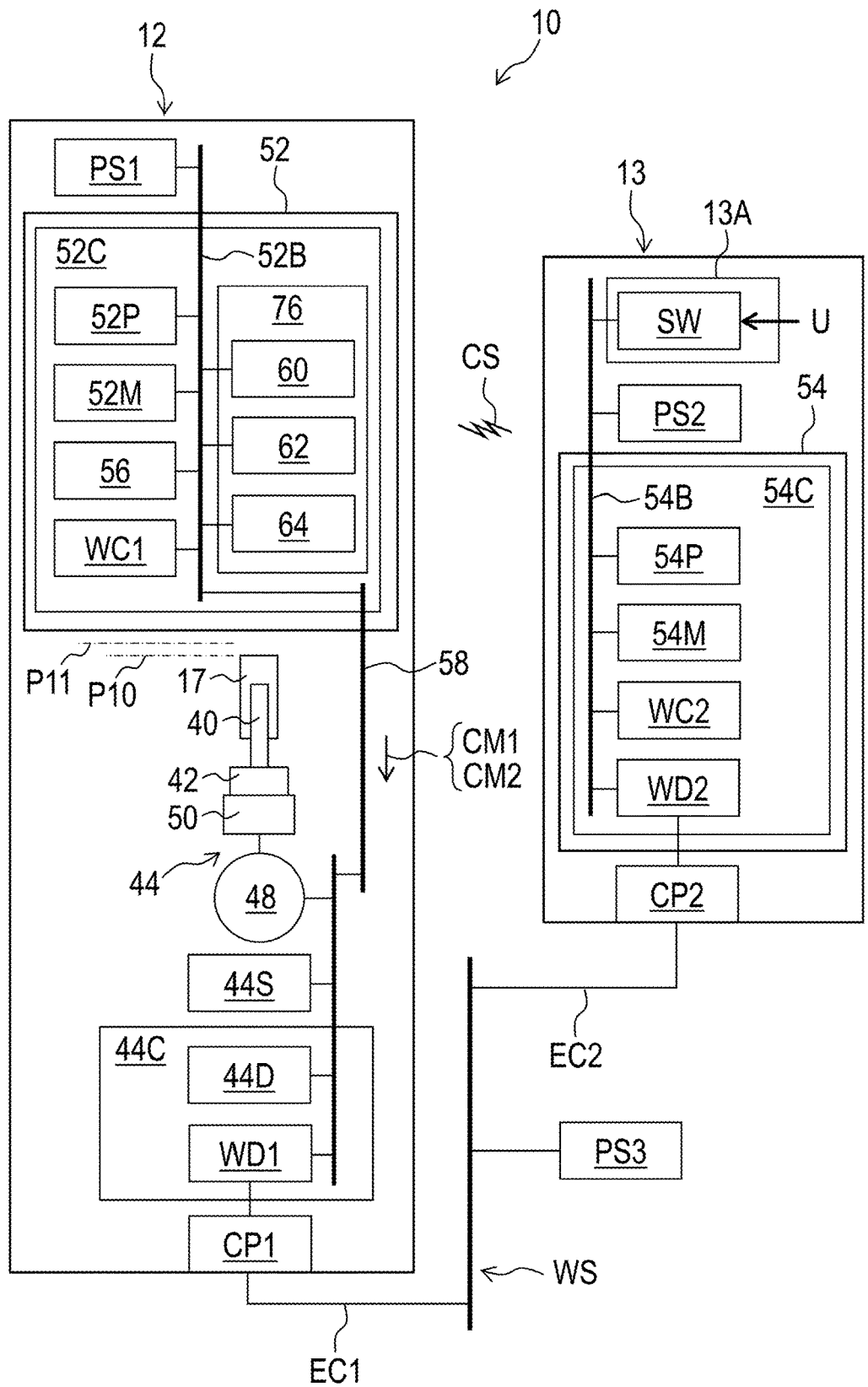
FIG. 7 is a schematic block diagram of the rider-posture changing device illustrated in FIG. 1.

As seen in FIG. 7, the rider-posture changing device 12 for the human-powered vehicle 2 comprises a controller 52. The controller 52 is configured to control the actuator 44 to move one of the first member 14 and the second member 16 relative to another of the first member 14 and the second member 16 in response to a control signal CS transmitted from the operating device 13. The controller 52 is configured to control the actuator 44 to move the second member 16 relative to the first member 14 in the longitudinal direction D1 in response to the control signal CS transmitted from the operating device 13. The controller 52 is configured to control the actuator 44 to rotate the cam member 42 in response to the control signal CS transmitted from the operating device 13.

The controller 52 includes a processor 52P, a memory 52M, a circuit board 52C, and a system bus 52B. The processor 52P includes a central processing unit (CPU) and a memory controller. The memory 52M is electrically connected to the controller 52. The memory 52M includes a read only memory (ROM) and a random-access memory (RAM). The ROM includes a non-transitory computer-readable storage medium. The RAM includes a transitory computer-readable storage medium. The memory 52M includes storage areas each having an address in the ROM and the RAM. The controller 52 controls the memory 52M to store data in the storage areas of the memory 52M and reads data from the storage areas of the memory 52M. The processor 52P and the memory 52M are electrically mounted on the circuit board 52C. The processor 52P and the memory 52M are electrically connected to the system bus 52B. The memory 52M (e.g., the ROM) stores a program. The program is read into the controller 52, and thereby the configuration and/or algorithm of the controller 52 is performed.

In the present embodiment, the operating device 13 includes a user interface 13A. The user interface 13A is configured to receive the user input U. The user interface 13A includes an electrical switch SW configured to be activated in response to the user input U. For example, the user interface 13A includes a push-button switch. However, the user interface 13A can include other user interfaces.

The operating device 13 includes a signal controller 54. The signal controller 54 is configured to generate the control signal CS in response to the user input U. The signal controller 54 is configured to generate the control signal CS when the electrical switch SW is pressed. The signal controller 54 includes a processor 54P, a memory 54M, a circuit board 54C, and a bus 54B. The processor 54P and the memory 54M are electrically mounted on the circuit board 54C. The processor 54P includes a CPU and a memory controller. The memory 54M is electrically connected to the processor 54P. The memory 54M includes a ROM and a RAM. The memory 54M includes storage areas each having an address in the ROM and the RAM. The processor 54P controls the memory 54M to store data in the storage areas of the memory 54M and reads data from the storage areas of the memory 54M. The circuit board 54C and the user interface 13A are electrically connected to the bus 54B. The user interface 13A is electrically connected to the processor 54P and the memory 54M with the bus 54B and the circuit board 54C. The memory 54M (e.g., the ROM) stores a program. The program is read into the processor 54P, and thereby the configuration and/or algorithm of the signal controller 54 is performed.

The rider-posture changing device 12 further comprises a wireless communicator WC1. The wireless communicator WC1 is configured to wirelessly communicate with other wireless communicators. The operating device 13 includes an additional wireless communicator WC2 configured to wirelessly communicate with other wireless communicators. The controller 52 is configured to be connected to the wireless communicator WC1 to wirelessly communicate with the additional wireless communicator WC2. The signal controller 54 is configured to be connected to the additional wireless communicator WC2 to wirelessly communicate with the wireless communicator WC1. The additional wireless communicator WC2 is configured to transmit the control signal CS generated by the signal controller 54 through a wireless communication channel. The wireless communicator WC1 is configured to receive the control signal CS from the additional wireless communicator WC2 through the wireless communication channel.

The wireless communicator WC1 is electrically mounted on the circuit board 52C of the controller 52. The wireless communicator WC1 is electrically connected to the processor 52P and the memory 52M through the circuit board 52C and the system bus 52B. The wireless communicator WC1 is configured to transmit, to the controller 52, the control signal CS transmitted from the operating device 13. The wireless communicator WC1 includes a signal transmitting circuit, a signal receiving circuit, and an antenna. The additional wireless communicator WC2 includes a signal transmitting circuit, a signal receiving circuit, and an antenna. Thus, the wireless communicator WC1 can also be referred to as a wireless communication circuit or circuitry. The additional wireless communicator WC2 substantially the same structure as that of the wireless communicator WC1. Thus, the additional wireless communicator WC2 can also be referred to as an additional wireless communication circuit or circuitry.

The rider-posture changing device 12 further comprises an informing device 56. The informing device 56 is configured to inform a user of information relating to the rider-posture changing device 12. The informing device 56 is configured to be electrically connected to the controller 52 and the wireless communicator WC1. The informing device 56 is electrically mounted on the circuit board 52C. Examples of the information relating to the rider-posture changing device 12 include a communication status of the wireless communicator WC1.

In the present embodiment, the informing device 56 includes a light emitting unit configured to emit light indicating the information relating to the rider-posture changing device 12. The light emitting unit includes a light-emitting diode (LED). However, the informing device 56 can include other devices instead of or in addition to the light emitting unit.

The rider-posture changing device 12 further comprises an electric power source PS1. The electric power source PS1 is configured to supply electric power to the rider-posture changing device 12. The electric power source PS1 is configured to be electrically connected to the actuator 44, the controller 52, the wireless communicator WC1, and the informing device 56. The electric power source PS1 is configured to supply electric power to the actuator 44, the controller 52, the wireless communicator WC1, and the informing device 56.

The operating device 13 includes an electric power source PS2. The electric power source PS2 is configured to supply electric power to the signal controller 54 and the additional wireless communicator WC2. The electric power source PS2 is configured to be electrically connected to the signal controller 54 and the additional wireless communicator WC2.

The control system 10 includes an electric power source PS3 and an electric wiring structure WS. The electric power source PS3 is configured to supply electric power to the rider-posture changing device 12 and the operating device 13 through the electric wiring structure WS. Examples of the electric power sources PS1, PS2, and PS3 includes a primary battery and a secondary battery.

The rider-posture changing device 12 includes a wired communicator WD1 and a connection port CP1. The wired communicator WD1 is configured to communicate with other wired communicators through a wired communication channel. The connection port CP1 is configured to be electrically connected with an electric cable EC1 included in the electric wiring structure WS. The connection port CP1 is configured to receive electric power from the electric power source PS3 through the electric cable EC1.

The operating device 13 includes an additional wired communicator WD2 and an additional connection port CP2. The additional wired communicator WD2 is configured to communicate with other wired communicators through a wired communication channel. The additional connection port CP2 is configured to be electrically connected with an additional electric cable EC2 included in the electric wiring structure WS. The wired communicator WD1 is configured to communicate with the additional wired communicator WD2 through the wired communication channel constituted by the electric cables EC1 and EC2. The additional connection port CP2 is configured to receive electric power from the electric power source PS3 through the additional electric cable EC2.

The wired communicator WD1 and the additional wired communicator WD2 are configured to communicate with each other using power line communication technology. The electric wiring structure WS includes a ground line and a voltage line that are detachably connected to a serial bus that is formed by communication interfaces. Electric power is supplied from the rider-posture changing device 12 and the operating device 13 via the voltage line. In the present embodiment, the rider-posture changing device 12 and the operating device 13 can all communicate with each other through the voltage line using the power line communication technology.

Power line communication (PLC) carries data on a conductor that is also used simultaneously for electric power transmission or electric power distribution to electric components. The PLC uses unique identifying information such as a unique identifier that is assigned to each of the rider-posture changing device 12 and the operating device 13. Based on the unique identifying information, each of the wired communicator WD1 and the additional wired communicator WD2 can recognize control signals which are necessary for itself among control signals transmitted via the included in the electric wiring structure WS.

If the wired communicator WD1 is electrically connected to the additional wired communicator WD2 through the electric wiring structure WS, the controller 52 is configured to receive the control signal CS from the operating device 13 through the electric wiring structure WS and the wired communicator WD1 without the wireless communicator WC1. If the wired communicator WD1 is not electrically connected to the additional wired communicator WD2 through the electric wiring structure WS, the controller 52 is configured to wirelessly receive the control signal CS from the operating device 13 through the wireless communicator WC1.

The rider-posture changing device 12 is configured to communicate with the operating device 13 though each of the wireless communication channel and the wired communication channel. The rider-posture changing device 12 is configured such that one of the wireless communication channel and the wired communication channel can be preferentially used over the other of the wireless communication channel and the wired communication channel. However, one of the wireless communicator WC1 and the wired communicator WD1 can be omitted from the rider-posture changing device 12 if needed and/or desired.

The actuator 44 includes a position sensor 44S, a motor driver 44D, and an additional circuit board 44C. The motor driver 44D and the wired communicator WD1 are electrically mounted on the additional circuit board 44C. The motor 48 is electrically connected to the position sensor 44S and the motor driver 44D through the additional circuit board 44C. The position sensor 44S is configured to sense that a rotational angle of the cam member 42. Examples of the position sensor 44S include a potentiometer and a rotary encoder. In the present embodiment, the position sensor 44S is configured to sense an absolute rotational position of the cam member 42. The motor driver 44D is configured to control the motor 48 based on the control signal CS and the rotational position sensed by the position sensor 44S.

The additional circuit board 44C of the actuator 44 is electrically connected to the circuit board 52C of the controller 52. The rider-posture changing device 12 includes an intermediate wiring structure 58. The additional circuit board 44C of the actuator 44 is electrically connected to the circuit board 52C of the controller 52 with the intermediate wiring structure 58.

As seen in FIG. 1, the intermediate wiring structure 58 extends in the longitudinal direction D1. As seen in FIG. 4, the first member 14 includes a groove 14H extending in the longitudinal direction D1. The intermediate wiring structure 58 is provided in the groove 14H.

As seen in FIG. 7, the controller 52 is configured to generate an open command CM1 based on the control signal CS and additional information. The motor driver 44D is configured to control the motor 48 to move the valve member 17 from the closed position P10 to the open position P11 in response to the open command CM1. The controller 52 is configured to generate a close command CM2 based on the control signal CS and additional information. The motor driver 44D is configured to control the motor 48 to move the valve member 17 from the open position P11 to the closed position P10 in response to the close command CM2.

As seen in FIG. 2, the rider-posture changing device 12 for the human-powered vehicle 2 comprises a detector 59. The detector 59 is configured to detect position information FP of the second member 16 relative to the first member 14. The position information FP includes at least one of first information F1 and second information F3. The first information F1 indicates whether the second member 16 reaches a reference absolute position AP1 or not. The second information F3 indicates a movement distance MD of the second member 16 from a reference position RP in the longitudinal direction D1.

In the present embodiment, the position information FP includes the first information F1, the second information F3, and first additional information F2. The first additional information F2 indicates whether the second member 16 reaches an additional reference absolute position AP2 or not. However, the first additional information F2 can be omitted from the position information FP. One of the first information F1 and the second information F3 can be omitted from the position information FP.

The detector 59 includes a first detector 60. The first detector 60 is configured to detect the first information F1 indicating whether the second member 16 reaches the reference absolute position AP1 or not. The controller 52 is configured to store the reference absolute position AP1. In the present embodiment, the reference absolute position AP1 is substantially coincident with the first mechanical limit ML1. However, the reference absolute position AP1 can be offset from the first mechanical limit ML1.

The detector 59 includes a first additional detector 62. The first additional detector 62 is configured to detect first additional information F2 indicating whether the second member 16 reaches the additional reference absolute position AP2 or not. The additional reference absolute position AP2 is spaced apart from the reference absolute position AP1 in the longitudinal direction D1. The controller 52 is configured to store the additional reference absolute position AP2. In the present embodiment, the additional reference absolute position AP2 is substantially coincident with the second mechanical limit ML2. However, the additional reference absolute position AP2 can be offset from the second mechanical limit ML2.

The detector 59 includes a second detector 64. The second detector 64 is configured to detect the second information F3 indicating the movement distance MD of the second member 16 from the reference position RP in the longitudinal direction D1. In the present embodiment, the second detector 64 is configured to periodically detect a movement distance MD1 of the second member 16 per unit of time T1 (e.g., 100 msec). The movement distance MD is a total of the movement distances MD1 which are detected from a timing at which the second member 16 is in the reference position RP. The controller 52 is configured to store the second information F3 and the reference position RP. The controller 52 is configured to periodically store the latest movement distance MD1. The reference position RP can be one of the reference absolute position AP1 and the additional reference absolute position AP2.

The second detector 64 is configured to detect a moving direction of the second member 16 relative to the first member 14 in addition to the movement distance MD of the second member 16. Namely, the second information F3 indicate the movement distance MD and the moving direction of the second member 16 relative to the first member 14. The second detector 64 is configured to detect a first moving direction D31 of the second member 16 when the second member 16 is moved relative to the first member 14 toward the additional reference absolute position AP2. The second detector 64 is configured to detect a second moving direction D32 of the second member 16 when the second member 16 is moved relative to the first member 14 toward the reference absolute position AP1. The second moving direction D32 is an opposite direction of the first moving direction D31. The first moving direction D31 and the second moving direction D32 are parallel to the longitudinal direction D1.

The second detector 64 is configured to detect the movement distance MD as a positive value when the second detector 64 detects the first moving direction D31. The second detector 64 is configured to detect the movement distance MD as a negative value when the second detector 64 detects the second moving direction D32. Thus, the first moving direction D31 is a positive direction of the movement distance MD of the second member 16 relative to the first member 14. The second moving direction D32 is a negative direction of the movement distance MD of the second member 16 relative to the first member 14. The second detector 64 is configured to obtain the second information F3 by integrating the detected movement distance MD (the positive value and/or the negative value) of the second member 16 until the second information F3 is reset to zero. The relationship between the moving direction and the positive or negative value can be changed by setting, for example.

The controller 52 is configured to obtain a current position CP of the second member 16 relative to the first member 14 based on the second information F3 and the reference position RP. The controller 52 is configured to add the second information F3 to the reference position RP to obtain the current position CP. The controller 52 is configured to store the calculated current position CP.

Figure 8:
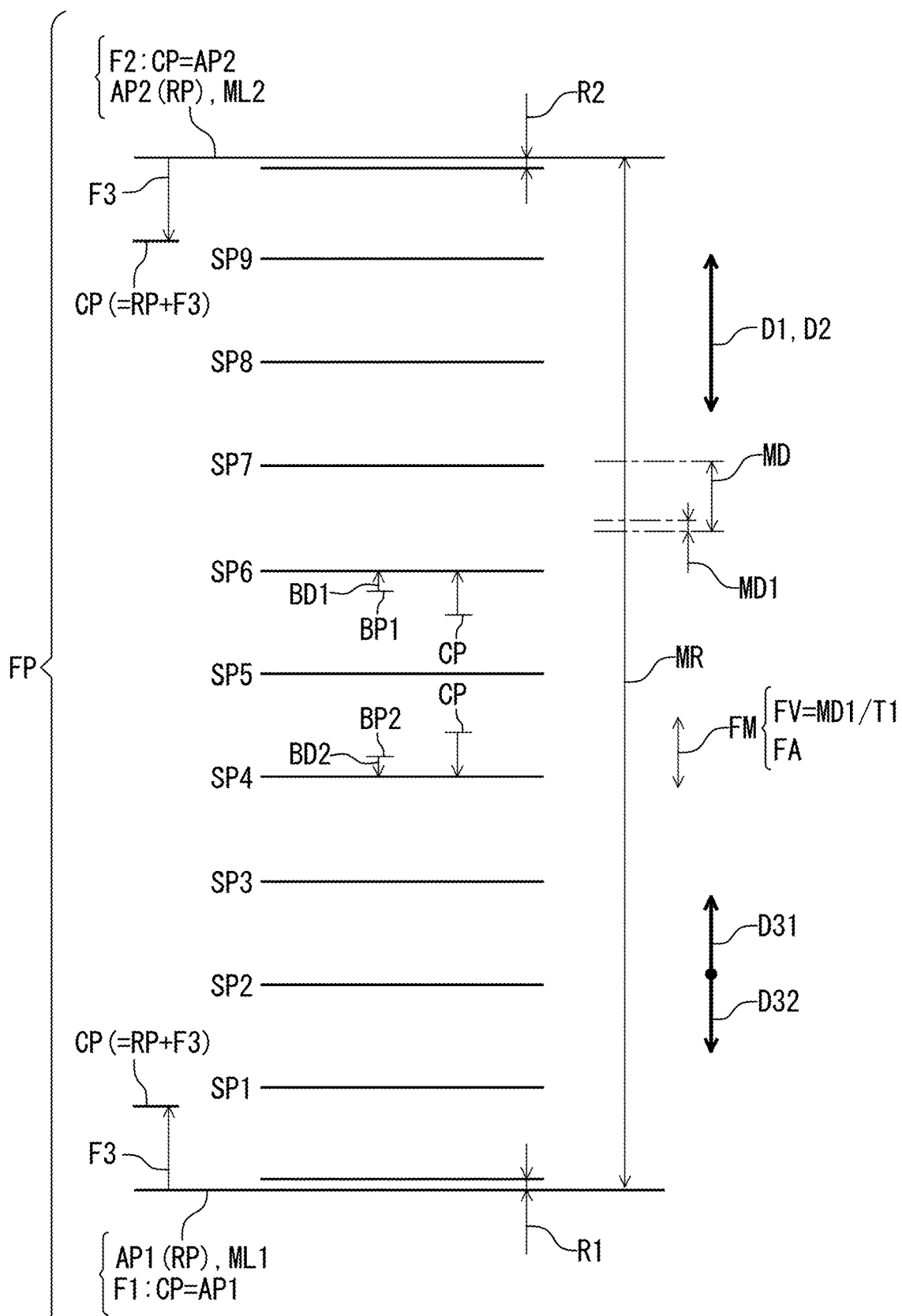
FIG. 8 is a schematic diagram indicating positions defined in the rider-posture changing device illustrated in FIG. 1.

As seen in FIG. 8, the controller 52 is configured to obtain movement information FM of the second member 16 relative to the first member 14 based on the position information FP. The movement information FM includes at least one of velocity information FV of the second member 16 relative to the first member 14 and acceleration information FA of the second member 16 relative to the first member 14. In the present embodiment, the movement information FM includes the velocity information FV of the second member 16 relative to the first member 14. The movement information FM includes the acceleration information FA. However, the movement information FM can include only one of the velocity information FV and the acceleration information FA.

The controller 52 is configured to calculate the movement information FM in accordance with the second information F3. The controller 52 is configured to calculate the movement information FM based on the movement distance MD of the second member 16 from the reference position RP in the longitudinal direction D1. The controller 52 is configured to add the movement distances MD1 periodically detected per unit of time T1 to obtain the movement distance MD from the reference position RP.

The controller 52 is configured to periodically obtain the velocity information FV by dividing an absolute value of the movement distance MD1 by the unit of time T1 (e.g., 100 msec). Namely, the velocity information FV indicates a moving velocity of the second member 16 relative to the first member 14. The controller 52 is configured to periodically store the latest velocity information FV.

The controller 52 is configured to periodically obtain the acceleration information FA by differentiating the velocity information FV with respect to time. Namely, the acceleration information FA indicates acceleration of the second member 16. The controller 52 is configured to periodically store the latest acceleration information FA.

As seen in FIG. 8, the controller 52 is configured to store the reference absolute position AP1 as the reference position RP in accordance with the first information F1. The controller 52 is configured to store the reference absolute position AP1 as the reference position RP if the first information F1 indicates that the second member 16 is in a position within a predetermined range R1 including the reference absolute position AP1.

In the present embodiment, the controller 52 is configured to conclude that the second member 16 reaches the reference absolute position AP1 if the second member 16 is in a position within the predetermined range R1. The controller 52 is configured to store the reference absolute position AP1 as the reference position RP if the second member 16 is in a position within the predetermined range R1. The reference absolute position AP1 is in an end of the predetermined range R1. However, the reference absolute position AP1 can be defined in a position other than the end of the predetermined range R1. The predetermined range R1 can be defined as only the reference absolute position AP1.

The controller 52 is configured to reset the second information F3 in accordance with the first information F1. The controller 52 is configured to reset the second information F3 if the first information F1 indicates that the second member 16 is in a position within the predetermined range R1 including the reference absolute position AP1. The reference absolute position AP1 is provided in the predetermined range R1. The controller 52 is configured to reset the second information F3 to zero if the first information F1 indicates that the second member 16 is in a position within the predetermined range R1. Thus, if the first information F1 indicates that the second member 16 is in a position within the predetermined range R1 including the reference absolute position AP1, the controller 52 is configured to add the second information F3 to the reference absolute position AP1 to obtain the current position CP.

The controller 52 is configured to store the additional reference absolute position AP2 as the reference position RP in accordance with the first additional information F2. The controller 52 is configured to store the additional reference absolute position AP2 as the reference position RP if the first information F1 indicates that the second member 16 is in a position within an additional predetermined range R2 including the additional reference absolute position AP2. The additional predetermined range R2 is spaced apart from the predetermined range R1 in the longitudinal direction D1.

In the present embodiment, the controller 52 is configured to conclude that the second member 16 reaches the additional reference absolute position AP2 if the second member 16 is in a position within the additional predetermined range R2. The controller 52 is configured to store the additional reference absolute position AP2 as the reference position RP if the second member 16 is in a position within the additional predetermined range R2. The additional reference absolute position AP2 is in an end of the additional predetermined range R2. However, the additional reference absolute position AP2 can be defined in a position other than the end of the additional predetermined range R2. The additional predetermined range R2 can be defined as only the additional reference absolute position AP2.

The controller 52 is configured to reset the second information F3 in accordance with the first additional information F2. The controller 52 is configured to reset the second information F3 if the first information F1 indicates that the second member 16 is in a position within the additional predetermined range R2 including the additional reference absolute position AP2. The additional reference absolute position AP2 is provided in the additional predetermined range R2. The controller 52 is configured to reset the second information F3 to zero if the first information F1 indicates that the second member 16 is in a position within the additional predetermined range R2 including the additional reference absolute position AP2. Thus, if the first additional information F2 indicates that the second member 16 is in a position within the additional predetermined range R2 including the additional reference absolute position AP2, the controller 52 is configured to add the second information F3 to the additional reference absolute position AP2 to obtain the current position CP.

The movable range MR includes a plurality of stop positions SP1 to SP9 in which the controller 52 is configured to control the actuator 44 to stop the second member 16 relative to the first member 14. The controller 52 is configured to control the actuator 44 to stop the second member 16 relative to the first member 14 when the second member 16 reaches one of the plurality of stop positions SP1 to SP9. The reference absolute position AP1, the additional reference absolute position AP2, and the plurality of stop positions SP1 to SP9 are arranged at regular intervals in the longitudinal direction D1. A total number of the stop positions SP1 to SP9 is not limited to the present embodiment.

As seen in FIG. 1, the rider-posture changing device 12 further comprises a first detection object 70. The first detection object 70 is provided to at least one of the first member 14 and the second member 16. The first detector 60 is configured to detect the first detection object 70 to obtain the first information F1. The first detector 60 includes a non-contact detector configured to detect the first detection object 70 to obtain the first information F1 without contacting the first detection object 70. In the present embodiment, the first detector 60 is provided to the first member 14. The first detection object 70 is provided to the second member 16. The first detection object 70 is provided on an outer peripheral surface of the second member 16. However, the first detector 60 and the first detection object 70 can be provided to other portions of the rider-posture changing device 12. The first detector 60 can include other detectors such as a contact detector.

Figure 9:
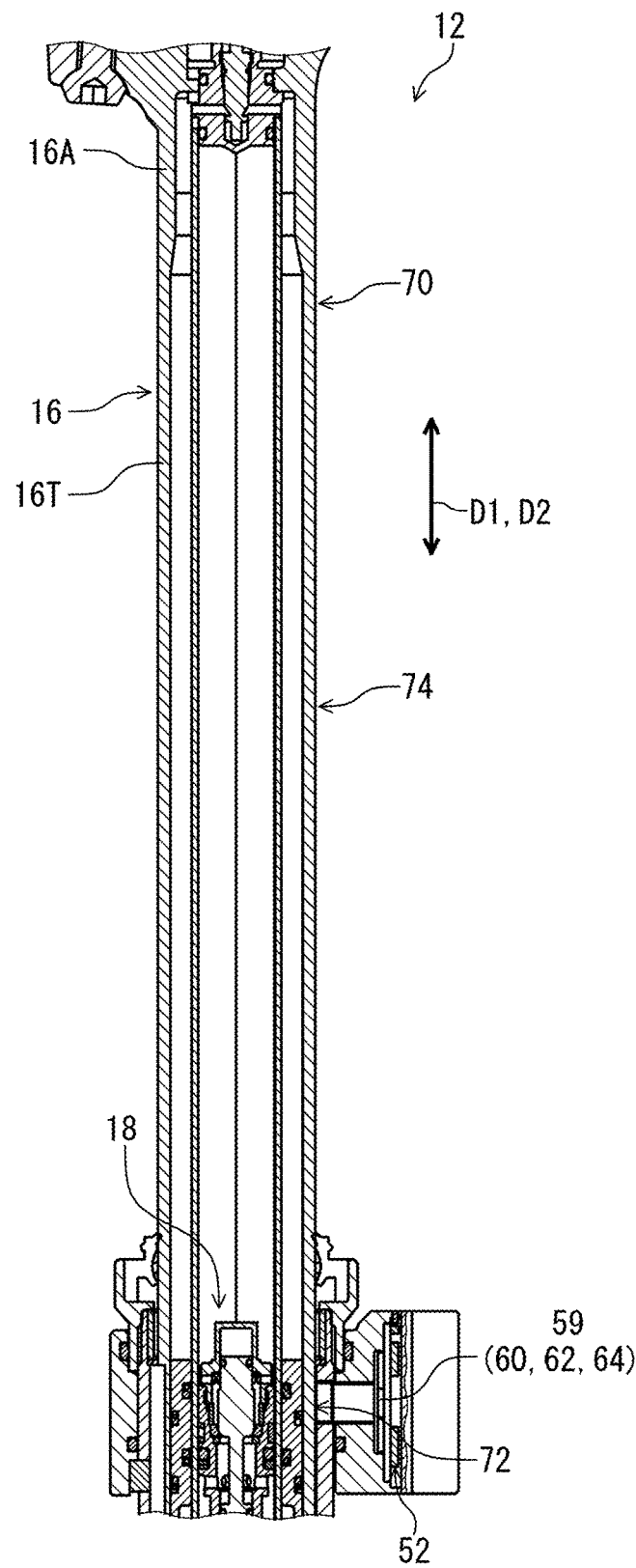
FIG. 9 is a partial cross-sectional view of the rider-posture changing device illustrated in FIG. 1.

As seen in FIG. 9, the rider-posture changing device 12 further comprises a first additional detection object 72. The first additional detection object 72 is provided to at least one of the first member 14 and the second member 16. The first additional detector 62 is configured to detect the first additional detection object 72 to obtain the first additional information F2. The first additional detector 62 includes a non-contact detector configured to detect the first additional detection object 72 to obtain the first additional information F2 without contacting the first additional detection object 72. In the present embodiment, the first additional detector 62 is provided to the first member 14. The first additional detection object 72 is provided to the second member 16. The first additional detection object 72 is provided on the outer peripheral surface of the second member 16. However, the first additional detector 62 and the first additional detection object 72 can be provided to other portions of the rider-posture changing device 12. The first additional detector 62 can include other detectors such as a contact detector.

As seen in FIG. 1, the rider-posture changing device 12 further comprises a second detection object 74. The second detection object 74 is provided to at least one of the first member 14 and the second member 16. The second detector 64 is configured to detect the second detection object 74 to obtain the second information F3. The second detector 64 includes a non-contact detector configured to detect the second detection object 74 to obtain the second information F3 without contacting the second detection object 74. In the present embodiment, the second detector 64 is provided to the first member 14. The second detection object 74 is provided to the second member 16. The second detection object 74 is provided on the outer peripheral surface of the second member 16. However, the second detector 64 and the second detection object 74 can be provided to other portions of the rider-posture changing device 12. The second detector 64 can include other detectors such as a contact detector.

Figure 10:
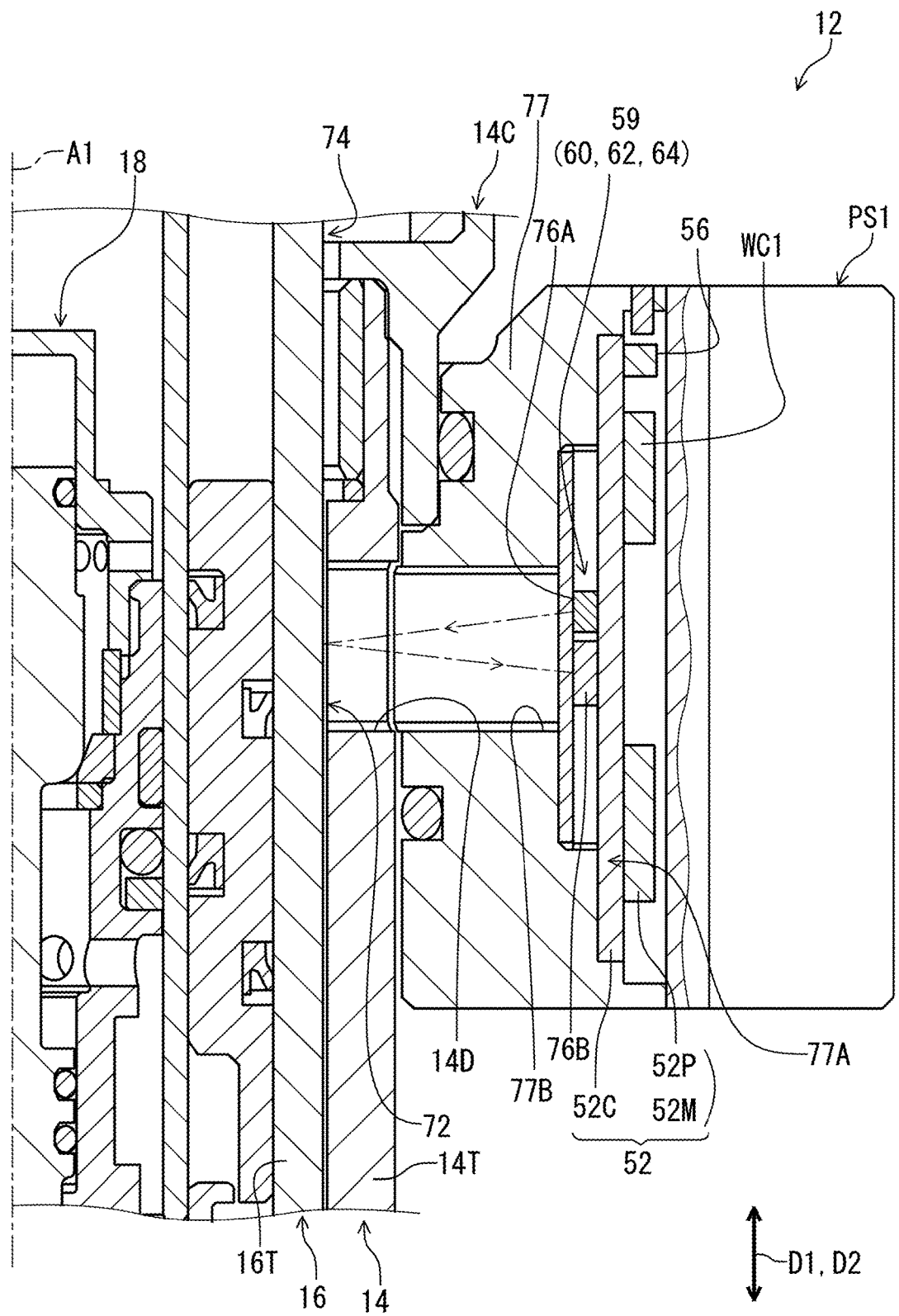
FIG. 10 is a partial cross-sectional view of the rider-posture changing device illustrated in FIG. 1.

As seen in FIG. 10, in the present embodiment, the first detector 60 and the second detector 64 are integrally provided with each other as a single unit. The first detector 60, the first additional detector 62, and the second detector 64 are integrally provided with each other as a single unit. However, at least one of the first detector 60, the first additional detector 62, and the second detector 64 can be a separate unit from another.

The first detector 60, the first additional detector 62, and the second detector 64 constitute an optical sensor. The detector 59 is configured to detect a movement distance MD and a moving direction of the second member 16 relative to the first member 14. Examples of the detector 59 include an optical tracking sensor. The detector 59 includes a light emitter 76A and a light receiver 76B. The light emitter 76A is configured to emit light to the second member 16. For example, the light emitter 76A includes a laser unit configured to emit laser light. The light receiver 76B is configured to receive light reflected by one of the first detection object 70 (see, e.g., FIG. 9), the first additional detection object 72, and the second detection object 74. The light receiver 76B is configured to periodically generate image data based on light reflected by one of the first detection object 70 (see, e.g., FIG. 9), the first additional detection object 72, and the second detection object 74. The light receiver 76B is configured to periodically compare image data to obtain the movement distance MD and the moving direction of the second member 16 per unit time. For example, the light receiver 76B includes an image sensor and an image processor. The image sensor is configured to convert light to signals. The image processor is configured to convert the signals of the image sensor to image data and compare image data to obtain the movement distance MD and the moving direction of the second member 16 per unit time. Examples of the image sensor include a CMOS image sensor and a CCD image sensor. The controller 52 is configured to periodically receive the movement distance MD and the moving direction from the light receiver 76B.

The rider-posture changing device 12 includes a mounting member 77 mounted to the first member 14. The mounting member 77 is secured to an outer peripheral surface of the first member 14. The mounting member 77 includes a recess 77A. The first detector 60, the first additional detector 62, the second detector 64, the controller 52, the wireless communicator WC1, and the informing device 56 are provided in the recess 77A of the mounting member 77. The circuit board 52C is secured to the mounting member 77.

The first member 14 includes a first opening 14D provided radially outward of the second member 16. The mounting member 77 includes a second opening 77B. The second opening 77B connects the recess 77A to the first opening 14D. The light emitted from the light emitter 74A passes through the second opening 77B and the first opening 14D. The light reflected by one of the first detection object 70, the first additional detection object 72, and the second detection object 74 passes through the first opening 14D and the second opening 77B.

As seen in FIG. 9, for example, the first detection object 70 includes a first detection pattern such that the light receiver 76B detects the first information F1 indicating the second member 16 reaches the reference absolute position AP1. The first additional detection object 72 includes a first additional pattern such that the light receiver 76B detects the first additional information F2 indicating the second member 16 reaches the additional reference absolute position AP2. For example, the first pattern of the first detection object 70 is different from the first additional pattern of the first additional detection object 72.

In the present embodiment, the first pattern of the first detection object 70 includes a low-reflection part configured not to reflect light emitted from the light emitter 76A. The first additional pattern of the first additional detection object 72 includes a low-reflection part configured not to reflect light emitted from the light emitter 76A. The low-reflection part of the first detection object 70 has a reflection ratio different from a reflection ratio of the low-reflection part of the first additional detection object 72. Thus, the light receiver 76B is configured to separately detect each of the first information F1 and the first additional information F2.

The second detection object 74 includes a second pattern such that the light receiver 76B detects the movement distance MD and the moving direction of the second member 16. The second patter of the second detection object 74 is different from the first pattern of the first detection object 70 and the first additional pattern of the first additional detection object 72. A reflection ratio of the second detection object 74 is higher than the reflection ratio of the first detection object 70 and the reflection ratio of the first additional detection object 72. The light receiver 76B is configured to detect the movement distance MD and the moving direction of the second member 16 based on difference between images periodically generated based on light reflected by the second detection object 74.

As seen in FIGS. 11 to 15, the controller 52 is configured to determine at least one of malfunction of the detector 59 and unusual relative movement between the first member 14 and the second member 16. The controller 52 is configured to determine malfunction of the hydraulic structure 18. The controller 52 is configured to compare the movement information FM with a predetermined value to determine at least one of the malfunction of the detector 59 and the unusual relative movement between the first member 14 and the second member 16. The controller 52 is configured to inform a user of the at least one of the malfunction of the detector 59 and the unusual relative movement between the first member 14 and the second member 16 if the movement information FM is lower than the predetermined value.

In the present embodiment, the controller 52 is configured to determine the malfunction of the detector 59 and the unusual movement of the second member 16 relative to the first member 14. The controller 52 is configured to compare the movement information FM with a predetermined value to determine the malfunction of the detector 59. The controller 52 is configured to compare the movement information FM with a predetermined value to determine the unusual movement of the second member 16. The controller 52 is configured to inform a user of the at least one of the malfunction of the detector 59 and the unusual relative movement between the first member 14 and the second member 16 if the movement information FM is lower than the predetermined value.

Figure 11:
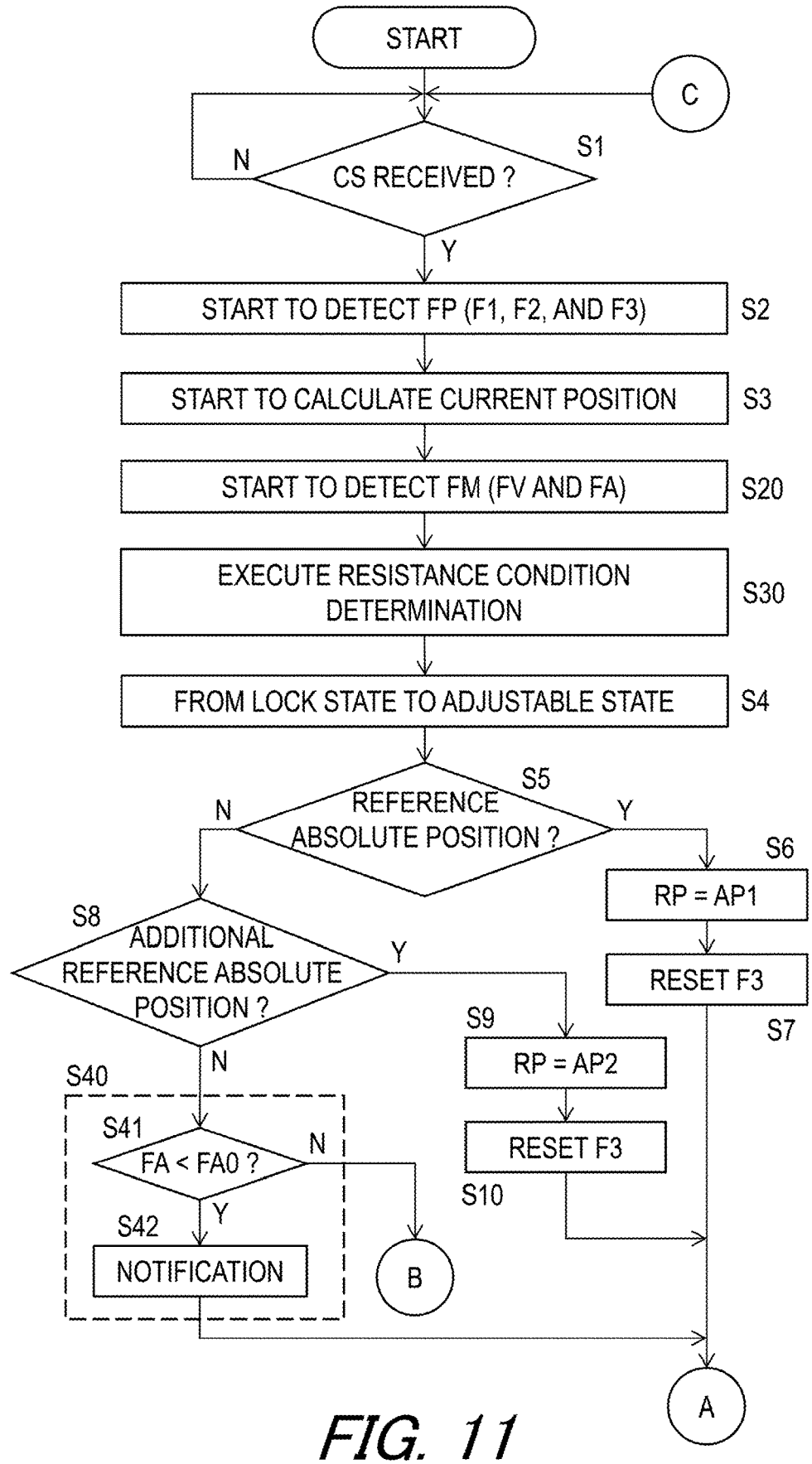
FIGS. 11 to 15 are flow charts of the rider-posture changing device illustrated in FIG. 1.

The controller 52 is configured to execute a detector malfunction determination (step S40 in FIG. 11). In the detector malfunction determination, the controller 52 is configured to determine whether the first detector 60 normally detects the first detection object 70 and/or whether the first additional detector 62 normally detects the first additional detection object 72. For example, the first detector 60 may fail to detect the first detection object 70 if the first detection object 70 gets dirty and/or is at least partially removed. The first additional detector 62 may fail to detect the first additional detection object 72 if the first additional detection object 72 gets dirty and/or is at least partially removed. The controller 52 is configured to determine whether the first detector 60 normally detects the first detection object 70 based on the acceleration information FA.

When the second member 16 reaches the first mechanical limit ML1 (see, e.g., FIG. 8) corresponding to the first detection object 70, the second member 16 stops moving relative to the first member 14. Thus, the velocity information FV and the acceleration information FA are almost zero when the second member 16 reaches the first mechanical limit ML1. The controller 52 is configured to conclude that the first detector 60 can normally detect the first detection object 70 if the acceleration information FA is equal to or higher than a predetermined value FA0. The controller 52 is configured to conclude that the first detector 60 fails to detect the first detection object 70 if the acceleration information FA is lower than the predetermined value FA0.

As with the first detector 60, when the second member 16 reaches the second mechanical limit ML2 (see, e.g., FIG. 8) corresponding to the first additional detection object 72, the second member 16 stops moving relative to the first member 14. Thus, the velocity information FV and the acceleration information FA are almost zero when the second member 16 reaches the second mechanical limit ML2. The controller 52 is configured to conclude that the first additional detector 62 can normally detect the first additional detection object 72 if the acceleration information FA is equal to or higher than the predetermined value FA0. The controller 52 is configured to conclude that the first additional detector 62 fails to detect the first additional detection object 72 if the acceleration information FA is lower than the predetermined value FA0.

The controller 52 is configured to control the actuator 44 based on the movement information FM. The controller 52 is configured to control the actuator 44 to change the state of the state of the hydraulic structure 18 from the adjustable state to the lock state if the controller 52 concludes that the first detector 60 fails to detect the first detection object 70. The controller 52 is configured to control the actuator 44 to change the state of the state of the hydraulic structure 18 from the adjustable state to the lock state if the controller 52 concludes that the first additional detector 62 fails to detect the first additional detection object 72.

Figure 14:
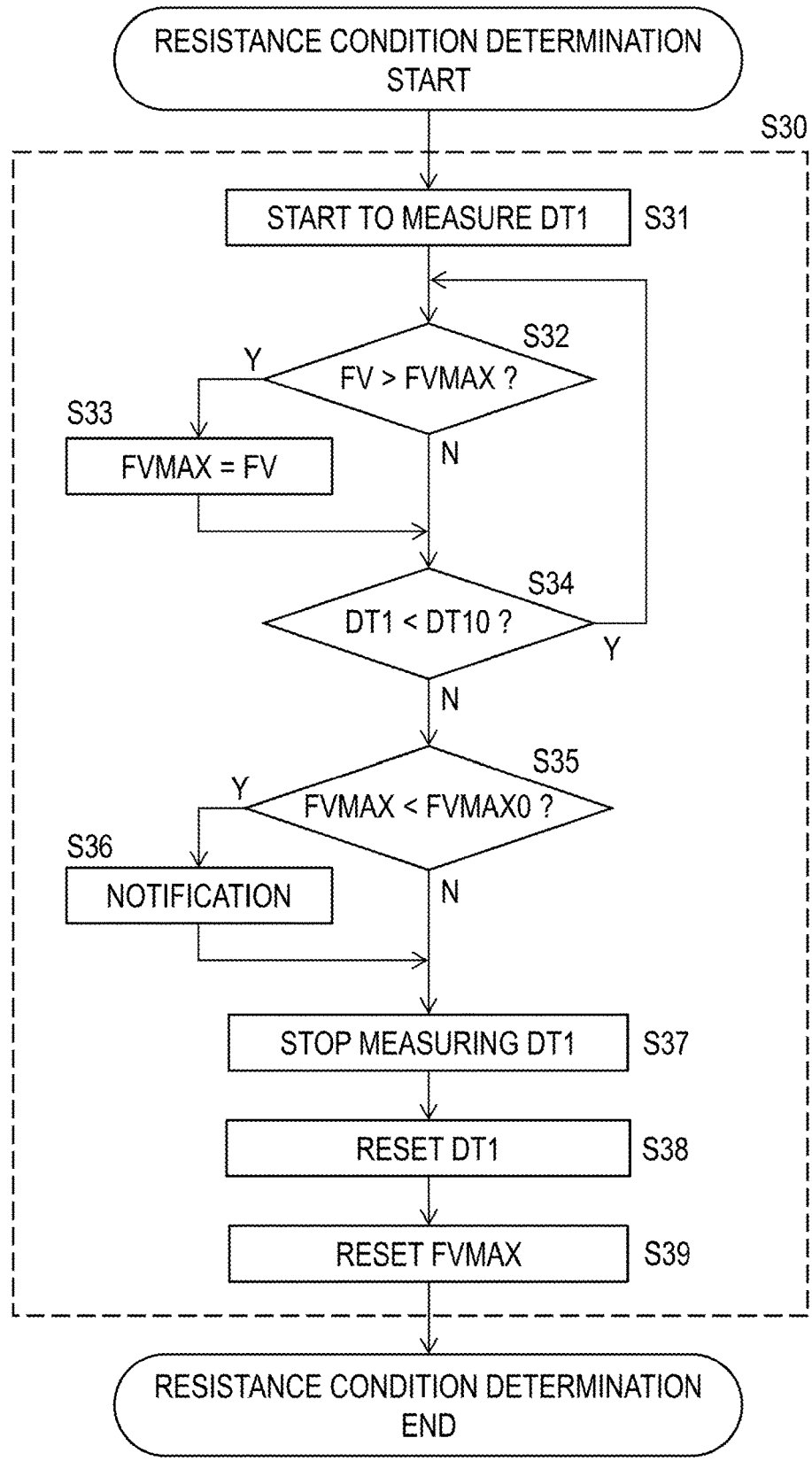

The controller 52 is configured to execute a resistance condition determination (step S30 in FIGS. 11 and 14). In the resistance condition determination, the controller 52 is configured to determine the unusual relative movement exists between the first member 14 and the second member 16. In the present embodiment, the controller 52 is configured to determine whether resistance occurring between the first member 14 and the second member 16 when the first member 14 and the second member 16 relatively moves exceeds a predetermined level. For example, the resistance exceeds the predetermined level when the first member 14 and the second member 16 relatively moves in the longitudinal direction D1 in a state where an internal pressure in the hydraulic structure 18 reduces and/or where foreign materials are attached to a sealing portion between the first member 14 and the second member 16. The velocity information FV of the second member 16 relative to the first member 14 gets lower if the resistance exceeds the predetermined level when the second member 16 moves relative to the first member 14 in the longitudinal direction D1. Thus, the controller 52 is configured to determine whether the resistance exceeds the predetermined level based on the velocity information FV. The controller 52 is configured to conclude that the resistance does not exceed the predetermined level if the velocity information FV is equal to or higher than a predetermined value FVMAX0. The controller 52 is configured to conclude that the resistance exceeds the predetermined level if the velocity information FV is lower than the predetermined value FVMAX0.

Figure 12:
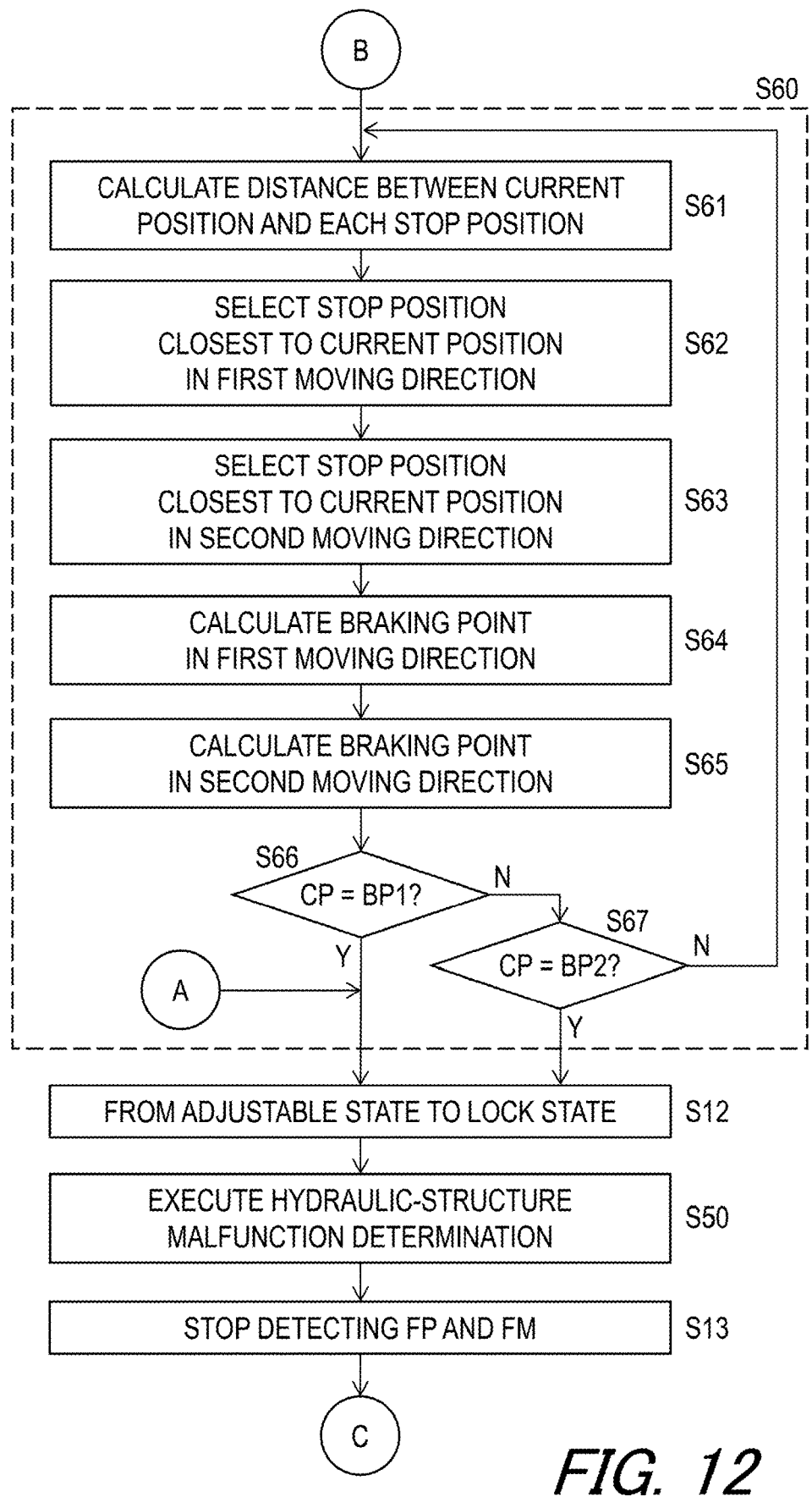
Figure 15:
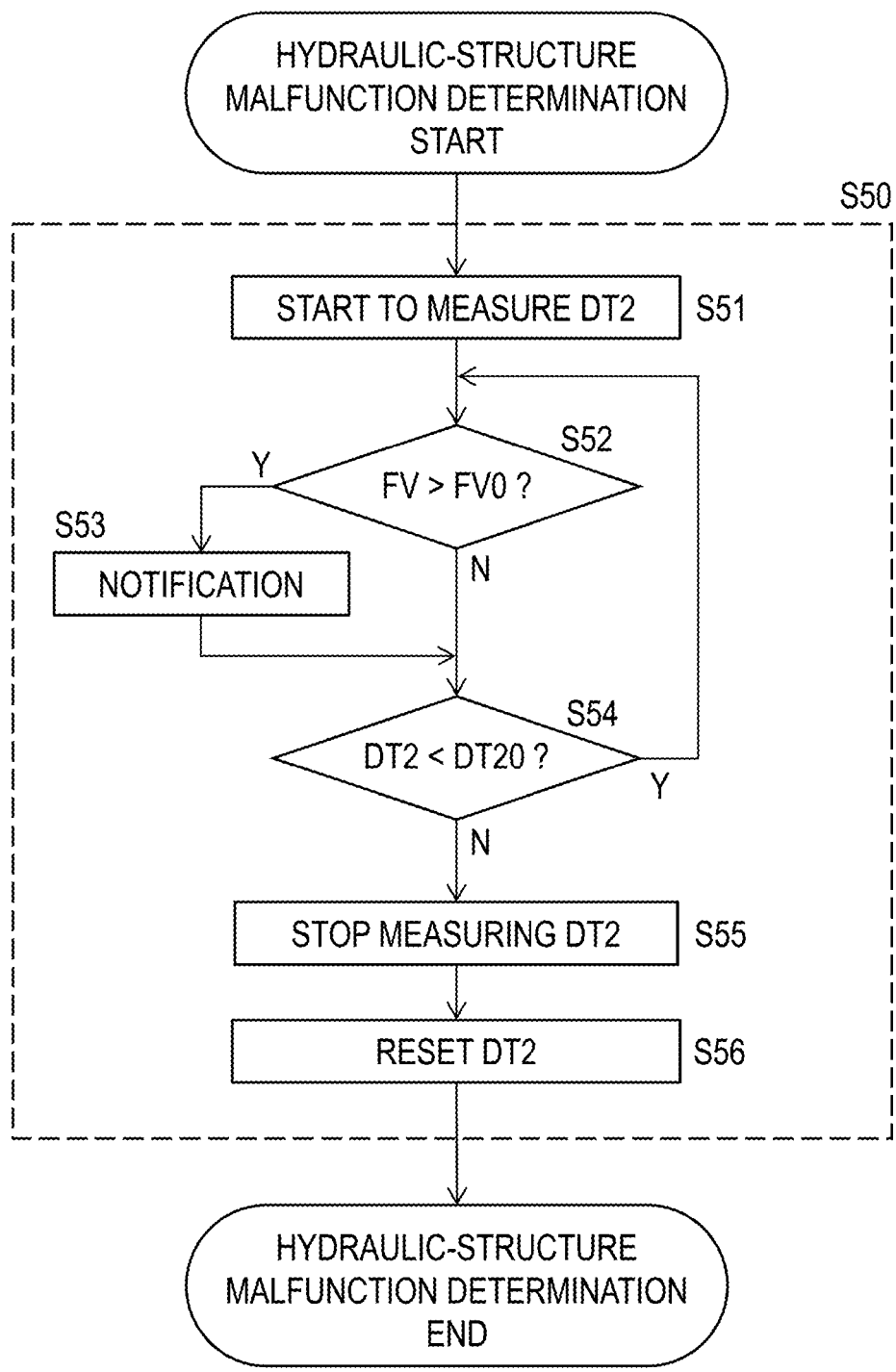

The controller 52 is configured to execute a hydraulic-structure malfunction determination (step S50 in FIGS. 12 and 15). In the hydraulic-structure malfunction determination, the controller 52 is configured to determine whether air is in at least one of the first hydraulic chamber C1, the second hydraulic chamber C2, the valve chamber C3, the first intermediate chamber C5, and the second intermediate chamber C6 (see, e.g., FIG. 3). If air is in at least one of the first hydraulic chamber C1, the second hydraulic chamber C2, the valve chamber C3, the first intermediate chamber C5, and the second intermediate chamber C6, such air serves as a spring and causes the first member 14 and the second member 16 to move relatively even when the hydraulic structure 18 is in the lock state.

The controller 52 is configured to determine whether the hydraulic structure 18 is in such conditions based on the velocity information FV in the lock state. The controller 52 is configured to conclude that the hydraulic structure 18 normally functions if the movement information FM is equal to or lower than a predetermined value FV0 in the lock state. The controller 52 is configured to conclude that air is not in at least one of the hydraulic chambers if the velocity information FV is equal to or lower than the predetermined value FV0 in the lock state. The controller 52 is configured to conclude that the hydraulic structure 18 malfunctions if the movement information FM is in a predetermined range in the lock state. The controller 52 is configured to conclude that the hydraulic structure 18 malfunctions if the movement information FM is larger than the predetermined value FV0 in the lock state. The controller 52 is configured to conclude that air is in at least one of the hydraulic chambers if the velocity information FV is higher than the predetermined value FV0 in the lock state.

The controller 52 is configured to inform the user of the results of the detector malfunction determination, the resistance condition determination, and the hydraulic-structure malfunction determination. Specifically, the informing device 56 is configured to inform the user of the results of the resistance condition determination, the detector malfunction determination, and the hydraulic-structure malfunction determination. The controller 52 is configured to control the informing device 56 to inform the user of the results of the resistance condition determination, the detector malfunction determination, and the hydraulic-structure malfunction determination based on the determination results of the resistance condition determination, the detector malfunction determination, and the hydraulic-structure malfunction determination.

The controller 52 is configured to leave the informing device 56 turned off when the controller 52 concludes that the first detector 60 can normally detect the first detection object 70 and/or that the first additional detector 62 can normally detect the first additional detection object 72. The controller 52 is configured to control the informing device 56 to emit first light when the controller 52 concludes that the first detector 60 likely fails to detect the first detection object 70 and/or that the first additional detector 62 likely fails to detect the first additional detection object 72.

The controller 52 is configured to leave the informing device 56 turned off when the controller 52 concludes that the resistance does not exceed the predetermined level. The controller 52 is configured to control the informing device 56 to emit second light when the controller 52 concludes that the resistance exceeds the predetermined level.

The controller 52 is configured to leave the informing device 56 turned off when the controller 52 concludes that air is not in at least one of the hydraulic chambers of the hydraulic structure 18. The controller 52 is configured to control the informing device 56 to emit third light when the controller 52 concludes that air is in at least one of the hydraulic chambers of the hydraulic structure 18. Namely, the controller 52 is configured to inform a user of the malfunction of the hydraulic structure 18 if the movement information FM is in the predetermined range in the lock state. The controller 52 is configured to inform the user of the malfunction of the hydraulic structure 18 if the movement information FM is larger than the predetermined value FV0 in the lock state.

In the present embodiment, the first light, the second light, and the third light have manners different from each other (e.g., different colors, different flashing patterns). However, at least one of the first light, the second light, and the third light can have the same manner as another of the first light, the second light, and the third light.

The controller 52 is configured to execute a braking-point determination (step S60 in FIG. 12). In the braking-point determination, the controller 52 is configured to determine, based on the movement information FM, a timing at which the actuator 44 changes the state of the hydraulic structure 18 from the adjustable state to the lock state. The controller 52 is configured to calculate, based on the movement information FM, a position in which the actuator 44 changes the state of the hydraulic structure 18 from the adjustable state to the lock state. The controller 52 is configured to calculate, based on the velocity information FV, the position in which the actuator 44 changes the state of the hydraulic structure 18 from the adjustable state to the lock state.

In the present embodiment, the controller 52 is configured to select a first closest stop position closest to the current position CP in the first moving direction D31 from among the plurality of stop positions SP1 to SP9 (see, e.g., FIG. 8). The controller 52 is configured to select a second closest stop position closest to the current position CP in the second moving direction D32 from among the plurality of stop positions SP1 to SP9. For example, the controller 52 is configured to calculate a distance between the current position CP and each stop position of the plurality of stop positions SP1 to SP9 by subtracting each stop position of the plurality of stop positions SP1 to SP9 from the current position CP. The controller 52 is configured to select, as the first closest stop position, the stop position corresponding to the largest positive value of the distances calculated by the controller 52. The controller 52 is configured to select, as the second closest stop position, the stop position corresponding to the smallest negative value of the distances calculated by the controller 52.

The controller 52 is configured to calculate the position in which the actuator 44 changes the state of the hydraulic structure 18 from the adjustable state to the lock state based on the first or second closest stop position and the velocity information FV. The controller 52 is configured to calculate a first braking position BP1 (see, e.g., FIG. 8) in which the actuator 44 changes the state of the hydraulic structure 18 from the adjustable state to the lock state based on the first closest stop position and the velocity information FV. The controller 52 is configured to calculate a second braking position BP2 (see, e.g., FIG. 8) in which the actuator 44 changes the state of the hydraulic structure 18 from the adjustable state to the lock state based on the second closest stop position and the velocity information FV.

The controller 52 is configured to calculate a braking distance in which the second member 16 moves relative to the first member 14 from a start timing at which the actuator 44 starts to change the state of the hydraulic structure 18 from the adjustable state to the lock state to a completion timing at which the state of the hydraulic structure 18 is completely changed to the lock state. The controller 52 is configured to store a time lag defined the start timing to the completion timing. The controller 52 is configured to calculate, based on the velocity information FV and the time lag, a first braking distance BD1 (see, e.g., FIG. 8) in which the second member 16 moves relative to the first member 14 in the first moving direction D31 from the start timing to the completion timing. The controller 52 is configured to calculate, based on the velocity information FV and the time lag, a second braking distance BD2 (see, e.g., FIG. 8) in which the second member 16 moves relative to the first member 14 in the second moving direction D32 from the start timing to the completion timing.

The controller 52 is configured to obtain the first braking position BP1 by subtracting the first braking distance BD1 from the first closest stop position. The controller 52 is configured to control the actuator 44 to change the state of the hydraulic structure 18 from the adjustable state to the lock state when the current position CP is the first braking position BP1 if the hydraulic structure 18 is in the adjustable state and the second member 16 is moving in the first moving direction D31. Thus, the second member 16 can be stopped in the first closest stop position or in a position close to the first closest stop position even when the braking distance varies depending on the velocity of the second member 16.

The controller 52 is configured to obtain the second braking position BP2 by subtracting the second braking distance BD2 from the second closest stop position. The controller 52 is configured to control the actuator 44 to change the state of the hydraulic structure 18 from the adjustable state to the lock state when the current position CP is the second braking position BP2 if the hydraulic structure 18 is in the adjustable state and the second member 16 is moving in the second moving direction D32. Thus, the second member 16 can be stopped in the second closest stop position or in a position close to the second closest stop position even when the braking distance varies depending on the velocity of the second member 16.

The control executed by the controller 52 will be described below referring to FIGS. 11 to 15.

As seen in FIG. 11, the controller 52 determines whether the control signal CS is received or not (step S1). The controller 52 keeps monitoring the control signal CS if the controller 52 concludes that the control signal CS is not received (step S1). The controller 52 controls the detector 59 to start to detect the position information FP if the controller 52 concludes that the control signal CS is received (steps S1 and S2). Specifically, the controller 52 controls the detector 59 to start to detect the first information F1, the first additional information F2, and the second information F3 if the controller 52 concludes that the control signal CS is received. The controller 52 starts to calculate the current position CP based on the reference position RP and the second information F3 (step S3). Specifically, the controller 52 adds the second information F3 to the reference position RP to obtain the current position CP.

Furthermore, the controller 52 controls the detector 59 to start to detect the movement information FM if the controller 52 concludes that the control signal CS is received (steps S1 and S20). Specifically, the controller 52 controls the detector 59 to start to detect the velocity information FV and the acceleration information FA if the controller 52 concludes that the control signal CS is received.

Figure 13:
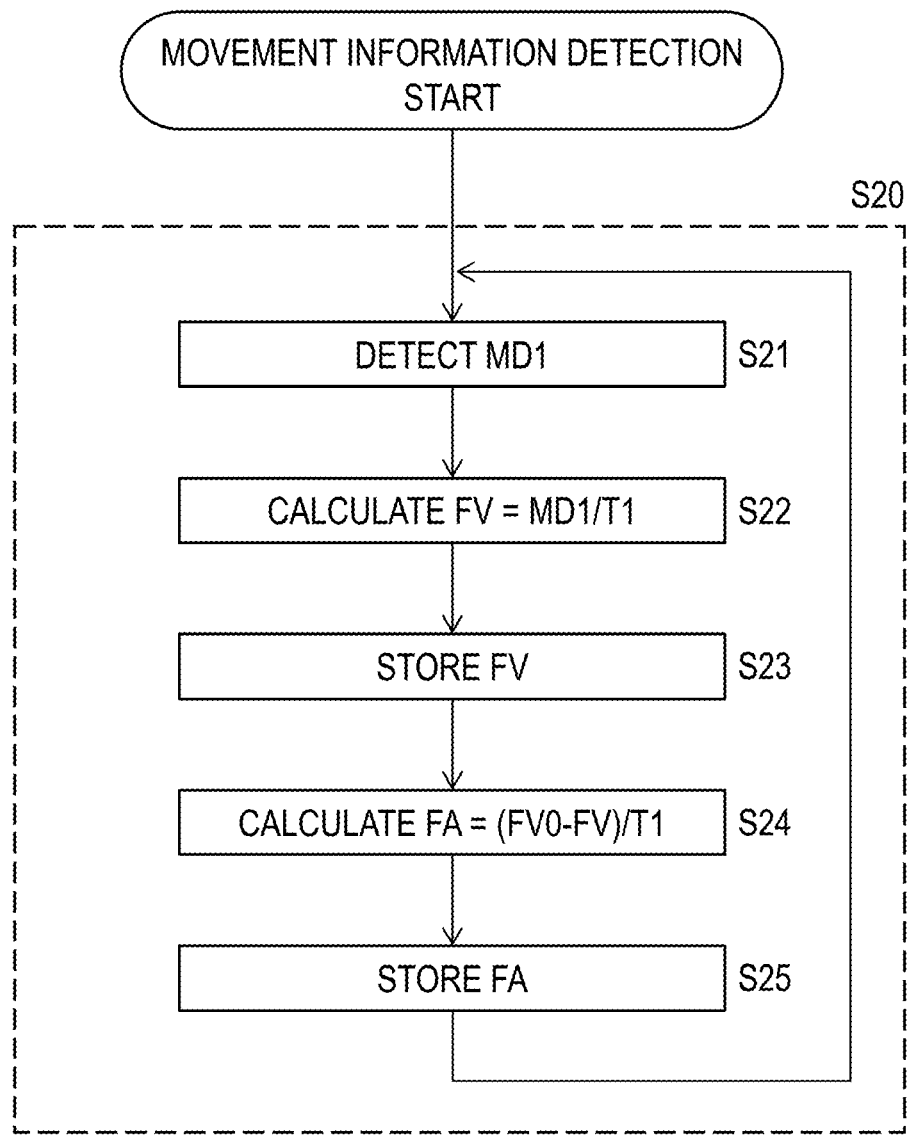

As seen in FIG. 13, in the movement information detection, the controller 52 controls the detector 59 to detect, as the second information F3, the movement distance MD1 of the second member 16 per unit of time T1 (step S21). The controller 52 calculates the velocity information FV by dividing the detected movement distance MD1 by the unit of time T1 (step S22). The controller 52 stores the calculated velocity information FV (step S23). The controller 52 calculates the acceleration information FA by the deference between the detected velocity information FV and the previous velocity information FV1 by the unit of time T1 (step S24). The controller 52 stores the calculated acceleration information FA (step S25). The controller 52 repeatedly executes the steps S21 to S25 until the completion of the hydraulic-structure malfunction determination. The movement information detection is executed concurrently with the flow charts depicted in FIGS. 11 and 12.

As seen in FIG. 11, the controller 52 executes the resistance condition determination after starting to detect the movement information FM (step S30). As seen in FIG. 14, in the resistance condition determination, the controller 52 detects a maximum value of the velocity information FV during a reference determination time DT10 (steps S31 to S34). Specifically, the controller 52 starts to measure the determination time DT1 (step S31). The controller 52 compares the velocity information FV with a maximum velocity FVMAX stored in the controller 52 (step S32). The maximum velocity FVMAX is initially set to zero. If the controller 52 concludes that the velocity information FV is higher than the maximum velocity FVMAX, the controller 52 stores the velocity information FV as the maximum velocity FVMAX, and then the controller 52 compares the determination time DT1 with the reference determination time DT10 (steps S32 to S34). If the controller 52 concludes that the velocity information FV is equal to or lower than the maximum velocity FVMAX, the controller 52 compares the determination time DT1 with the reference determination time DT10 (steps S32 and S34). The controller 52 repeatedly executes steps S32 to S34 if the determination time DT1 is shorter than the reference determination time DT10 (steps S32 to S34).

The controller 52 compares the maximum velocity FVMAX with the predetermined value FVMAX0 if the determination time DT1 is equal to or longer than the reference determination time DT10 (steps S34 and S35). If the controller 52 concludes that the maximum velocity FVMAX is lower than the predetermined value FVMAX0, the controller 52 controls the informing device 56 to inform the user of the excessive resistance, and then controls the detector 59 to stop measuring the determination time DT1 (steps S35 to S37). If the controller 52 concludes that the maximum velocity FVMAX is equal to or higher than the predetermined value FVMAX0, the controller 52 stops measuring the determination time DT1 (steps S35 and S37). The controller 52 resets the determination time DT1 to zero (step S38). The controller 52 resets the maximum velocity FVMAX to zero (step S39). The resistance condition determination is executed concurrently with the flow charts depicted in FIGS. 11 and 12.

As seen in FIG. 11, after the start of the resistance condition determination, the controller 52 controls the actuator 44 to change the state of the hydraulic structure 18 from the lock state to the adjustable state (step S4). Specifically, as seen in FIG. 3, the controller 52 controls the actuator 44 to move the valve member 17 from the closed position P10 to the open position P11. Thus, the first member 14 and the second member 16 are movable relative to each other in the longitudinal direction D1 in the adjustable state. For example, the second member 16 is moved relative to the first member 14 in the second moving direction D32 when the rider's weight is applied to the second member 16 through the saddle mounted to the saddle mounting structure MS. The second member 16 is moved relative to the first member 14 in the first moving direction D31 by the biasing force of the compressible fluid in the biasing chamber C4 when the rider's weight is released from the second member 16.

As seen in FIG. 11, the controller 52 determines whether the first detector 60 detects the first information F1 indicating the second member 16 reaches the reference absolute position AP1 or not (step S5). Specifically, the controller 52 determines whether the first detector 60 detects the first information F1 indicating the second member 16 is in a position within the predetermined range R1 including the reference absolute position AP1 or not. The controller 52 stores the reference absolute position AP1 as the reference position RP if the first information F1 indicates that the second member 16 reaches the reference absolute position AP1 (steps S5 and S6). The controller 52 resets the second information F3 if the first information F1 indicates that the second member 16 reaches the reference absolute position AP1 (steps S5 and S7). The process enters step S12 in FIG. 12.

As seen in FIG. 11, the controller 52 determines whether the first additional detector 62 detects the first additional information F2 indicating the second member 16 reaches the additional reference absolute position AP2 or not if the first information F1 does not indicate that the second member 16 reaches the reference absolute position AP1 (steps S5 and S8). Specifically, the controller 52 determines whether the first additional detector 62 detects the first additional information F2 indicating the second member 16 is in a position within the additional predetermined range R2 including the additional reference absolute position AP2 or not. The controller 52 stores the additional reference absolute position AP2 as the reference position RP if the first additional information F2 indicates that the second member 16 reaches the additional reference absolute position AP2 (steps S8 and S9). The controller 52 resets the second information F3 if the first additional information F2 indicates that the second member 16 reaches the additional reference absolute position AP2 (steps S8 and S10). The process enters step S12 in FIG. 12.

As seen in FIG. 11, the controller 52 executes the detector malfunction determination if the first information F1 indicates that the second member 16 does not reach the reference absolute position AP1 and if the first additional information F2 indicates that the second member 16 does not reach the additional reference absolute position AP2 (steps S5, S8, and S40). In the detector malfunction determination, the controller 52 compares the acceleration information FA with the predetermined value FAO (step S41). The process enters the step S60 if the acceleration information FA is equal to or higher than the predetermined value FAO (steps S41 and S60 of FIG. 12). The controller 52 controls the informing device 56 to inform the user of the detector malfunction if the acceleration information FA is lower than the predetermined value FAO (steps S41 and S42). The process enters the step S12 (FIG. 12).

As seen in FIG. 12, in the braking-point determination, the controller 52 calculates a distance between the current position CP and each stop position of the plurality of stop positions SP1 to SP9 by subtracting each stop position of the plurality of stop positions SP1 to SP9 from the current position CP (step S61). The controller 52 selects the first closest stop position closest to the current position CP in the first moving direction D31 from among the plurality of stop positions SP1 to SP9 (step S62). The controller 52 selects the second closest stop position closest to the current position CP in the second moving direction D32 from among the plurality of stop positions SP1 to SP9 (step S63).

The controller 52 calculates the first braking position BP1 in which the actuator 44 changes the state of the hydraulic structure 18 from the adjustable state to the lock state based on the first closest stop position and the velocity information FV (step S64). The controller 52 calculates the second braking position BP2 in which the actuator 44 changes the state of the hydraulic structure 18 from the adjustable state to the lock state based on the second closest stop position and the velocity information FV (step S65).

The controller 52 compares the current position CP with the first braking position BP1 (step S66). The controller 52 controls the actuator 44 to change the state of the hydraulic structure 18 from the adjustable state to the lock state if the current position CP is coincident with the first braking position BP1 (steps S66 and S12). Thus, the second member 16 is stopped in almost the closest stop position of the stop positions SP1 to SP9.

The controller 52 compares the current position CP with the second braking position BP2 if the controller 52 concludes that the current position CP is not coincident with the first braking position BP1 (steps S66 and S67). The controller 52 controls the actuator 44 to change the state of the hydraulic structure 18 from the adjustable state to the lock state if the current position CP is coincident with the second braking position BP2 (steps S67 and S12). Thus, the second member 16 is stopped in almost the closest stop position of the stop positions SP1 to SP9.

The process returns to the step S61 if the controller 52 concludes that the current position CP is not coincident with the second braking position BP2 (step S67). The controller 52 executes the hydraulic-structure malfunction determination after changing the state of the hydraulic structure 18 from the adjustable state to the lock state (step S50).

As seen in FIG. 15, in the hydraulic-structure malfunction determination, the controller 52 starts to measure the determination time DT2 (step S51). The controller 52 compares the velocity information FV with the predetermined value FV0 stored in the controller 52 (step S52). The predetermined value FV0 is set to zero. If the controller 52 concludes that the velocity information FV is higher than the predetermined value FV0, the controller 52 controls the informing device 56 to inform the user of the malfunction of the hydraulic structure 18, and then compares the determination time DT2 with a reference determination time DT20 (steps S52 to S54). If the controller 52 concludes that the velocity information FV is equal to or lower than the predetermined value FV0, the controller 52 compares the determination time DT2 with the reference determination time DT20 (steps S52 and S54). The controller 52 repeatedly executes steps S52 to S54 while the determination time DT2 is shorter than the reference determination time DT20 (steps S52 to S54).

The controller 52 stops measuring the determination time DT2 if the determination time DT2 is equal to or longer than the reference determination time DT20 (steps S54 and S55). The controller 52 resets the determination time DT2 to zero (step S56).

As seen in FIG. 12, after the hydraulic-structure malfunction determination, the controller 52 controls the detector 59 to stop detecting the position information FP and the movement information FM (step S13). The process returns to the step S1 in FIG. 11.

Second Embodiment

A rider-posture changing device 212 in accordance with a second embodiment will be described below referring to FIGS. 16 to 20. The rider-posture changing device 212 has the same structure and/or configuration as those of the rider-posture changing device 12 except for the detector 59. Thus, elements having substantially the same function as those in the first embodiment will be numbered the same here and will not be described and/or illustrated again in detail here for the sake of brevity.

Figure 16:
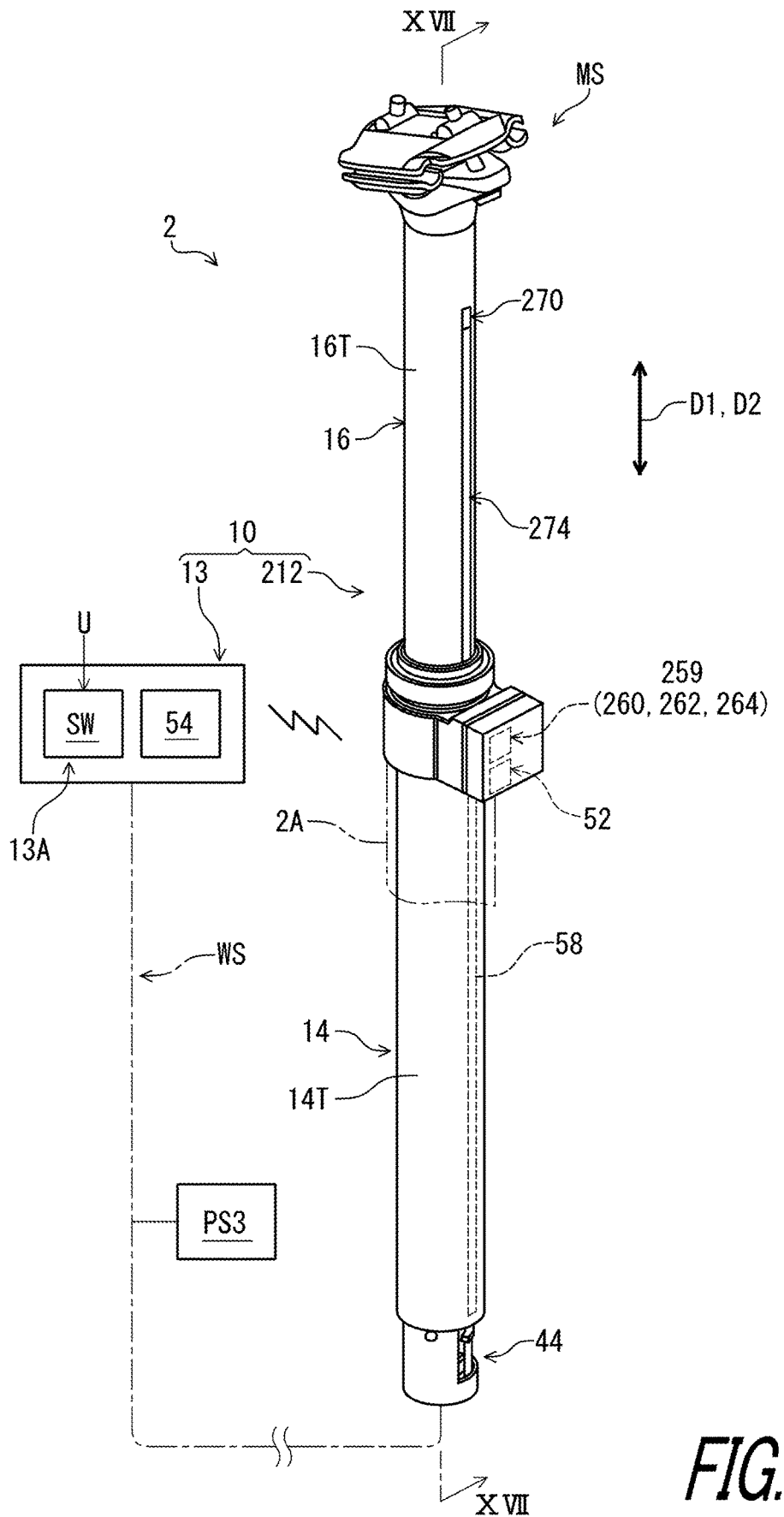
FIG. 16 is a perspective view of a rider-posture changing device of a control system of a human-powered vehicle in accordance with a second embodiment, with a schematic block diagram of an operating device of the control system.
Figure 17:
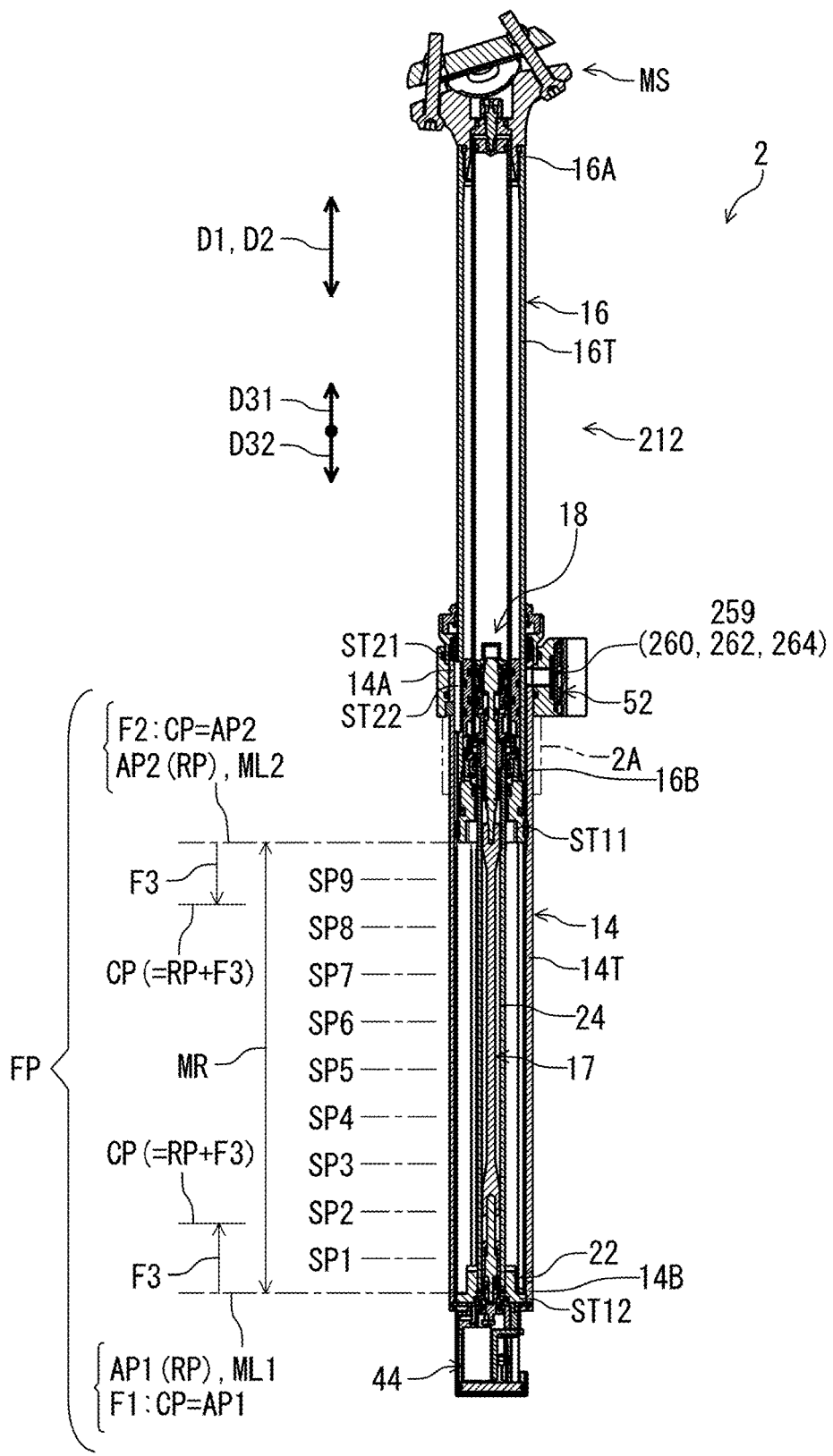
FIG. 17 is a cross-sectional view of the rider-posture changing device taken along line XVII-XVII of FIG. 16.

As seen in FIGS. 16 and 17, the rider-posture changing device 212 for the human-powered vehicle 2 comprises the first member 14, the second member 16, a detector 259, and the controller 52. The second member 16 is configured to be movable relative to the first member 14. The detector 259 is configured to detect the position information FP of the second member 16 relative to the first member 14. The controller 52 is configured to obtain the movement information FM of the second member 16 relative to the first member 14 based on the position information FP. The detector 259 has substantially the same structure as the structure of the detector 59 of the first embodiment.

The detector 259 includes a first detector 260. The first detector 260 is configured to detect the first information F1 indicating whether the second member 16 reaches the reference absolute position AP1 or not.

The detector 259 includes a first additional detector 262. The first additional detector 262 is configured to detect the first additional information F2 indicating whether the second member 16 reaches the additional reference absolute position AP2 or not. The additional reference absolute position AP2 is spaced apart from the reference absolute position AP1 in the longitudinal direction D1.

The detector 259 includes a second detector 264. The second detector 264 is configured to detect the second information F3 indicating the movement distance MD of the second member 16 from the reference position RP in the longitudinal direction D1.

The second detector 264 is configured to detect the moving direction of the second member 16 relative to the first member 14 in addition to the movement distance MD of the second member 16. The second detector 264 is configured to detect the first moving direction D31 of the second member 16 when the second member 16 is moved relative to the first member 14 toward the additional reference absolute position AP2. The second detector 264 is configured to detect the second moving direction D32 of the second member 16 when the second member 16 is moved relative to the first member 14 toward the reference absolute position AP1. The second detector 264 is configured to detect a movement distance MD as a positive value when the second detector 264 detects the first moving direction D31. The second detector 264 is configured to detect a movement distance MD as a negative value when the second detector 264 detects the second moving direction D32.

As seen in FIG. 16, the rider-posture changing device 212 further comprises a first detection object 270. The first detection object 270 is provided to at least one of the first member 14 and the second member 16. The first detector 260 is configured to detect the first detection object 270 to obtain the first information F1. The first detector 260 includes a non-contact detector configured to detect the first detection object 270 to obtain the first information F1 without contacting the first detection object 270. In the present embodiment, the first detector 260 is provided to the first member 14. The first detection object 270 is provided to the second member 16. The first detection object 270 is provided on the outer peripheral surface of the second member 16. However, the first detector 260 and the first detection object 270 can be provided to other portions of the rider-posture changing device 212. The first detector 260 can include other detectors such as a contact detector.

Figure 18:
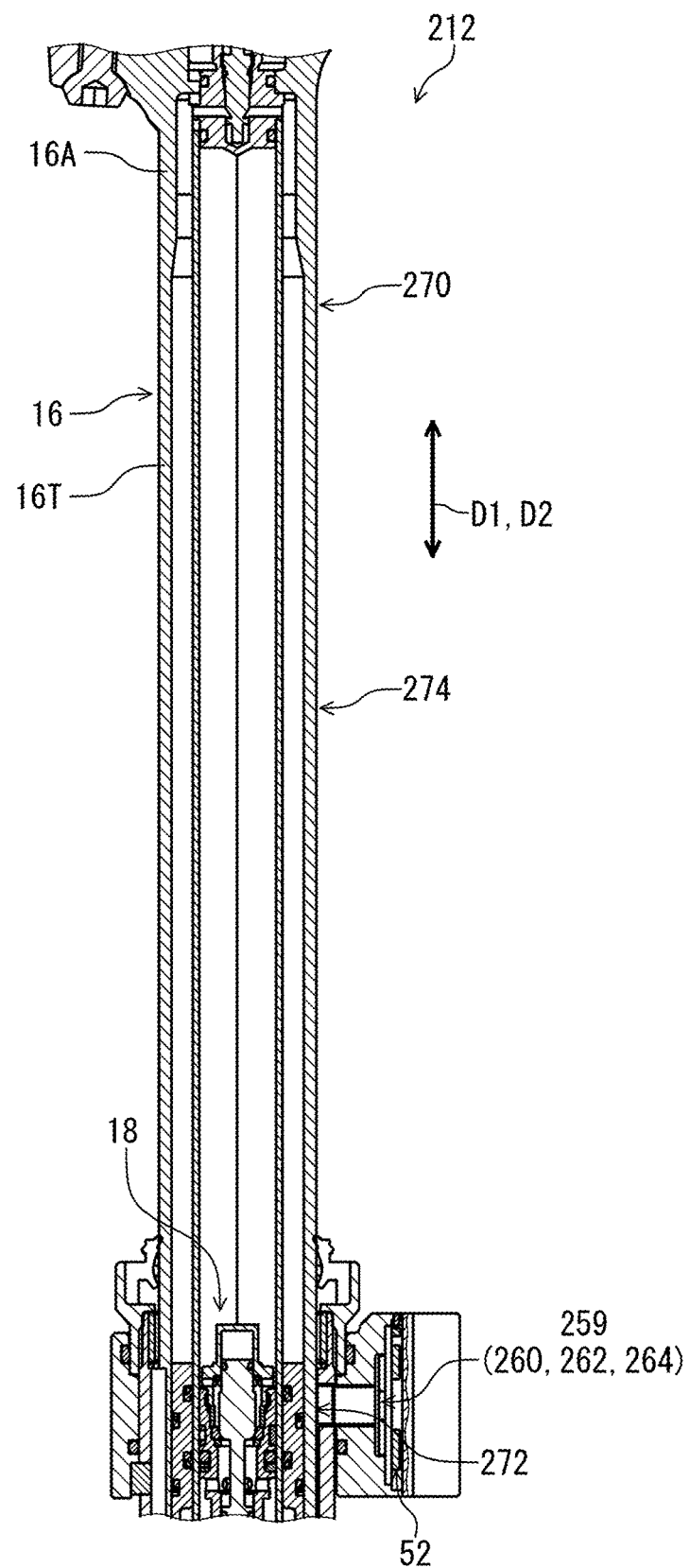
FIG. 18 is a partial cross-sectional view of the rider-posture changing device illustrated in FIG. 16.

As seen in FIG. 18, the rider-posture changing device 212 further comprises a first additional detection object 272. The first additional detection object 272 is provided to at least one of the first member 14 and the second member 16. The first additional detector 262 is configured to detect the first additional detection object 272 to obtain the first additional information F2. The first additional detector 262 includes a non-contact detector configured to detect the first additional detection object 272 to obtain the first additional information F2 without contacting the first additional detection object 272. In the present embodiment, the first additional detector 262 is provided to the first member 14. The first additional detection object 272 is provided to the second member 16. The first additional detection object 272 is provided on the outer peripheral surface of the second member 16. However, the first additional detector 262 and the first additional detection object 272 can be provided to other portions of the rider-posture changing device 212. The first additional detector 262 can include other detectors such as a contact detector.

As seen in FIG. 16, the rider-posture changing device 212 further comprises a second detection object 274. The second detection object 274 is provided to at least one of the first member 14 and the second member 16. The second detector 264 is configured to detect the second detection object 274 to obtain the second information F3. The second detector 264 includes a non-contact detector configured to detect the second detection object 274 to obtain the second information F3 without contacting the second detection object 274. In the present embodiment, the second detector 264 is provided to the first member 14. The second detection object 274 is provided to the second member 16. The second detection object 274 is provided on the outer peripheral surface of the second member 16. However, the second detector 264 and the second detection object 274 can be provided to other portions of the rider-posture changing device 212. The second detector 264 can include other detectors such as a contact detector.

Figure 19:
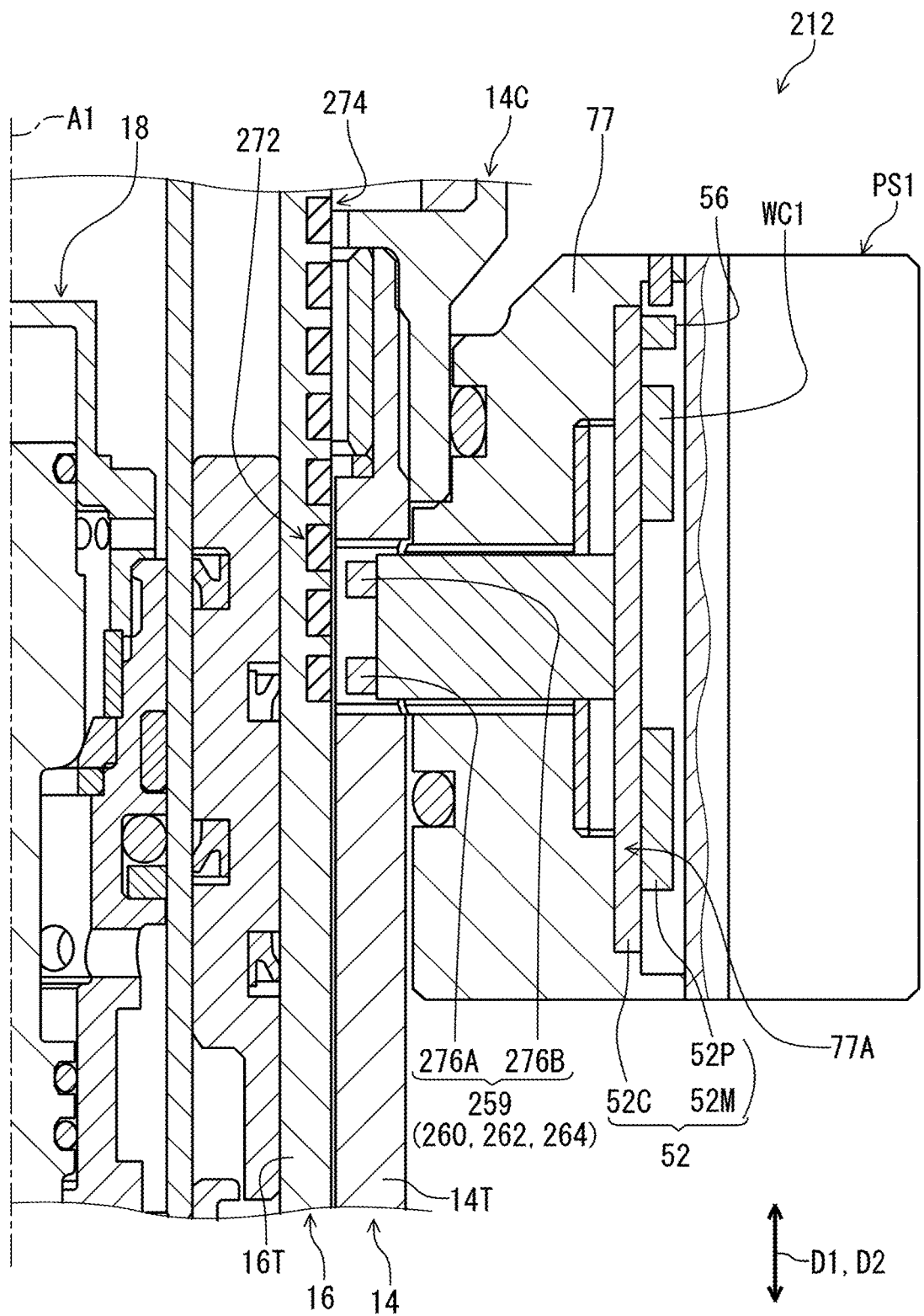
FIG. 19 is a partial cross-sectional view of the rider-posture changing device illustrated in FIG. 16.

As seen in FIG. 19, in the present embodiment, the first detector 260 and the second detector 264 are integrally provided with each other as a single unit. The first detector 260, the first additional detector 262, and the second detector 264 are integrally provided with each other as a single unit. However, at least one of the first detector 260, the first additional detector 262, and the second detector 264 can be a separate unit from another.

The first detector 260, the first additional detector 262, and the second detector 264 constitute an magnetic sensor. The detector 259 is configured to detect a movement distance MD and a moving direction of the second member 16 relative to the first member 14. The detector 259 is configured to measure the magnitude of a magnetic field. Examples of the detector 259 include a hall-effect sensor.

For example, the detector 259 includes a first detector 259A and a second detector 259B. The first detector 259A is configured to measure the magnitude of a magnetic field. The second detector 259B is configured to measure the magnitude of a magnetic field. Examples of the first detector 259A and the second detector 259B include a hall-effect sensor. However, the detector 259 can be a single magnetic sensor or can include three or more magnetic sensors.

Figure 20:
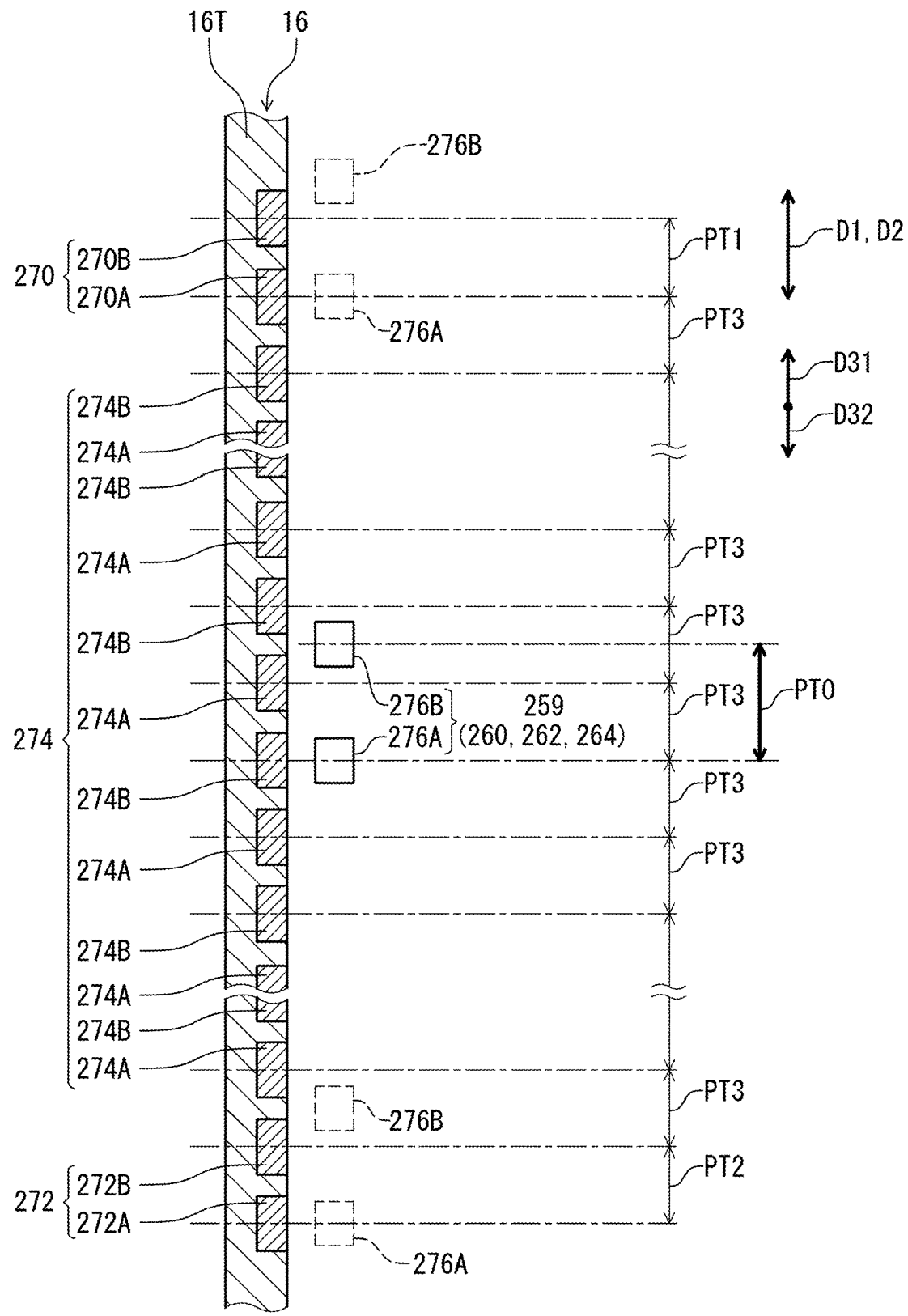
FIG. 20 is a schematic diagram indicating arrangement of detectors and detection objects of the rider-posture changing device illustrated in FIG. 16.

As seen in FIG. 20, the first detection object 270 is configured to generate a magnetic field. For example, the first detection object 270 is formed by multi-pole magnetization. The first detection object 270 includes a plurality of first magnetic parts 270A and 270B. The first magnetic part 270A has a magnetic pole identical to a magnetic pole of the first magnetic part 270B. For example, the first magnetic part 270A has a north pole, and the first magnetic part 270B has a north pole. In the present embodiment, a pitch PT0 between the first detector 259A and the second detector 259B is different from a pitch PT1 between the first magnetic parts 270A and 270B.

The first additional detection object 272 is configured to generate a magnetic field. For example, the first additional detection object 272 is formed by multi-pole magnetization. The first additional detection object 272 includes a plurality of first additional magnetic parts 272A and 272B. The first additional magnetic part 272A has a magnetic pole identical to a magnetic pole of the first additional magnetic part 272B. For example, the first additional magnetic part 272A has a south pole, and the first additional magnetic part 272B has a south pole. In the present embodiment, the pitch PT0 between the first detector 259A and the second detector 259B is different from a pitch PT2 between the first additional magnetic parts 272A and 272B.

The second detection object 274 is configured to generate a magnetic field. For example, the second detection object 274 is formed by multi-pole magnetization. The second detection object 274 includes a plurality of second magnetic parts 274A and a plurality of second magnetic parts 274B. The plurality of second magnetic parts 274A and the plurality of second magnetic parts 274B are alternatingly arranged in the longitudinal direction D1. The plurality of second magnetic parts 274A and the plurality of second magnetic parts 274B are provided between the first detection object 270 and the first additional detection object 272 in the longitudinal direction D1.

The second magnetic part 274A has a magnetic pole different from a magnetic pole of the second magnetic part 274B. For example, the second magnetic part 274A has a north pole, and the second magnetic part 274B has a south pole. In the present embodiment, the pitch PT0 between the first detector 259A and the second detector 259B is different from as a pitch PT3 between the second magnetic parts 274A and 274B. The pitch PT1 between the first magnetic parts 270A and 270B is identical to the pitch PT3 between the second magnetic parts 274A and 274B. The pitch PT2 between the first additional magnetic parts 272A and 272B is identical to the pitch PT3 between the second magnetic parts 274A and 274B.

For example, each of the first detector 259A and the second detector 259B is configured to output a voltage depending on a magnetic pole and a magnitude of the magnetic field. For example, each of the first detector 259A and the second detector 259B is configured to linearly output a larger voltage in response to a greater magnitude of the magnetic field generated by a north pole. Each of the first detector 259A and the second detector 259B is configured to linearly output a lower voltage in response to a smaller magnitude of the magnetic field generated by a south pole.

The output of one of the first detector 259A and the second detector 259B can indicate the movement distance MD of the second member 16 relative to the first detector 259A. The relationship between the output of the first detector 259A and the output of the second detector 259B is different with respect to each of the first detection object 270, the first additional detection object 272, and the second detection object 274. Furthermore, the relationship between the output of the first detector 259A and the output of the second detector 259B is different with respect to the first moving direction D31 and the second moving direction D32 of the second member 16. Thus, the controller 52 is configured to recognize the first information F1, the first additional information F2, and the second information F3 based on the output of the detector 259 (e.g., the output of the first detector 259A and the output of the second detector 259B).

The control executed by the controller 52 in the second embodiment is the same as the control executed by the controller 52 in the first embodiment. Thus, it will be omitted here for the sake of brevity.

Third Embodiment

A rider-posture changing device 312 in accordance with a second embodiment will be described below referring to FIGS. 21 to 26. The rider-posture changing device 312 has the same structure and/or configuration as those of the rider-posture changing device 12 except for the detector 59 and the hydraulic structure 18. Thus, elements having substantially the same function as those in the first embodiment will be numbered the same here and will not be described and/or illustrated again in detail here for the sake of brevity.

Figure 21:
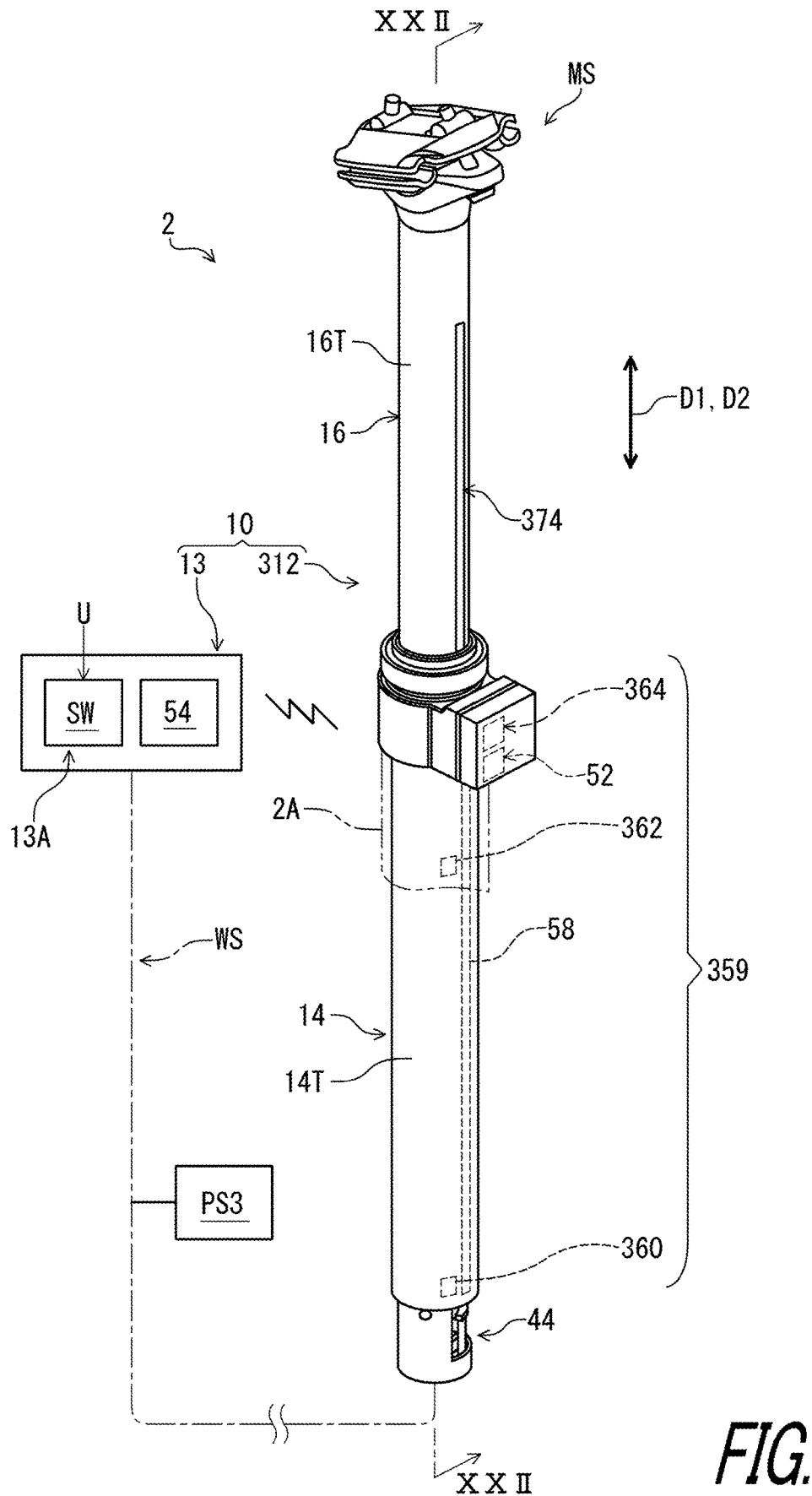
FIG. 21 is a perspective view of a rider-posture changing device of a control system of a human-powered vehicle in accordance with a third embodiment, with a schematic block diagram of an operating device of the control system.
Figure 22:
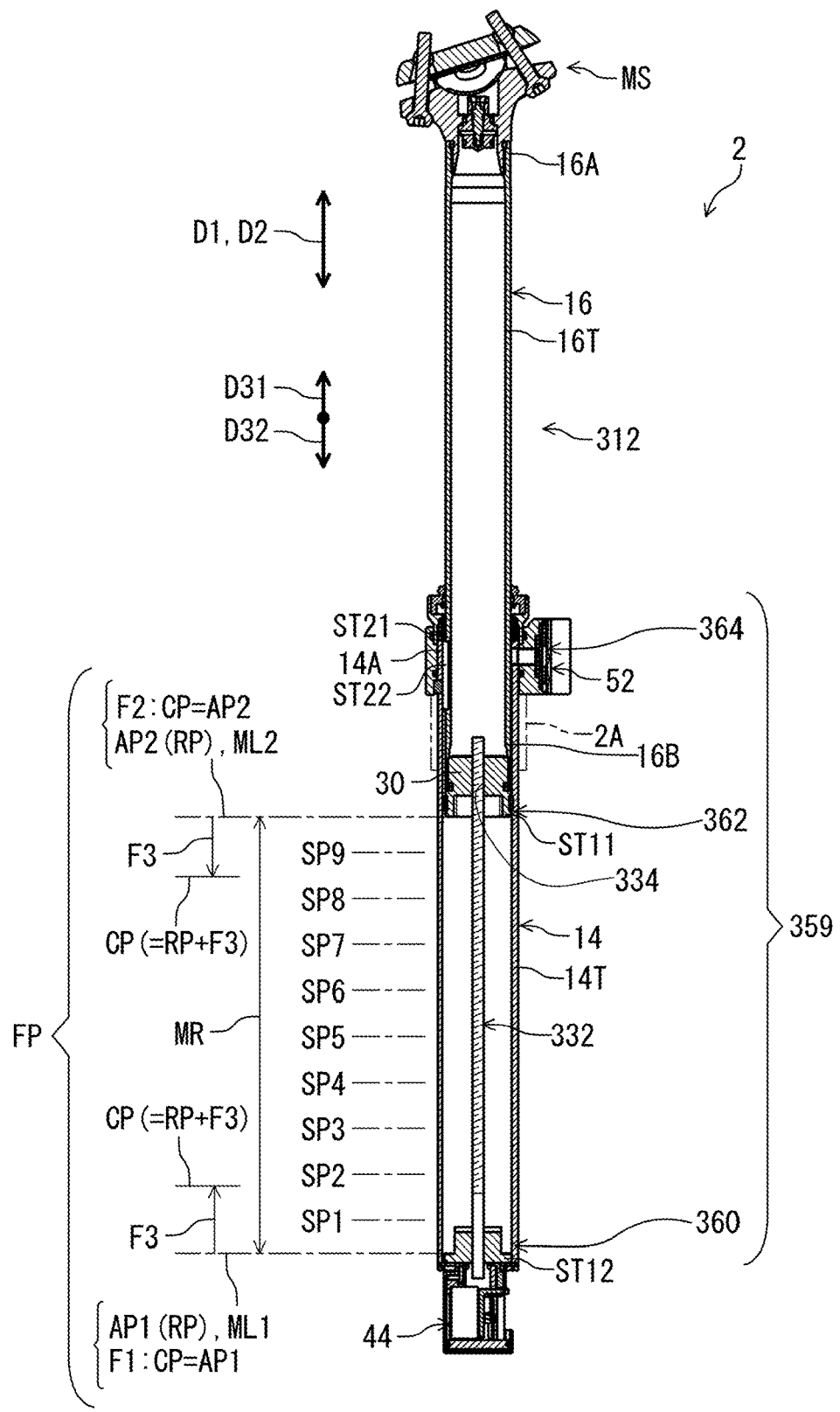
FIG. 22 is a cross-sectional view of the rider-posture changing device taken along line XXII-XXII of FIG. 21.

As seen in FIGS. 21 and 22, the rider-posture changing device 312 for the human-powered vehicle 2 comprises the first member 14, the second member 16, a detector 359, and the controller 52. The second member 16 is configured to be movable relative to the first member 14. The detector 359 is configured to detect the position information FP of the second member 16 relative to the first member 14. The controller 52 is configured to obtain the movement information FM of the second member 16 relative to the first member 14 based on the position information FP. The detector 359 has substantially the same structure as the structure of the detector 59 of the first embodiment.

As seen in FIG. 22, the rider-posture changing device 312 includes a screw rod 332 having an external thread instead of the hydraulic structure 18. The intermediate support 30 includes a threaded hole 334. The screw rod 332 is operatively coupled to the actuator 44.

The actuator 44 is configured to rotate the screw rod 332 to move the second member 16 relative to the first member 14 in the longitudinal direction D1. Specifically, the actuator 44 is configured to rotate the screw rod 332 to move the second member 16 relative to the first member 14 in the first moving direction D31 or the second moving direction D32.

As seen in FIGS. 21 and 22, the detector 359 includes a first detector 360. The first detector 360 is configured to detect the first information F1 indicating whether the second member 16 reaches the reference absolute position AP1 or not.

The detector 359 includes a first additional detector 362. The first additional detector 362 is configured to detect the first additional information F2 indicating whether the second member 16 reaches the additional reference absolute position AP2 or not. The additional reference absolute position AP2 is spaced apart from the reference absolute position AP1 in the longitudinal direction D1.

The detector 359 includes a second detector 364. The second detector 364 is configured to detect the second information F3 indicating the movement distance MD of the second member 16 from the reference position RP in the longitudinal direction D1.

The second detector 364 is configured to detect the moving direction of the second member 16 relative to the first member 14 in addition to the movement distance MD of the second member 16. The second detector 364 is configured to detect the first moving direction D31 of the second member 16 when the second member 16 is moved relative to the first member 14 toward the additional reference absolute position AP2. The second detector 364 is configured to detect the second moving direction D32 of the second member 16 when the second member 16 is moved relative to the first member 14 toward the reference absolute position AP1. The second detector 364 is configured to detect a movement distance MD as a positive value when the second detector 364 detects the first moving direction D31. The second detector 364 is configured to detect a movement distance MD as a negative value when the second detector 364 detects the second moving direction D32.

Figure 23:
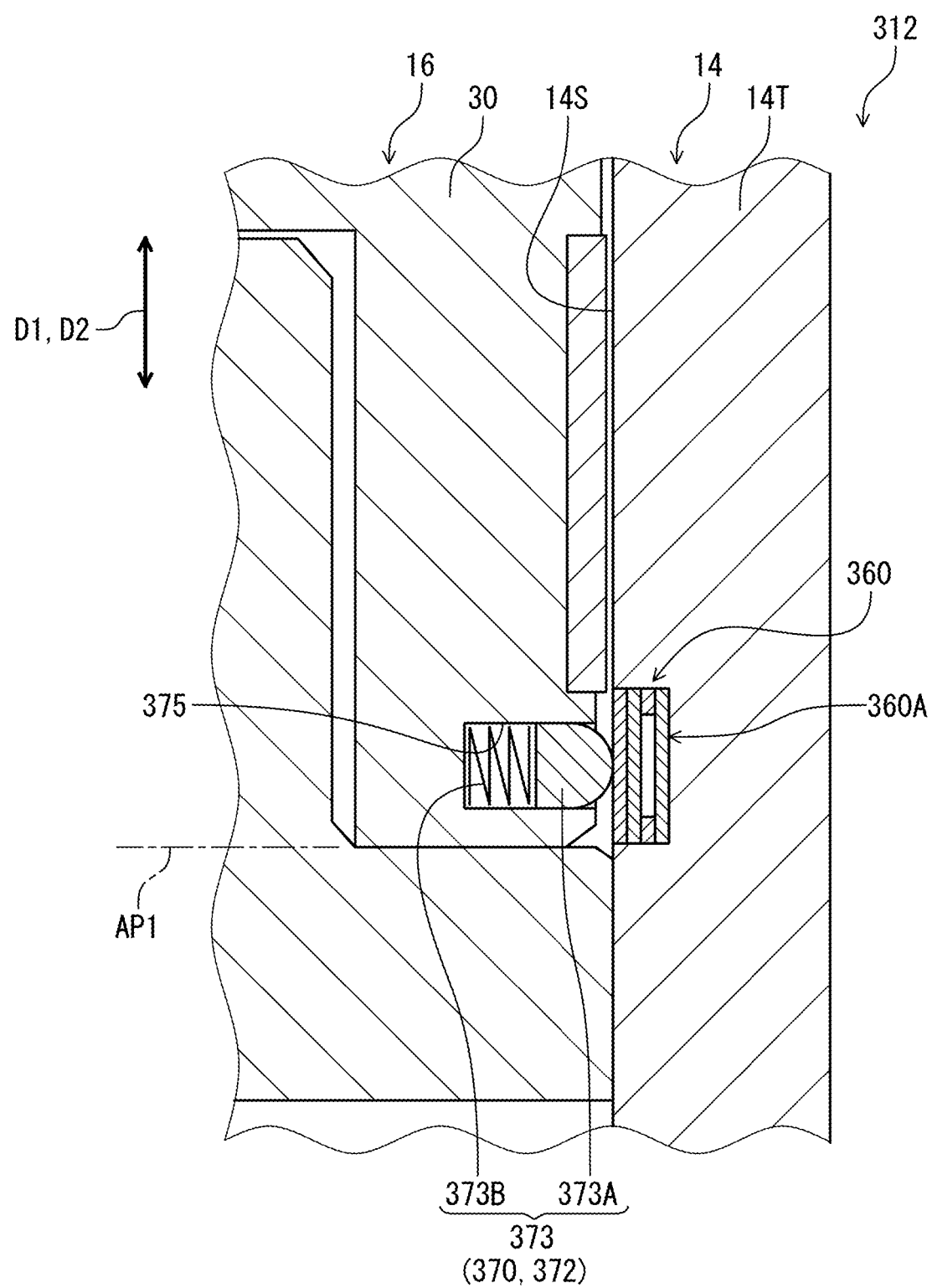
FIG. 23 is a partial cross-sectional view of the rider-posture changing device illustrated in FIG. 21.

As seen in FIG. 23, the rider-posture changing device 312 further comprises a first detection object 370. The first detection object 370 is provided to at least one of the first member 14 and the second member 16. The first detector 360 is configured to detect the first detection object 370 to obtain the first information F1. The first detector 360 includes a contact detector configured to detect the first detection object 370 to obtain the first information F1 by contacting the first detection object 370. In the present embodiment, the first detector 360 is provided to the first member 14. The first detection object 370 is provided to the second member 16. The first detection object 370 is provided on the outer peripheral surface of the second member 16. However, the first detector 360 and the first detection object 370 can be provided to other portions of the rider-posture changing device 312. The first detector 360 can include other detectors such as a non-contact detector.

Figure 24:
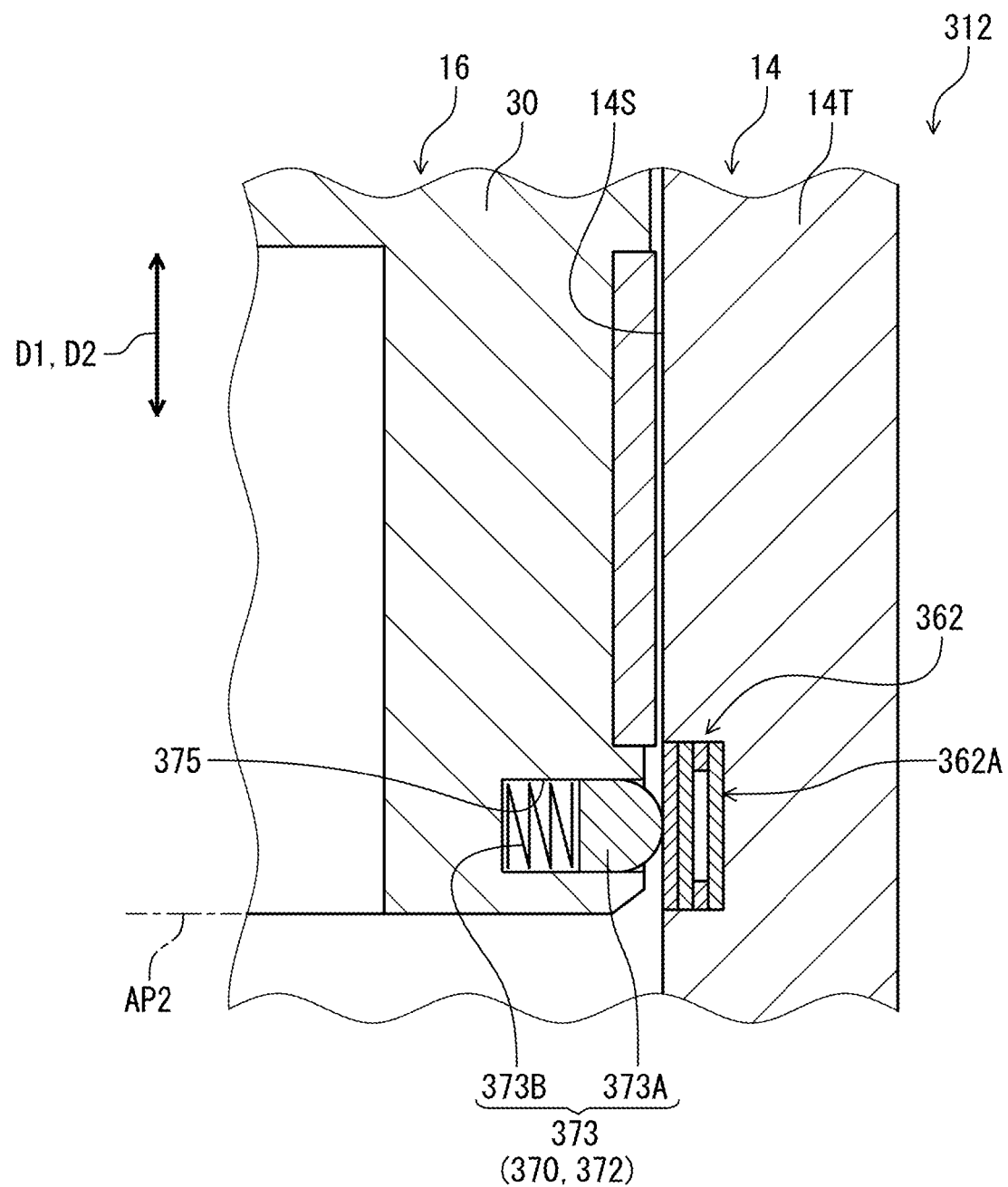
FIG. 24 is a partial cross-sectional view of the rider-posture changing device illustrated in FIG. 21.

As seen in FIG. 24, the rider-posture changing device 312 further comprises a first additional detection object 372. The first additional detection object 372 is provided to at least one of the first member 14 and the second member 16. The first additional detector 362 is configured to detect the first additional detection object 372 to obtain the first additional information F2. The first additional detector 362 includes a contact detector configured to detect the first additional detection object 372 to obtain the first information F1 by contacting the first additional detection object 372. In the present embodiment, the first additional detector 362 is provided to the first member 14. The first additional detection object 372 is provided to the second member 16. The first additional detection object 372 is provided on the outer peripheral surface of the second member 16. However, the first additional detector 362 and the first additional detection object 372 can be provided to other portions of the rider-posture changing device 312. The first additional detector 362 can include other detectors such as a non-contact detector.

As seen in FIGS. 23 and 24, in the present embodiment, the first detection object 370 and the first additional detection object 372 constitute a detection object 373. The detection object 373 includes a movable part 373A and a biasing member 373B. The movable part 373A is movably attached to the second member 16. The second member 16 includes a recess 375. The movable part 373A is movably provided in the recess 375 of the second member 16. The biasing member 373B is provided in the recess 375 to bias the movable part 373A toward the first member 14. The movable part 373A is configured to be in contact with an inner peripheral surface 14S of the first member 14. The movable part 373A is configured to slide with the inner peripheral surface 14S of the first member 14 while the second member 16 is moved relative to the first member 14 in the longitudinal direction D1.

The first detector 360 includes a resistive sensor 360A configured to detect that the first detection object 370 is in contact with the first detector 360. The resistive sensor 360A is provided in the inner peripheral surface 14S of the first member 14. The resistive sensor 360A includes a pair of electrode films and a plurality of electric insulators. The pair of electrode films is spaced apart from each other. The plurality of electric insulators is provided between the pair of electrode films. One of the electrode films comes into contact with the other of the electrode films when the one of the electrode films is pressed by the movable part 373A of the detection object 373. Thus, the first detector 360 is configured to detect that the movable part 373A of the detection object 373 is in contact with the resistive sensor 360A. Namely, the first detector 360 is configured to detect the first information F1 indicating the second member 16 reaches the reference absolute position AP1 when the first detection object 370 reaches a detection area of the first detector 360.

As seen in FIG. 24, the first additional detector 362 includes a resistive sensor 362A configured to detect that the first additional detection object 372 is in contact with the first additional detector 362. The resistive sensor 362A is provided in the inner peripheral surface 14S of the first member 14. The resistive sensor 362A is configured to detect that the movable part 373A of the detection object 373 is in contact with the resistive sensor 362A. Namely, the first additional detector 362 is configured to detect the first information F1 indicating the second member 16 reaches the reference absolute position AP1 when the first additional detection object 372 reaches a detection area of the first additional detector 362. The first additional detector 362 has substantially the same structure as that of the first detector 360. Thus, they will not be described and/or illustrated in detail here for the sake of brevity.

As seen in FIG. 21, the rider-posture changing device 312 further comprises a second detection object 374. The second detection object 374 is provided to at least one of the first member 14 and the second member 16. The second detector 364 is configured to detect the second detection object 374 to obtain the second information F3. The second detector 364 includes a non-contact detector configured to detect the second detection object 374 to obtain the second information F3 without contacting the second detection object 374. In the present embodiment, the second detector 364 is provided to the first member 14. The second detection object 374 is provided to the second member 16. The second detection object 374 is provided on the outer peripheral surface of the second member 16. However, the second detector 364 and the second detection object 374 can be provided to other portions of the rider-posture changing device 312. The second detector 364 can include other detectors such as a contact detector.

In the present embodiment, the first detector 360, the first additional detector 362, and the second detector 364 are separate units from each other. However, at least two of the first detector 360, the first additional detector 362, and the second detector 364 can be integrally provided with each other as a single unit.

Figure 25:
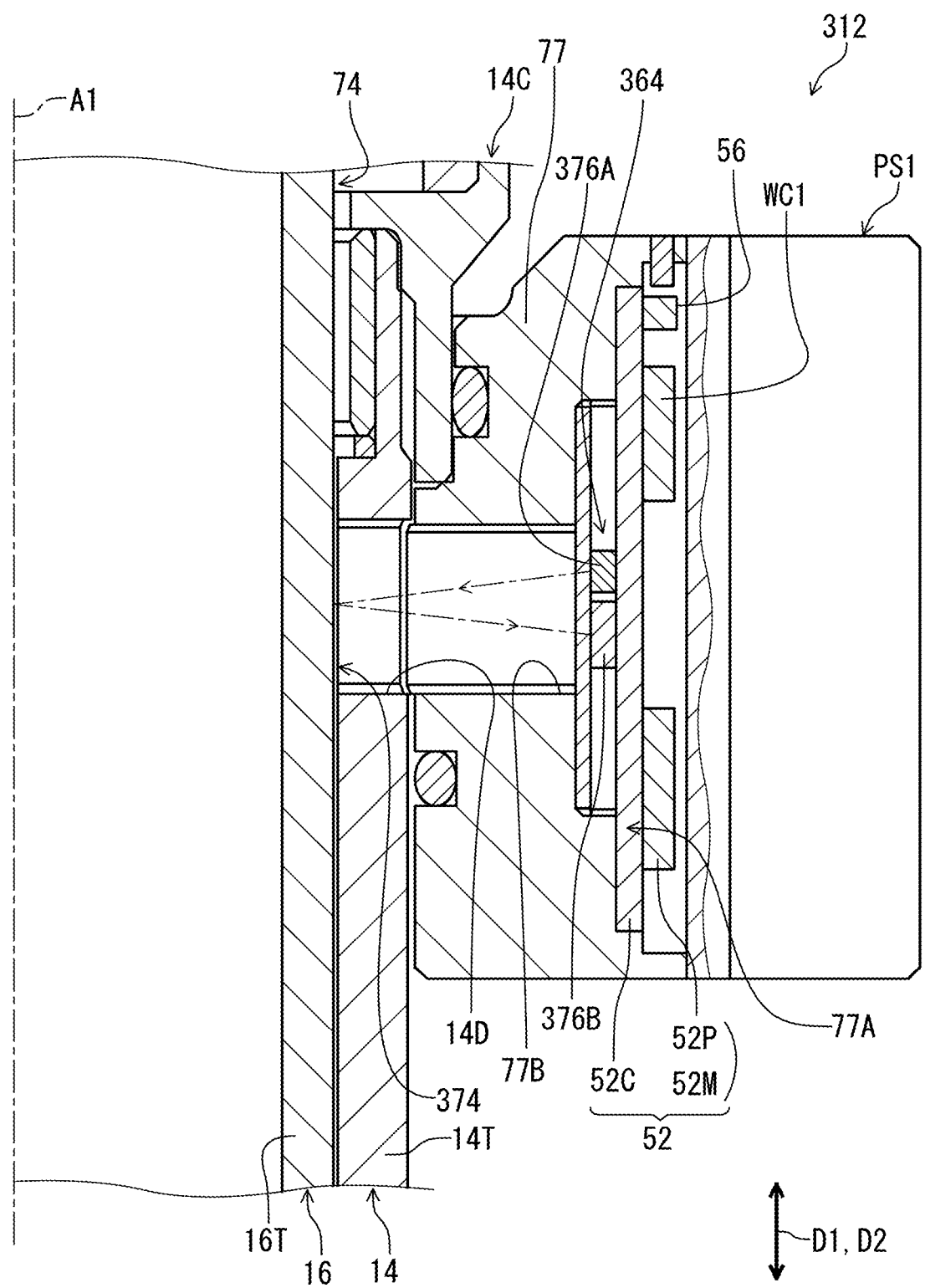
FIG. 25 is a partial cross-sectional view of the rider-posture changing device illustrated in FIG. 21.

As seen in FIG. 25, the second detector 364 includes an optical sensor. The second detector 364 is configured to detect a movement distance MD of the second member 16 relative to the first member 14. Examples of the second detector 364 include an optical encoder. The second detector 364 includes a light emitter 376A and a light receiver 376B. The light emitter 376A is configured to emit light to the second member 16. For example, the light emitter 76A includes a light emitting diode configured to emit light. The light receiver 376B is configured to receive light reflected by the second detection object 374. For example, the light receiver 376B includes a photo detector and an amplifier. The photo detector is configured to convert light to electricity. The amplifier is configured to amplify the output of the photo detector. Examples of the photo detector include a photodiode. The controller 52 is configured to periodically receive the output of the light receiver 376B and is configured to obtain the movement distance MD of the second member 16 based on the output of the light receiver 376B.

The second detection object 374 includes a pattern such that the light receiver 376B detects the movement distance MD and the moving direction of the second member 16. The second detection object 374 includes a plurality of reflective parts and a plurality of non-reflective parts constituting the pattern. The plurality of reflective parts and the plurality of non-reflective parts are alternatingly arranged in the longitudinal direction D1. The plurality of reflective parts is arranged in the longitudinal direction D1 at constant pitches. The second detector 364 is configured to detect light reflected on the reflective part to obtain the movement distance MD of the second member 16.

Figure 26:
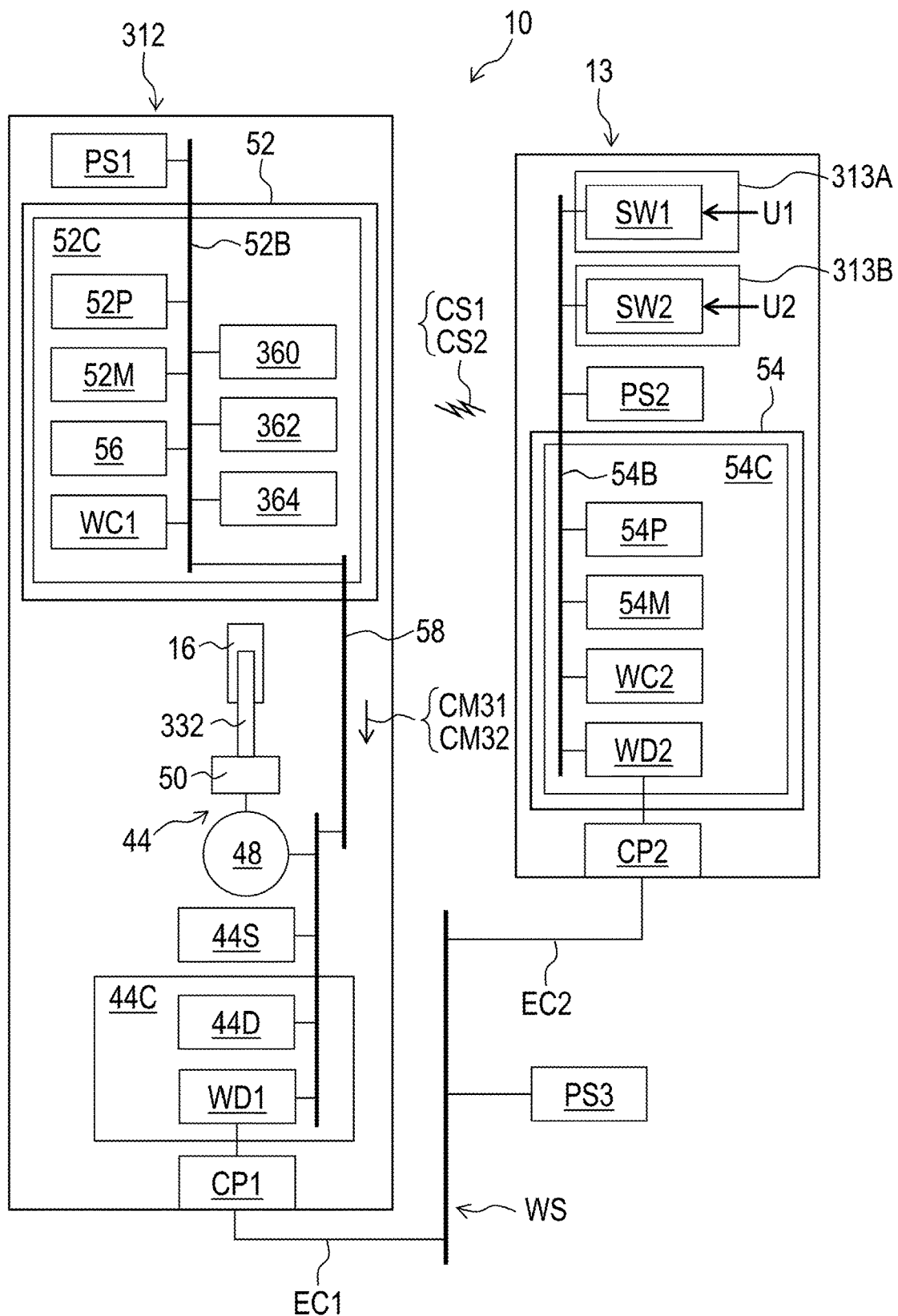
FIG. 26 is a schematic block diagram of the rider-posture changing device illustrated in FIG. 21.

As seen in FIG. 26, the operating device 13 includes a first user interface 313A and a second user interface 313B. The first user interface 313A is configured to receive a first user input U1. The first user interface 313A includes a first electrical switch SW1 configured to be activated in response to the first user input U1. The second user interface 313B is configured to receive a second user input U2. The second user interface 313B includes a second electrical switch SW2 configured to be activated in response to the second user input U2. For example, each of the first user interface 313A and the second user interface 313B includes a push-button switch. However, each of the first user interface 313A and the second user interface 313B can include other user interfaces.

The signal controller 54 is configured to generate a first control signal CS1 in response to the first user input U1. The signal controller 54 is configured to generate the first control signal CS1 when the first electrical switch SW1 is pressed. The signal controller 54 is configured to generate a second control signal CS2 in response to the second user input U2. The signal controller 54 is configured to generate the second control signal CS2 when the second electrical switch SW2 is pressed.

Figure 27:
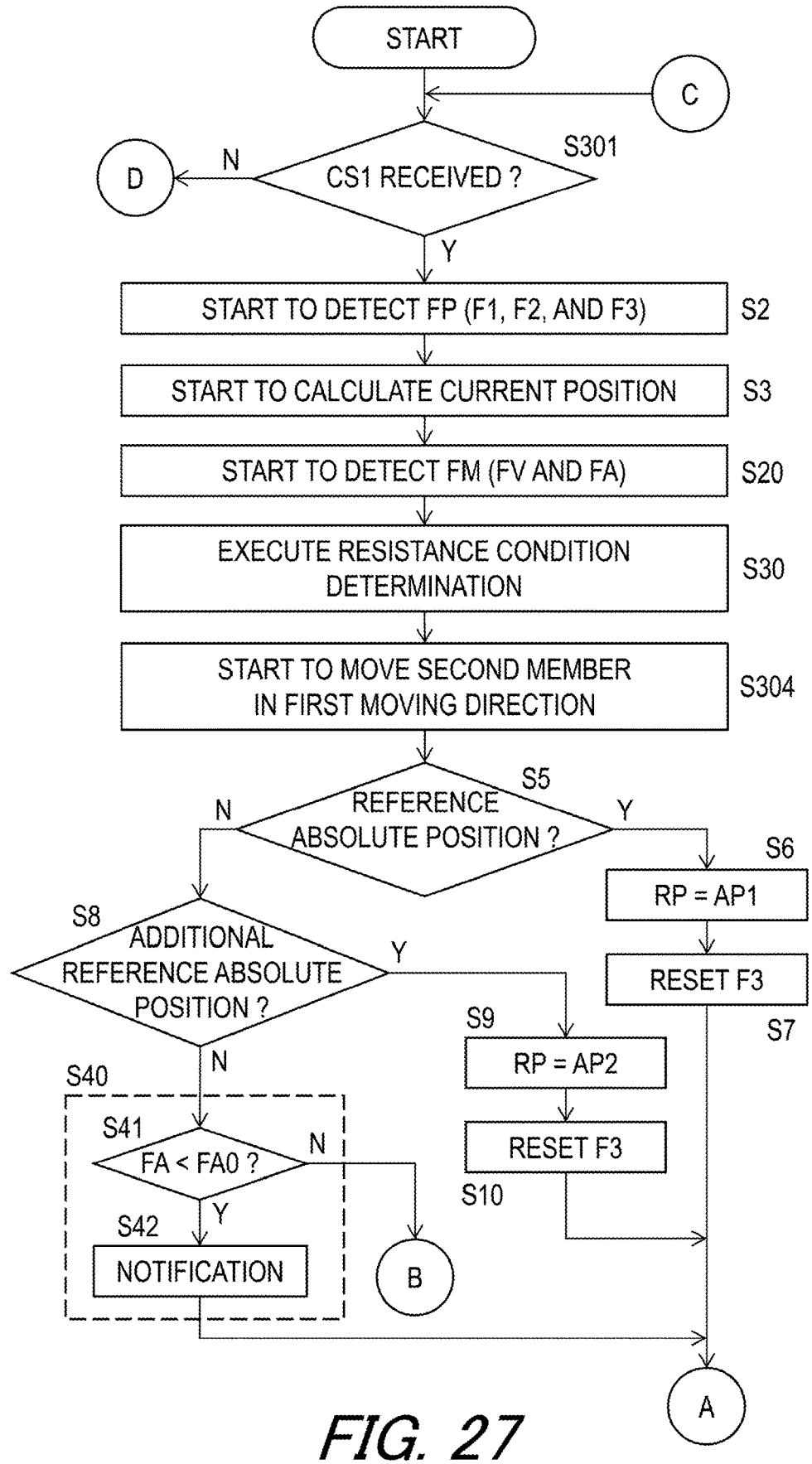
FIGS. 27 to 29 are flow charts of the rider-posture changing device illustrated in FIG. 21.
Figure 28:
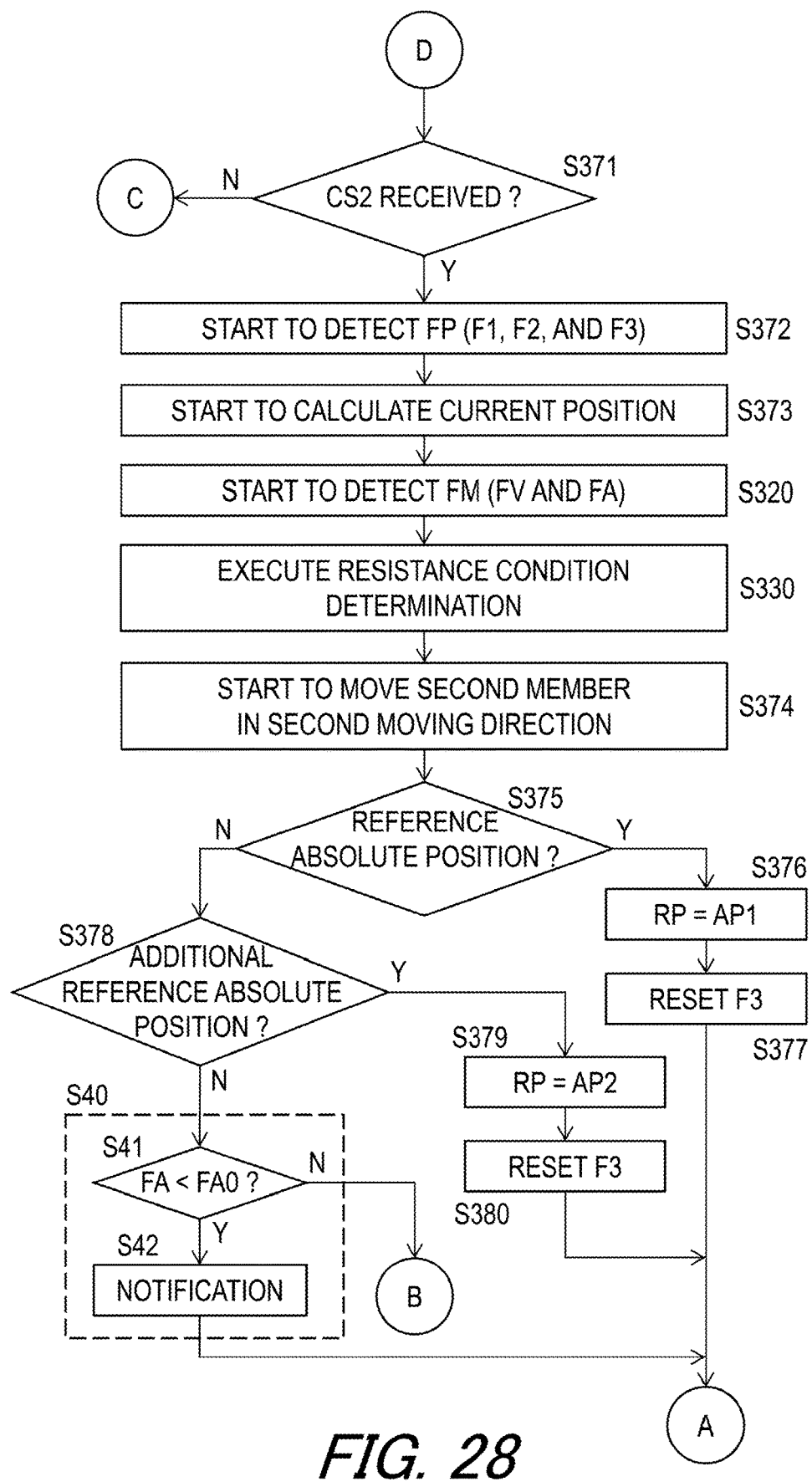

The control executed by the controller 52 will be described below referring to FIGS. 27 to 29. As seen in FIGS. 27 and 28, the controller 52 determines whether the first control signal CS1 or the second control signal CS2 is received or not (step S301 or S371). The controller 52 keeps monitoring the first control signal CS1 or the second control signal CS2 if the controller 52 concludes that the first control signal CS1 or the second control signal CS2 is not received (step S301 or S371).

As seen in FIG. 27, the controller 52 controls the detector 359 to start to detect the position information FP, starts to calculate the current position CP, starts to detect the movement information FM, and executes the resistance condition determination if the controller 52 concludes that the first control signal CS1 is received (steps S301, S2, S3, S20, and S30). The controller 52 controls the actuator 44 to move the second member 16 relative to the first member 14 in the first moving direction D31 (step S304). The steps S5 to S10 and S40 in FIG. 27 are the same as the steps S5 to S10 and S40 in FIG. 11.

As seen in FIG. 28, the controller 52 controls the detector 359 to start to detect the position information FP, starts to calculate the current position CP, starts to detect the movement information FM, and executes the resistance condition determination if the controller 52 concludes that the second control signal CS2 is received (steps S371, S372, S373, S320, and S330). The steps S372, S373, S320, and S330 in FIG. 28 are the same as the steps S2, S3, S20, and S30 in FIG. 27. The controller 52 controls the actuator 44 to move the second member 16 relative to the first member 14 in the second moving direction D32 (step S374). The steps S375 to S380 and S340 in FIG. 28 are the same as the steps S5 to S10 and S40 in FIG. 11.

Figure 29:
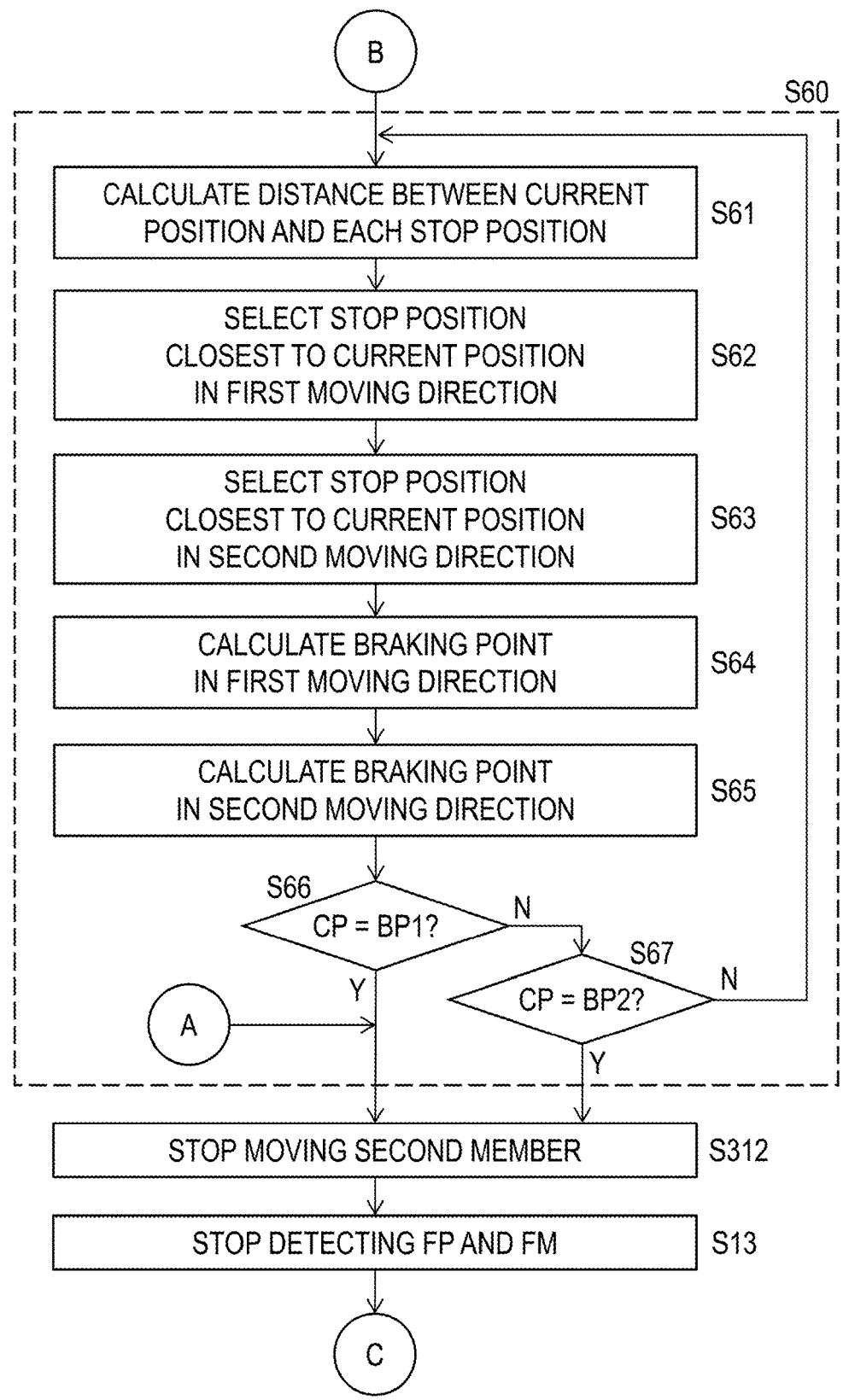

As seen in FIG. 29, the step S60 in FIG. 29 is the same as the step S60 in FIG. 12. The controller 52 controls the actuator 44 to stop moving the second member 16 relative to the first member 14 if the current position CP is coincident with the first braking position BP1 or the second braking position BP2 (steps S66, S67, and S312). After the hydraulic-structure malfunction determination, the controller 52 controls the detector 359 to stop detecting the position information FP and the movement information FM (step S13). The process returns to the step S301 of FIG. 27.

Fourth Embodiment

A rider-posture changing device 412 in accordance with a fourth embodiment will be described below referring to FIGS. 30 to 36. The rider-posture changing device 412 has the same structure and/or configuration as those of the rider-posture changing device 12 except that the detector 59 is configured to detect an absolute position of the second member 16. Thus, elements having substantially the same function as those in the first embodiment will be numbered the same here and will not be described and/or illustrated again in detail here for the sake of brevity.

Figure 30:
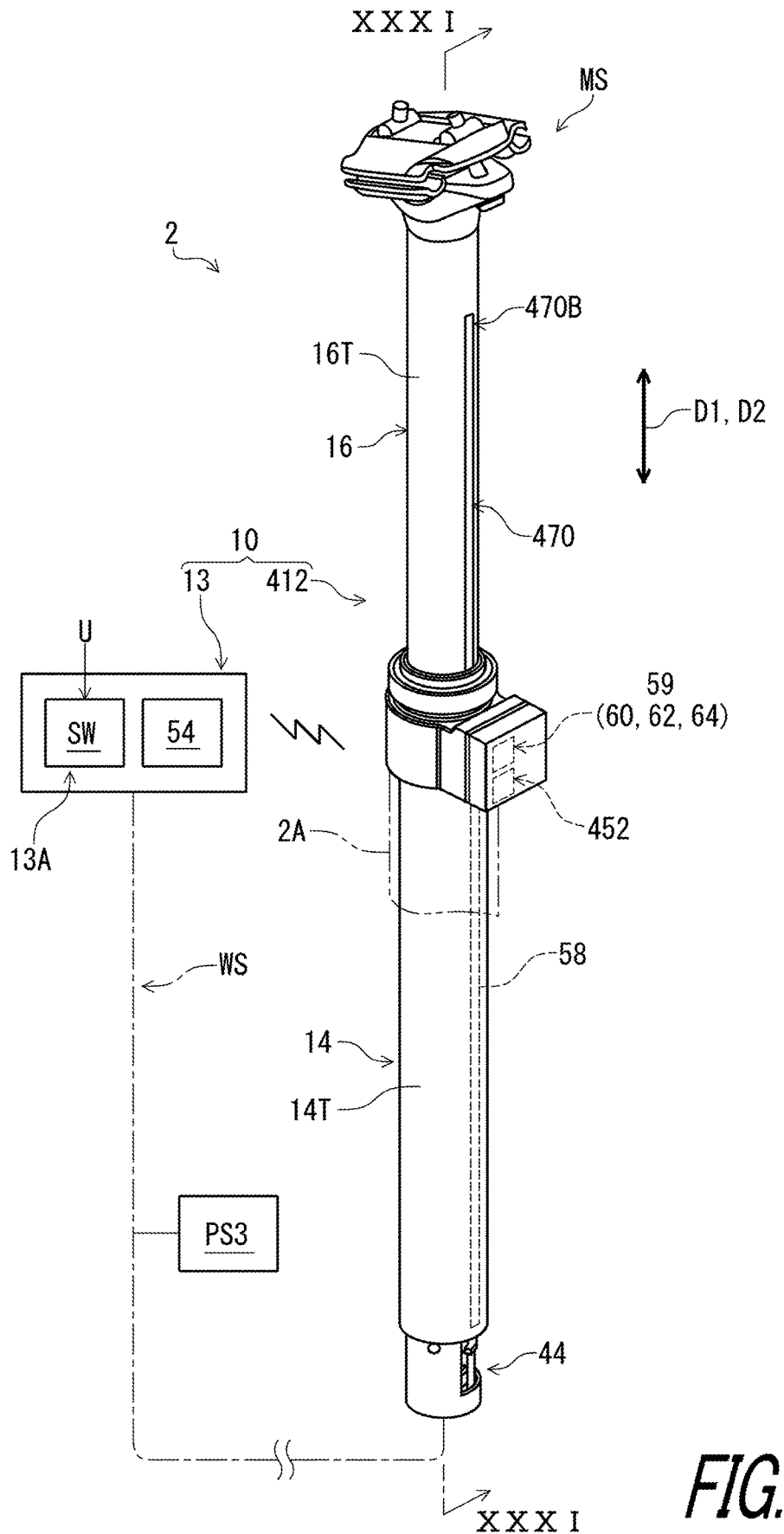
FIG. 30 is a perspective view of a rider-posture changing device of a control system of a human-powered vehicle in accordance with a fourth embodiment, with a schematic block diagram of an operating device of the control system.
Figure 31:
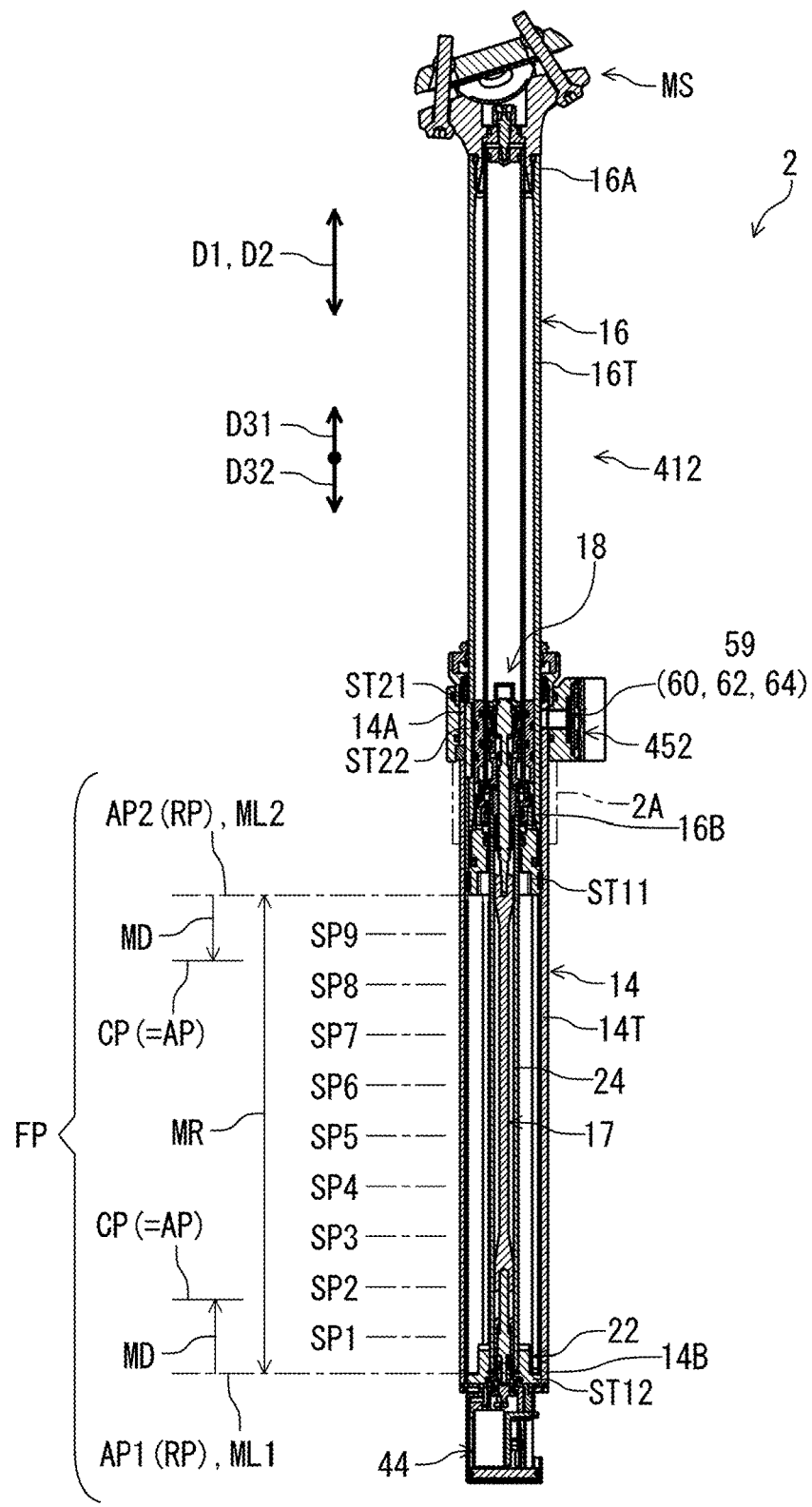
FIG. 31 is a cross-sectional view of the rider-posture changing device taken along line XXII-XXII of FIG. 30.
Figure 32:
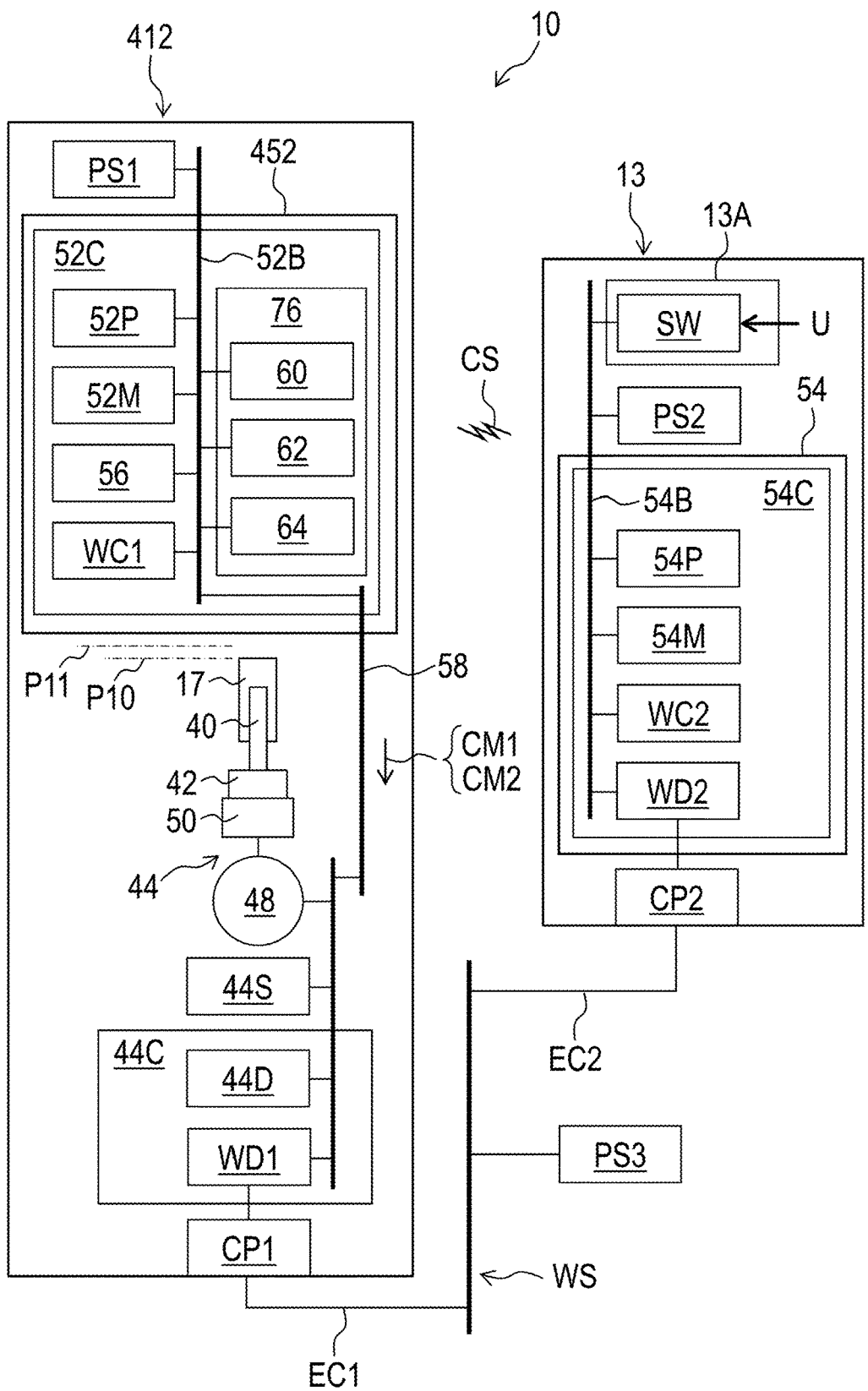
FIG. 32 is a schematic block diagram of the rider-posture changing device illustrated in FIG. 30.

As seen in FIGS. 30 to 32, the rider-posture changing device 412 for the human-powered vehicle 2 comprises the first member 14, the second member 16, the detector 59, and a controller 452. The second member 16 is configured to be movable relative to the first member 14. The detector 59 is configured to detect the position information FP of the second member 16 relative to the first member 14. In the second embodiment, the detector 59 is configured to detect the position information FP indicating an absolute position AP of the second member 16 relative to the first member 14. Thus, the absolute position AP detected by the detector 59 can be directly used as the current position CP of the second member 16 relative to the first member 14. The controller 452 is configured to obtain the movement information FM of the second member 16 relative to the first member 14 based on the position information FP. The controller 452 has substantially the same structure as the structure of the controller 52 of the first embodiment.

Figure 33:
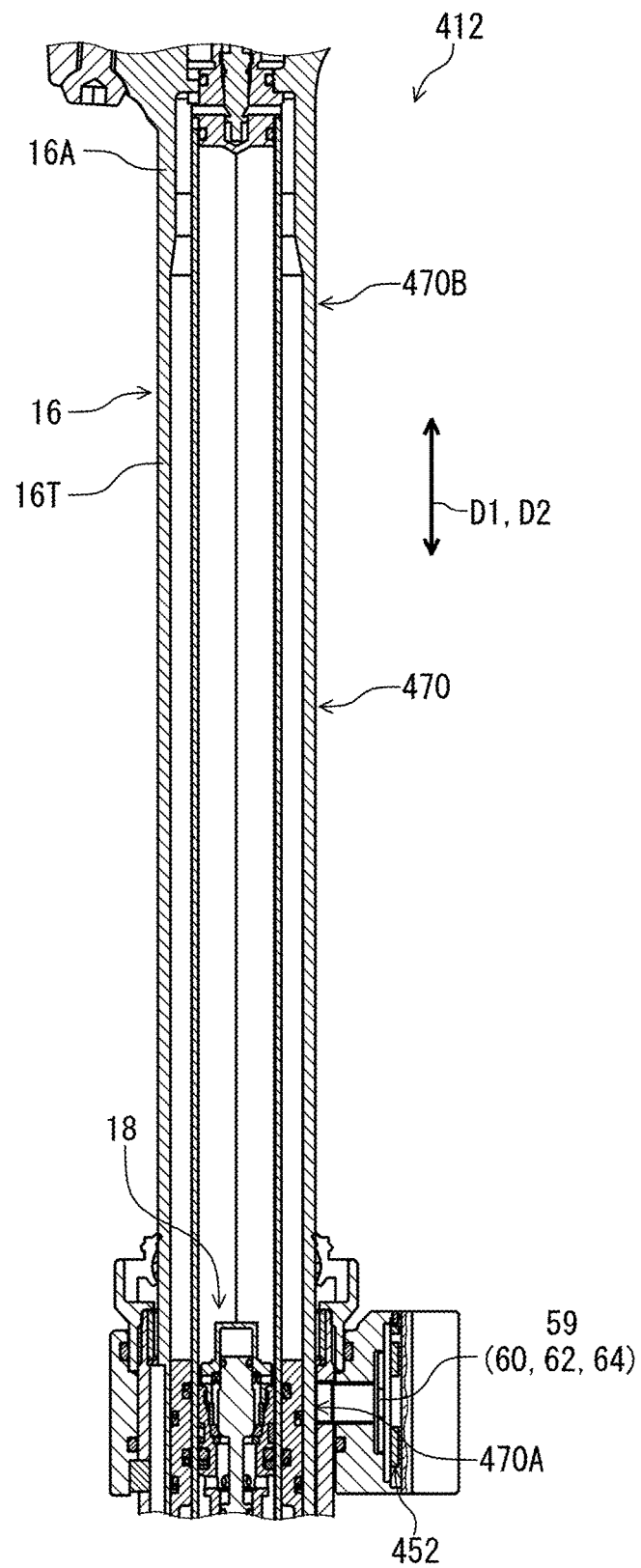
FIG. 33 is a partial cross-sectional view of the rider-posture changing device illustrated in FIG. 30.

As seen in FIG. 33, for example, the rider-posture changing device 412 further comprises a detection object 470 instead of the first detection object 70, the first additional detection object 72, and the second detection object 74. The detection object 470 is provided to at least one of the first member 14 and the second member 16. The detector 59 is configured to detect the detection object 470 to obtain the absolute position AP of the second member 16 relative to the first member 14. The detection object 470 includes a detection pattern such that the light receiver 76B detects the absolute position AP. Thus, the detector 59 can detect the absolute position AP of the second member 16 relative to the first member 14 using the detection object 470.

The detection object 470 includes a first object end 470A and a second object end 470B. The detection object 470 extends from the first object end 470A to the second object end 470B in the longitudinal direction D1. The position of the first object end 470A substantially corresponds to the position of the first detection object 70 in the first embodiment. The position of the second object end 470B substantially corresponds to the position of the first additional detection object 72 in the first embodiment.

Figure 34:
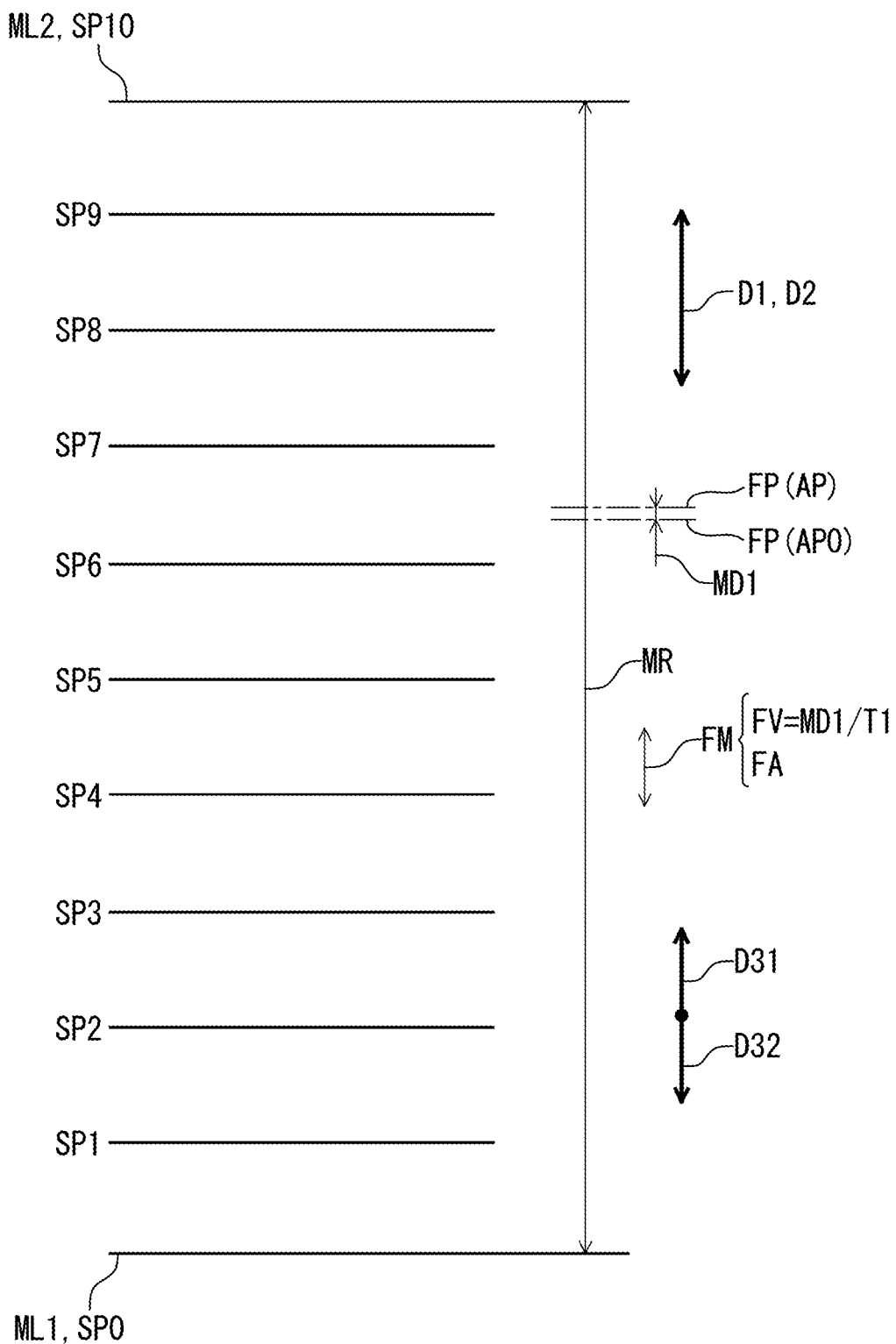
FIG. 34 is a schematic diagram indicating positions defined in the rider-posture changing device illustrated in FIG. 30.

As seen in FIG. 34, the controller 452 is configured to calculate the movement information FM in accordance with the absolute position AP. The detector 59 is configured to periodically detect the absolute position AP of the second member 16 relative to the first member 14 per unit of time T1. The controller 452 is configured to periodically store the detected absolute position AP as the current position CP. The controller 452 is configured to calculate the movement distance MD1 by subtracting the detected absolute position AP from the previously detected absolute position AP0. The controller 452 is configured to calculate the velocity information FV by dividing the movement distance MD1 by the unit of time T1. The controller 452 is configured to periodically obtain the acceleration information FA by differentiating the velocity information FV with respect to time.

The control executed by the controller 452 will be described below referring to FIGS. 35 and 36.

Figure 35:
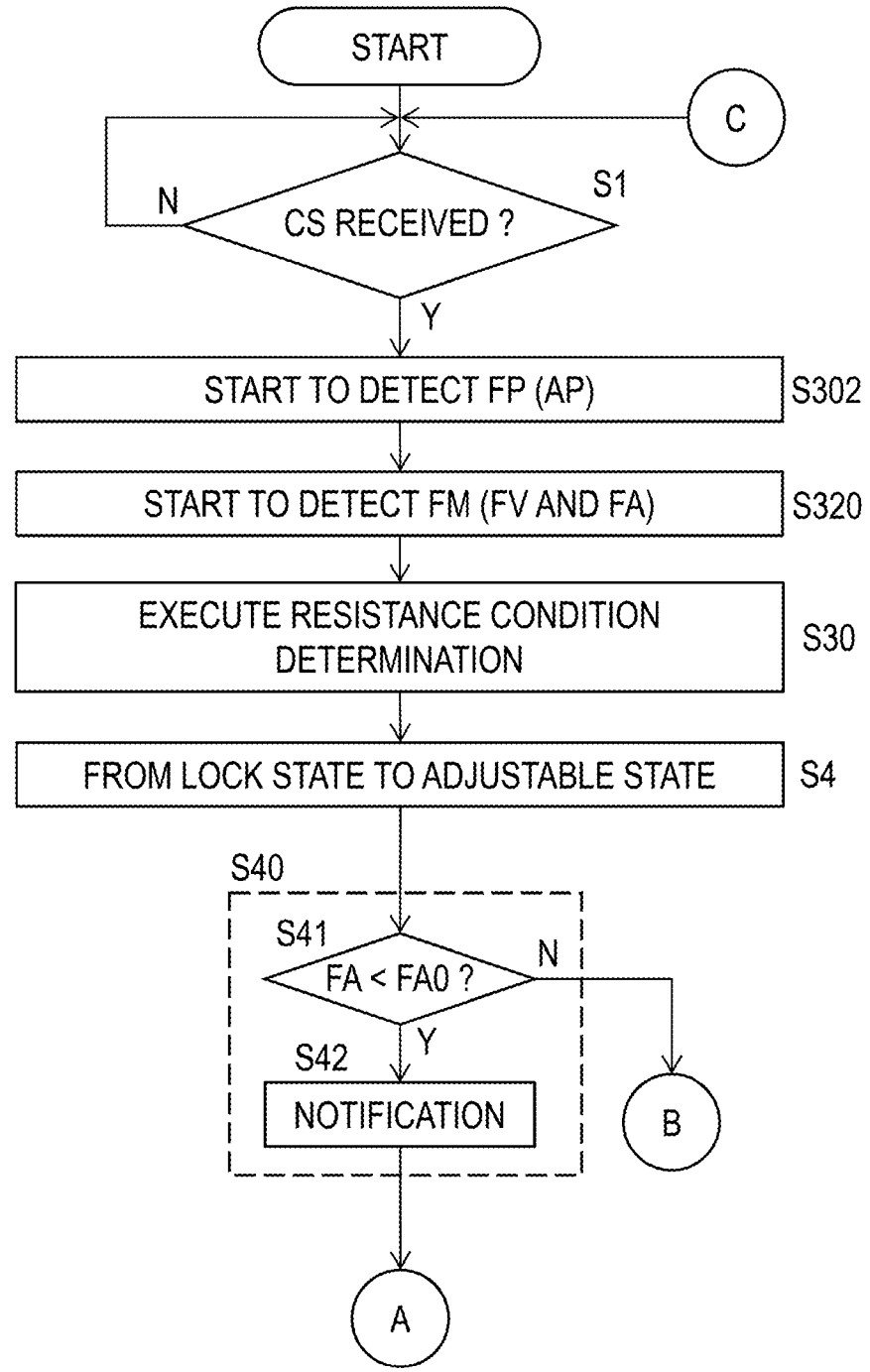
FIGS. 35 and 36 are flow charts of the rider-posture changing device illustrated in FIG. 30.

As seen in FIG. 35, the controller 452 determines whether the control signal CS is received or not (step S1). The controller 452 keeps monitoring the control signal CS if the controller 452 concludes that the control signal CS is not received (step S1). The controller 452 controls the detector 59 to start to detect the position information FP if the controller 452 concludes that the control signal CS is received (steps S1 and S302). Specifically, the controller 452 controls the detector 59 to start to periodically detect the absolute position AP if the controller 452 concludes that the control signal CS is received. The controller 452 controls the detector 59 to start to periodically detect the absolute position AP per unit of time T1 if the controller 452 concludes that the control signal CS is received. The controller 452 stores the detected absolute position AP as the current position CP.

Furthermore, the controller 452 controls the detector 59 to start to detect the movement information FM if the controller 452 concludes that the control signal CS is received (steps S1 and S320). Specifically, the controller 452 controls the detector 59 to start to detect the velocity information FV and the acceleration information FA if the controller 452 concludes that the control signal CS is received.

Figure 36:
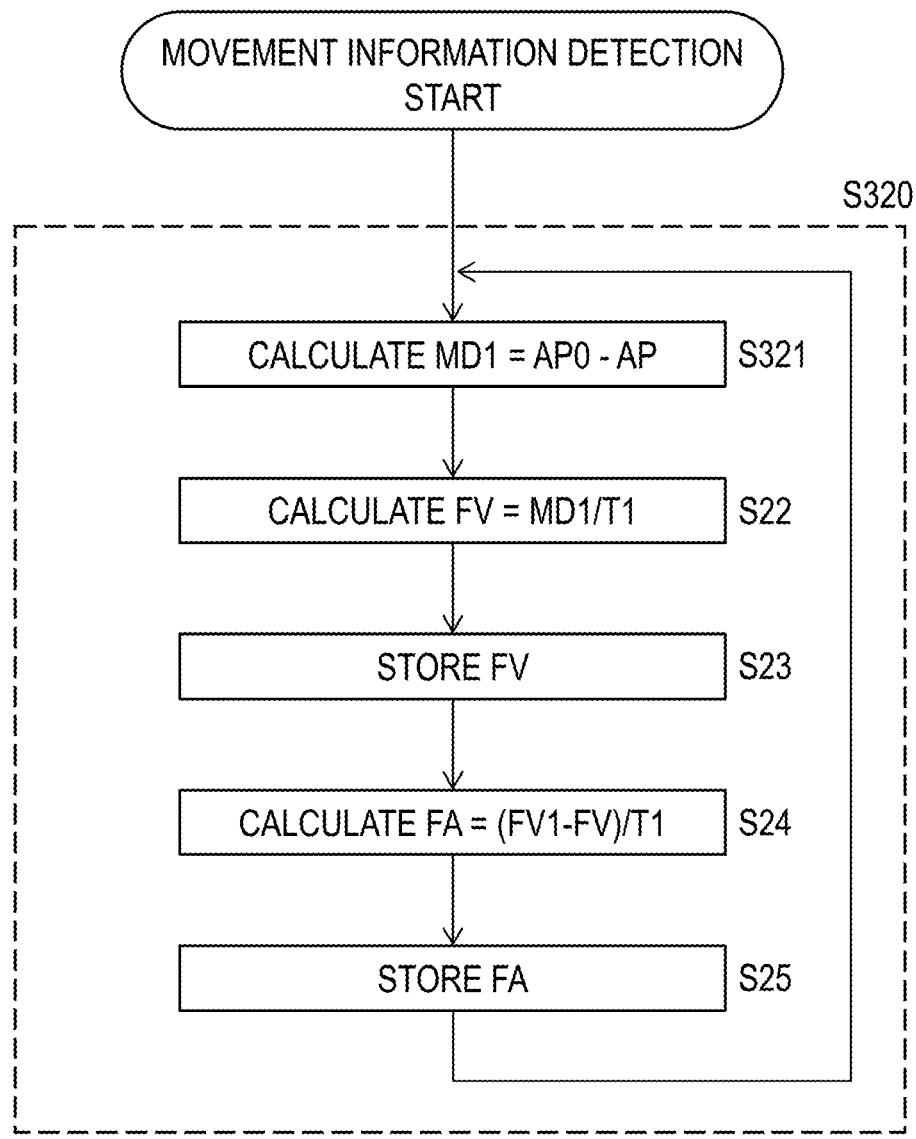

As seen in FIG. 36, in the movement information detection, the controller 452 calculates the movement distance MD1 by subtracting the detected absolute position AP from the previously detected absolute position AP0 (step S321). The steps S22 to S25 are the same as the steps S22 to S25 in the first embodiment.

As seen in FIG. 35, the controller 452 executes the resistance condition determination after starting to detect the movement information FM (step S30). The controller 452 controls the actuator 44 to change the state of the hydraulic structure 18 from the lock state to the adjustable state (step S4). The steps S5 to S10 in FIG. 11 are omitted from the flow in the second embodiment because the detector 59 detects the absolute position AP and therefore the controller 452 does not need to reset the second information F3.

The flow charts depicted in FIGS. 12, 14, and 15 can be utilized as the flow of the controller 452. Thus, the description regarding those flow charts are omitted here for the sake of brevity.

MODIFICATIONS

In the first to fourth embodiments, the rider-posture changing device 12, 212, 312, or 412 comprises a height adjustable seatpost. The height adjustable seatpost includes the first member 14, the second member 16, the detector 59, 259, or 359, and the controller 52 or 452. However, the structures of the rider-posture changing devices 12, 212, 312, and 412 can apply to other devices such as a suspension or a height adjustable stem if needed and/or desired.

Figure 37:
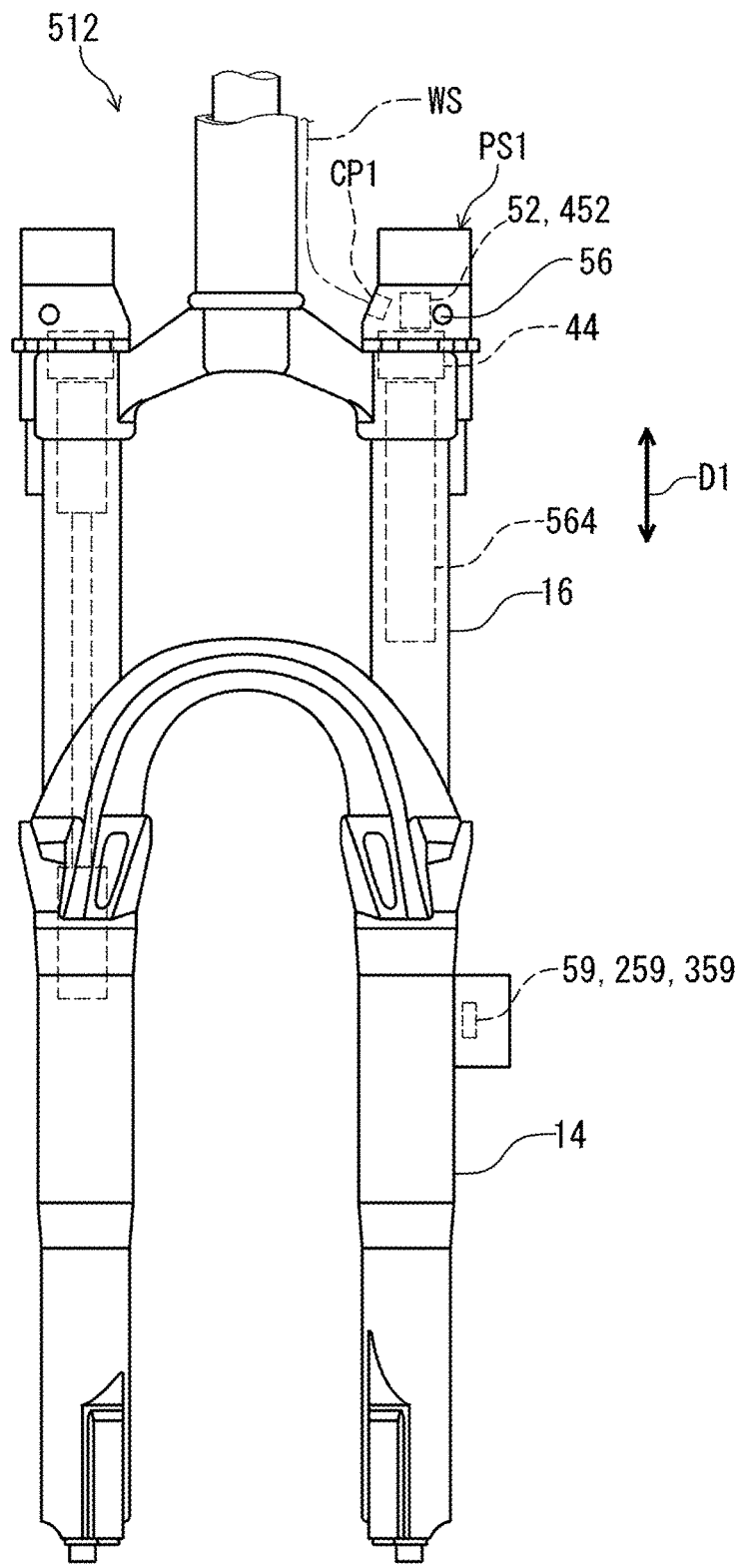
FIG. 37 is a perspective view of a rider-posture changing device in accordance with a modification.

As seen in FIG. 37, for example, the rider-posture changing device 12, 212, 312, or 412 can comprise a suspension 512. The suspension 512 includes the first member 14, the second member 16, the detector 59, 259, or 359, and the controller 52 or 452. The suspension 512 comprises a height adjustment structure 564. The height adjustment structure 564 is configured to change a relative position between the first member 14 and the second member 16 in the longitudinal direction D1. The actuator 44 is configured to actuate the height adjustment structure 564 to change the relative position between the first member 14 and the second member 16 in the longitudinal direction D1.

In the first to fourth embodiments, the second detectors 64, 264, and 364 include a non-contact detector. However, at least one of the second detectors 64, 264, and 364 can include a contact detector if needed and/or desired.

The structures of the rider-posture changing devices 12, 212, 312, and 412 of the first to fourth embodiments can be combined with each other if needed and/or desired. For example, the screw rod 332 can apply to the rider-posture changing devices 12, 212, and 412 of the first, second, and fourth embodiments instead of the hydraulic structure 18. The first detector 360, the first additional detector 362, and the detection object 373 can apply to the rider-posture changing devices 12 and 212 of the first and second embodiments instead of the first detector 60 or 260, the first additional detector 62 or 262, the first detection object 70 or 270, and the first additional detection object 72 or 272. The detection object 470 of the fourth embodiment can apply to the rider-posture changing devices 12, 212, and 312 of the first, second, and third embodiments instead of the first detection object 70 or 270, the first additional detection object 72 or 272, and the second detection object 74 or 274.

The non-contact detector can be detectors other than the optical sensor and the magnetic sensor. The contact detector can be detectors other than the resistive sensor, such as mechanical switches (e.g., a tact switch).

In the resistance condition determination (step S30) depicted in FIG. 14, the velocity information FV is used to determine the excessive resistance. However, the acceleration information FA can be used to determine the excessive resistance instead of or in addition to the velocity information FV if needed and/or desired.

In the detector malfunction determination (step S40) depicted in FIG. 11, the acceleration information FA is used to determine the detector malfunction. However, the velocity information FV can be used to determine the excessive resistance instead of or in addition to the acceleration information FA if needed and/or desired.

In the hydraulic-structure malfunction determination (step S50) depicted in FIG. 15, the velocity information FV is used to determine the hydraulic-structure malfunction. However, the acceleration information FA can be used to determine the hydraulic-structure malfunction instead of or in addition to the velocity information FV if needed and/or desired.

In the first to fourth embodiments, the controller is configured to execute the resistance condition determination, the detector malfunction determination, the hydraulic-structure malfunction determination, and the braking-point determination. However, at least one of the resistance condition determination, the detector malfunction determination, the hydraulic-structure malfunction determination, and the braking-point determination can be omitted from the flows of the first to fourth embodiments if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A rider-posture changing device for a human-powered vehicle, the rider-posture changing device comprising:
   a first member;
   a second member configured to be movable relative to the first member;
   a detector configured to detect position information of the second member relative to the first member; and
   a controller configured to obtain movement information of the second member relative to the first member based on the position information, wherein
   the movement information includes at least one of velocity information of the second member relative to the first member, and
acceleration information of the second member relative to the first member.

2. The rider-posture changing device according to claim 1, further comprising:
an actuator, wherein
the controller is configured to control the actuator based on the movement information.

3. The rider-posture changing device according to claim 1, wherein
the position information includes at least one of
first information indicating whether the second member reaches a reference absolute position or not, and
second information indicating a movement distance of the second member from a reference position in a longitudinal direction.

4. The rider-posture changing device according to claim 3, wherein
the controller is configured to calculate the movement information in accordance with the second information.

5. The rider-posture changing device according to claim 1, wherein
the detector is configured to detect the position information indicating an absolute position of the second member relative to the first member, and
the controller is configured to calculate the movement information in accordance with the absolute position.

6. The rider-posture changing device according to claim 1, wherein
one of the first member and the second member is configured to be provided to a frame of the human-powered vehicle.

7. The rider-posture changing device according to claim 6, wherein
the first member includes a first tube, and the second member includes a second tube, the first tube and the second tube are telescopically arranged.

8. The rider-posture changing device according to claim 1, comprising
a height adjustable seatpost including the first member, the second member, the detector, and the controller.

9. The rider-posture changing device according to claim 1, comprising
a suspension including the first member, the second member, the detector, and the controller.

10. A control system for a human-powered vehicle, comprising:
the rider-posture changing device according to claim 1; and
an operating device configured to operate the rider-posture changing device.

11. A rider-posture changing device for a human-powered vehicle, the rider-posture changing device comprising:
a first member;
a second member configured to be movable relative to the first member;
a detector configured to detect position information of the second member relative to the first member; and
a controller configured to obtain movement information of the second member relative to the first member based on the position information, wherein
the controller is configured to determine at least one of a malfunction of the detector and an unusual relative movement between the first member and the second member.

12. The rider-posture changing device according to claim 11, wherein
the controller is configured to compare the movement information with a predetermined value to determine at least one of the malfunction of the detector and the unusual relative movement between the first member and the second member.

13. The rider-posture changing device according to claim 12, wherein
the controller is configured to inform a user of the at least one of the malfunction of the detector and the unusual relative movement between the first member and the second member if the movement information is lower than the predetermined value.

14. The rider-posture changing device according to claim 11, further comprising
a hydraulic structure having
a lock state in which the second member is locked relative to the first member in a longitudinal direction, and
an adjustable state in which the second member is movable relative to the first member in the longitudinal direction, wherein
the controller is configured to determine a malfunction of the hydraulic structure.

15. The rider-posture changing device according to claim 14, wherein
the controller is configured to conclude that the hydraulic structure malfunctions if the movement information is in a predetermined range in the lock state.

16. The rider-posture changing device according to claim 15, wherein
the controller is configured to inform a user of the malfunction of the hydraulic structure if the movement information is in the predetermined range in the lock state.

17. A rider-posture changing device for a human-powered vehicle, the rider-posture changing device comprising:
a first member;
a second member configured to be movable relative to the first member;
a detector configured to detect position information of the second member relative to the first member;
a controller configured to obtain movement information of the second member relative to the first member based on the position information;
an actuator; and
a hydraulic structure having
a lock state in which the second member is locked relative to the first member in a longitudinal direction, and
an adjustable state in which the second member is movable relative to the first member in the longitudinal direction, wherein
the controller is configured to control the actuator based on the movement information,
the actuator is configured to change a state of the hydraulic structure between the lock state and the adjustable state, and
the controller is configured to determine, based on the movement information, a timing at which the actuator changes the state of the hydraulic structure from the adjustable state to the lock state.

18. The rider-posture changing device according to claim 17, wherein
the controller is configured to calculate, based on the movement information, a position in which the actuator changes the state of the hydraulic structure from the adjustable state to the lock state.

19. The rider-posture changing device according to claim 18, wherein the movement information includes the velocity information of the second member relative to the first member, and the controller is configured to calculate, based on the velocity information, the position in which the actuator changes the state of the hydraulic structure from the adjustable state to the lock state.

\* \* \* \* \*